United States Patent
Nakagawa et al.

(10) Patent No.: US 6,805,489 B2
(45) Date of Patent: Oct. 19, 2004

(54) DYNAMIC PRESSURE BEARING DEVICE

(75) Inventors: Hisaya Nakagawa, Nagano (JP);
Yasushi Mizusaki, Nagano (JP);
Tomoko Nogawa, Nagano (JP)

(73) Assignee: Sankyo Seiki Mfg. Co., Ltd., Nagano (JP)

(*) Notice: Subject to any disclaimer, the term of this patent is extended or adjusted under 35 U.S.C. 154(b) by 121 days.

(21) Appl. No.: 10/328,938

(22) Filed: Dec. 24, 2002

(65) Prior Publication Data
US 2003/0152301 A1 Aug. 14, 2003

(30) Foreign Application Priority Data
Dec. 28, 2001 (JP) .......................................... 2001-399228

(51) Int. Cl.⁷ .............................................. F16C 32/06
(52) U.S. Cl. ......................................... 384/114; 384/279
(58) Field of Search .............................. 384/100, 114, 384/115, 118, 279

(56) References Cited

U.S. PATENT DOCUMENTS

| | | | |
|---|---|---|---|
| 4,808,070 A | * 2/1989 | Fonda-Bonardi | 384/115 |
| 5,659,445 A | * 8/1997 | Yoshida et al. | 384/118 |
| 5,704,718 A | * 1/1998 | Mori et al. | 384/279 |
| 5,785,429 A | * 7/1998 | Jeong | 384/279 |
| 6,244,749 B1 | * 6/2001 | Nakagawa et al. | 384/114 |
| 6,402,385 B1 | * 6/2002 | Hayakawa et al. | 384/114 |
| 6,428,211 B1 | * 8/2002 | Murabe et al. | 384/114 |

FOREIGN PATENT DOCUMENTS

| | | |
|---|---|---|
| JP | 10-267029 | 10/1998 |
| JP | 11-101224 | 4/1999 |
| JP | 2001-116046 | 4/2001 |

* cited by examiner

Primary Examiner—Thomas R. Hannon
(74) Attorney, Agent, or Firm—Hogan & Hartson LLP

(57) ABSTRACT

A dynamic pressure bearing device, comprising:
a shaft member;
a bearing member relatively rotatably supporting the shaft member;
a plurality of dynamic pressure generation parts provided on a peripheral face either of the shaft member or the bearing member; and
a perfect circle part formed at least on a shaft end side at a region which is axially adjacent to the dynamic pressure generation part on the peripheral face where a protruded part and a recessed part are formed,
wherein the dynamic pressure generation parts are respectively formed in a circumferential direction at equal angular intervals and extended in an axial direction so as to form a protruded part which makes a dimension of a minute gap between the shaft member and the bearing member to be the smallest and a recessed part which makes the dimension of the minute gap the largest, and
the dimension of the minute gap in the perfect circle part is set to be the same as that in the protruded part.

20 Claims, 45 Drawing Sheets

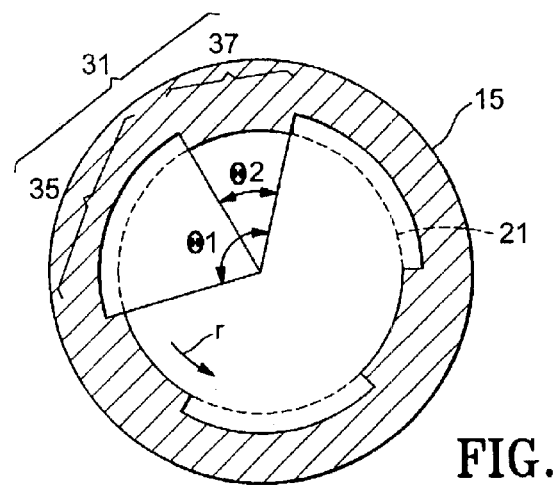
FIG. 4(A)
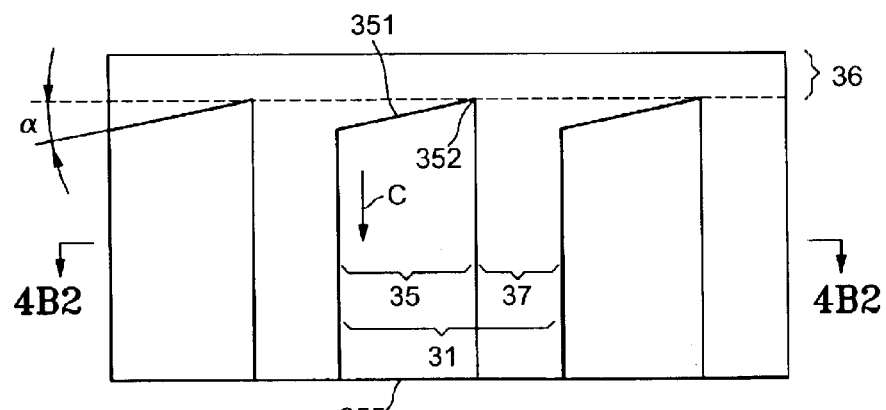
FIG. 4(B)1
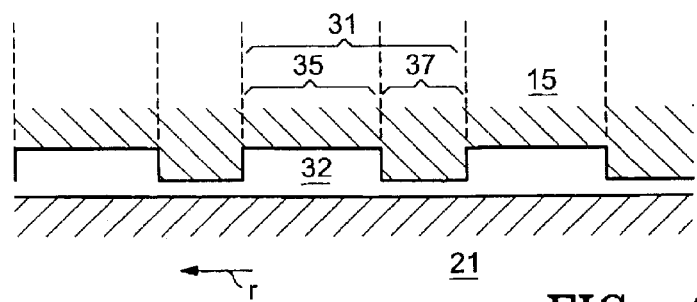
FIG. 4(B)2

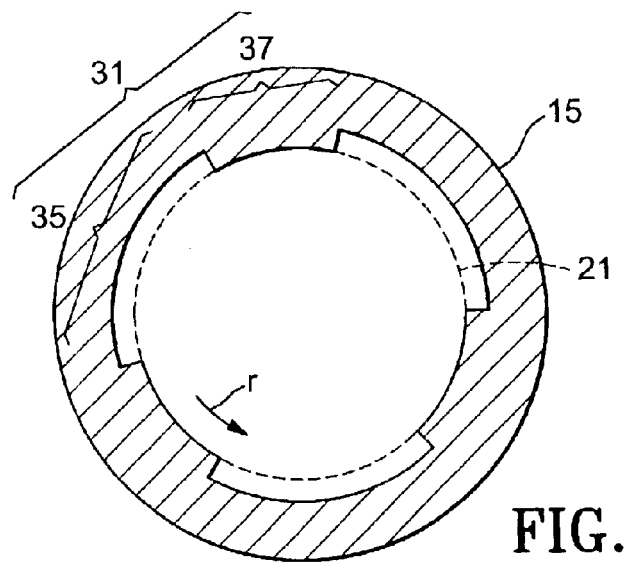
FIG. 24(A)
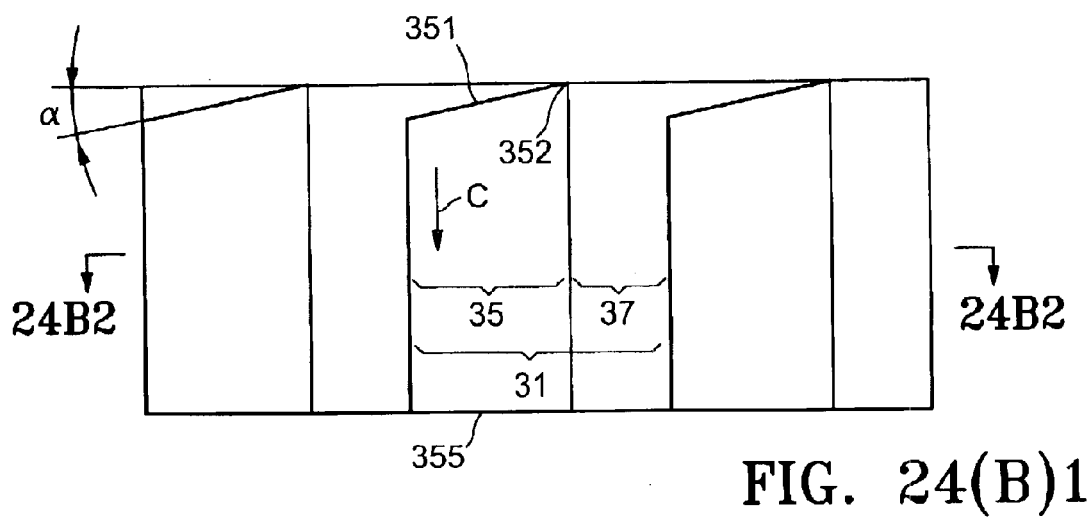
FIG. 24(B)1
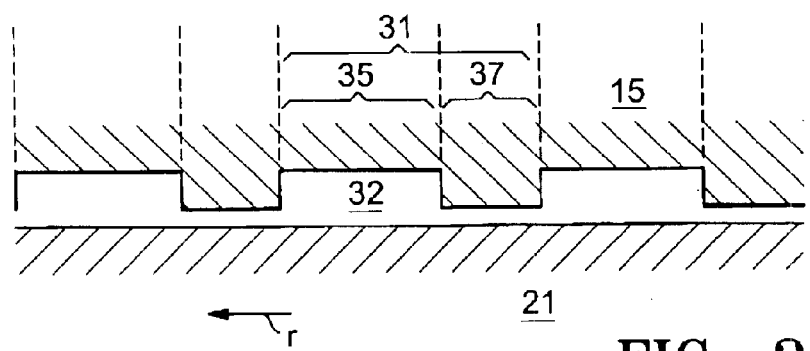
FIG. 24(B)2

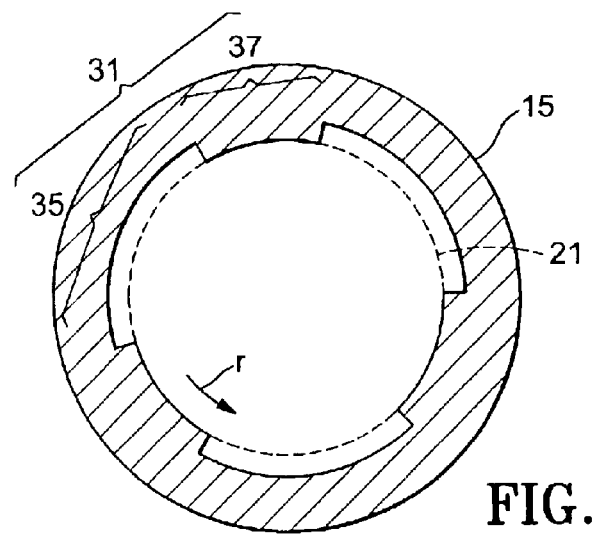
FIG. 25(A)
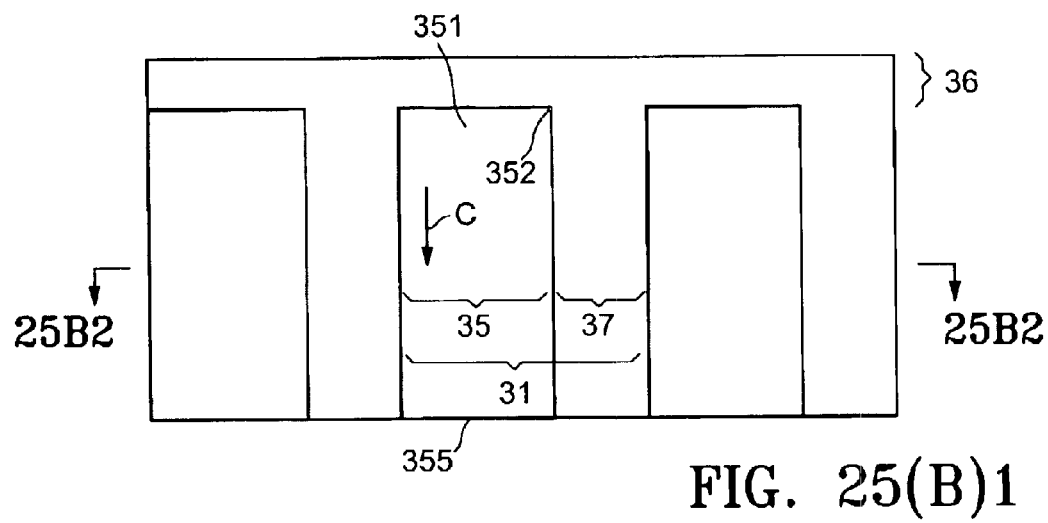
FIG. 25(B)1
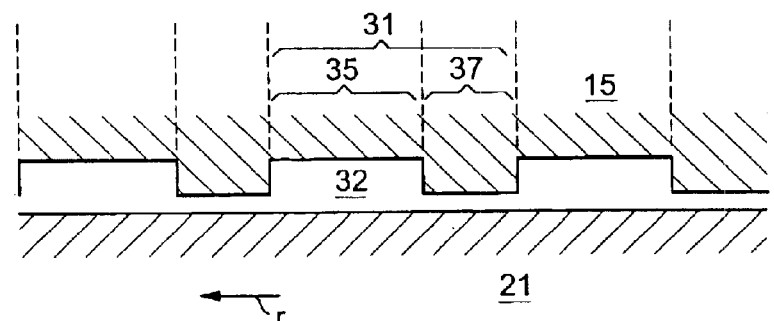
FIG. 25(B)2

DYNAMIC PRESSURE BEARING DEVICE

BACKGROUND OF THE INVENTION

1. Field of the Invention

The present invention relates to a dynamic pressure bearing device in which a dynamic pressure is generated by a lubricating fluid to support a shaft member or a bearing member one of which is relatively rotated.

2. Description of the Related Art

In recent years, various types of dynamic pressure bearing devices have been proposed or a device rotating various types of rotary bodies such as a polygon mirror, a magnetic disk and an optical disk. In such a dynamic pressure bearing device, the outer peripheral face of a shaft member and the inner peripheral face of a bearing member face each other via a minute gap. One of the faces is armed with a dynamic pressure generating part. A lubricating fluid such as air or oil in the minute gap is pressurized by a pumping operation at the dynamic pressure generating part during rotation. Either the shaft member or the bearing member is relatively rotatably supported by the dynamic pressure of the lubricating fluid.

Some dynamic pressure bearing devices are provided with grooves in a herringbone or spiral shape as a means for generating dynamic pressure. On the other hand, especially for journal bearing devices, step-formed and dynamic pressure bearing devices without using herringbone or spiral dynamic pressure generating grooves have been proposed.

FIG. 26(A) is a transverse cross-sectional view of a conventional taper-formed dynamic pressure bearing device, and FIG. 26(B) is an explanatory development view of a dynamic pressure generation part which is formed in the dynamic pressure bearing device shown in FIG. 26(A). In the dynamic pressure bearing device 30' shown in the figure, five dynamic pressure generating parts 31' are formed along a circumferential direction on the inner peripheral face of a bearing sleeve 15' (bearing member) which encloses a rotation shaft 21 (shaft member) via a minute gap 32'. Each of the dynamic pressure generating parts 31' is composed of a protruded part 37' which is formed so as to make the radial dimension of the minute gap 32' the narrowest, a recessed isolation groove 38 which is formed of a depth of 23 $\mu$m over about 7.5° of the circular angle, and a tapered part 36' which makes the radial dimension of the minute gap 32' continuously vary about 6 $\mu$m between the recessed isolation groove 38 and the protruded part 37'. When the rotation shaft 21 is rotated in the direction of arrow "r", the lubricating fluid such as air or oil is pressurized to generate a desired dynamic pressure in the minute gap 32' formed between the rotation shaft 21 and the bearing sleeve 15'.

However, the dynamic pressure bearing device 30' provided with the recessed isolation grooves 38 for canceling negative pressure has a low rigidity, which causes the following problems. First, the deflection of the rotation shaft 21 is liable to occur when disturbances are applied to the shaft 21 at a low speed rotation. In addition, since the rotation speed required to float by the dynamic pressure is high, a metal-to-metal contact occurs between the rotation shaft 21 and the bearing sleeve 15' at a low speed rotation of about 5000 rpm, which may cause abrasion. Accordingly, the long life of the dynamic pressure bearing device 30' cannot be attained.

In order to solve such problems, it may be inconceivable to make the gap between the rotation shaft 21 and the bearing sleeve 15' narrower by strictly controlling the dimensional tolerances of the rotation shaft 21 and the bearing sleeve 15'. However, such a countermeasure is unfavorable because the components' cost and assembling cost are increased. It is also conceivable to make the diameter of the rotation shaft 21 larger to increase its peripheral velocity, but it is also unfavorable because such a countermeasure causes an increase in cost. It is also conceivable that a high abrasion resistance material is used for the rotation shaft 21 and the bearing sleeve 15', but it also causes an increase in the cost of the components.

Further, when the recessed isolation grooves 38 are provided, the contraction percentage of the lubricating fluid in the minute gap 32' becomes so large that the lubricating fluid is unable to get into the small gap 32' and may leak out in the axial direction.

The recessed isolation grooves 38 are preferable to be formed as deep and narrow as possible to obtain satisfactory dynamic pressure characteristics and normally formed with a depth of 20 $\mu$m or more. Accordingly, the cutting work is performed to form deep and narrow grooves in the manufacturing process of the dynamic pressure bearing device 30'. The reason is that it is difficult to form deep and narrow recessed isolation grooves 38 by another method. Accordingly, the conventional dynamic pressure bearing device 30' requires an additional production process different from the normal manufacturing process. Workability of cutting the work is not satisfactory for a dynamic pressure bearing device. This means the cutting work is not suitable to make a deep and narrow recessed isolation grooves for a dynamic pressure bearing device, although only a simple deep and narrow recessed isolation groove can be formed by cutting work. Therefore, much caution and slow handling are required to form a satisfactory isolation groove for a dynamic pressure bearing device, which resulting in reduced productivity due to low efficiency.

SUMMARY OF THE INVENTION

In view of the problems described above, it is an advantage of the present invention to provide a dynamic pressure bearing device capable of generating satisfactory dynamic pressure even if the recessed isolation grooves are not formed.

In order to achieve the above advantage, according to the present invention, there is provided a dynamic pressure bearing device including a plurality of dynamic pressure generation parts on a peripheral face either of a shaft member or a bearing member. The dynamic pressure generation parts are respectively formed in a circumferential direction at equal angular intervals and extended in an axial direction so as to form a protruded part which makes the dimension of a minute gap the smallest and a recessed part which makes the dimension of the minute gap the largest. The dynamic pressure bearing device also includes a perfect circle part formed on the peripheral face at least on a shaft end side at a region which is adjacent to the dynamic pressure generation part where the protruded part and the recessed part are formed. The dimension of the minute gap in the perfect circle part is set to be the same as that in the protruded part.

The dynamic pressure bearing device according to the present invention is provided with the protruded part and the recessed part, but is not provided with a conventional recessed separation groove. Accordingly, the shaft member or the bearing member produced by, for example, a sintered mold body does not require the recessed separation groove by means of cutting work and therefore productivity of the dynamic pressure bearing device can be improved. In addition, since the recessed separation groove is not formed, the leakage of the lubricating fluid in the axial direction can be restrained.

In accordance with an embodiment of the present invention, the region which is adjacent to the dynamic pressure generation parts on the shaft end side is formed in the perfect circle part. Therefore, the rigidity in the center direction can be made larger and the deflection is hard to occur even when disturbances are applied at a low speed rotation. In addition, since the speed of rotation by which floating begins due to the dynamic pressure can be made lower, a metal-to-metal contact is hard to occur between the shaft member and the bearing member even at a low speed rotation, and hence the life of the dynamic pressure bearing device can be made longer. Therefore, the dimensional tolerance of the shaft member and the bearing member does not need to be strict so as to improve its rigidity, and the diameter of the shaft member is not required to be made larger to increase its peripheral velocity Also, it is not necessary to use an expensive material of high abrasion resistance for the shaft member and the bearing member, and therefore the dynamic pressure bearing device with satisfactory characteristics can be provided without increasing cost.

In this configuration, the perfect circle part is preferably formed on the output end side to which a rotational load is coupled. In the shaft member or the bearing member, its center of gravity is shifted on the side to which the rotational load is coupled and thus the deflection is easy to generate. On the contrary, when the perfect circle part is formed on the side to which the load is coupled, the perfect circle part is effective to prevent the deflection.

Preferably, the ratio of the axial length of the perfect circle part and that of the part where the shaft member and the bearing member oppose to each other is preferably set in the range of 0.03 to 0.3. When the ratio is less than 0.03, the effect due to the perfect circle part is made smaller and, on the other hand, when the ratio is more than 0.3, the region of the dynamic pressure generation part is decreased and thus the rigidity is lowered.

Preferably, the edge portion of the recessed part which is located on the shaft end side, to which a rotational load is fitted, is formed oblique so that the corner part to which the lubricating fluid flow in when the shaft member is relatively rotated with the bearing member is formed as an acute angle.

In accordance with another present invention, there is provided a dynamic pressure bearing device including a plurality of dynamic pressure generation parts on a peripheral face either of a shaft member or a bearing member. The dynamic pressure generation parts are respectively formed in a circumferential direction at equal angular intervals and extended in an axial direction so as to form a protruded part which makes the dimension of a minute gap the smallest and a recessed part which makes the dimension of the minute gap the largest. Further, the edge portion of the recessed part is formed oblique so that the corner part to which the lubricating fluid flows in when the shaft member is relatively rotated with the bearing member is formed as an acute angle.

In this configuration, the edge portion on the shaft end side of the recessed part is formed oblique as the corner portion where the lubricating fluid flows into the recessed part is formed so as to be an acute angle. Therefore, when the shaft member is relatively rotated with the bearing member, the lubricating fluid is sent to the center side in the axial direction by the wall face of the edge portion of the recessed part which is formed oblique. Accordingly, the lubricating fluid is pressurized on the center side in the axial direction and thus a large dynamic pressure is generated. The rigidity can be increased and the deflection is hard to occur even when disturbances are applied at a low speed rotation. In addition, since the speed of rotation by which floating begins due to the dynamic pressure can be made lower, a metal-to-metal contact is hard to occur between the shaft member and the bearing member even at a low speed rotation, and hence the life of the dynamic pressure bearing device can be made longer. Therefore, the dimensional tolerance of the shaft member and the bearing member does not need to be strict to improve its rigidity, And the diameter of the shaft member is not required to be made larger to increase its peripheral velocity. Also, the dynamic pressure bearing device with satisfactory characteristics can be provided without increasing cost.

When a step-formed dynamic pressure bearing device is constituted, the protruded part and the recessed part are preferably formed in a step shape where the protruded part and the recessed part are adjacent to each other in the circumferential direction. By this constitution, the shaft member or the bearing member provided with the dynamic pressure generation parts can be produced at a low cost and thus cost reduction of the dynamic pressure bearing device can be obtained. That is because the shaft member or the bearing member provided with the dynamic pressure generation parts can be produced from the sintered compact which is formed from powder including metal by using a die and the die capable of being divided vertically can be utilized to perform the molding. In addition, step-shaped recesses and projections can be also formed on the surface of a die for molding by etching.

Preferably, the dynamic pressure generation parts are formed at three to five regions along the circumferential direction. Also, the ratio of the circular angle of the region where the protruded part is formed with respect to the circular angle of the region where the dynamic pressure generation part is formed is preferably set between 0.2 and 0.5. According to these constitutions, since the rigidity in the center direction can be made larger, deflection is hard to occur even when disturbances are applied at a low speed rotation.

Preferably, the shaft member or the bearing member provided with the dynamic pressure generation parts is made of the sintered compact which is formed from powder including metal. By this constitution, the shaft member or the bearing member can be produced at a low cost and thus cost reduction of the dynamic pressure bearing device can be attained.

According to one embodiment of the present invention, the lubricating fluid is air.

BRIEF DESCRIPTION OF DRAWINGS

FIG. 4(A) is a cross-sectional view of the bearing sleeve taken on line 4A—4A in FIG. 3 (B), and FIG. 4 (B) in a developed view of the dynamic pressure generation part formed on the bearing sleeve.

FIG. 24(A) is a cross-sectional view of a bearing sleeve used for the dynamic pressure bearing device in accordance with another embodiment of the present invention, and FIG. 24(B) is an explanatory developed view of dynamic pressure generation parts formed in the bearing sleeve shown in FIG. 24(A).

FIG. 25(A) is a cross-sectional view of a bearing sleeve used for the dynamic pressure bearing device in accordance with a further embodiment of the present invention, and FIG. 25(B) is an explanatory developed view of dynamic pressure generation parts formed in the bearing sleeve shown in FIG. 26(A).

DETAILED DESCRIPTION OF THE PREFERRED EMBODIMENTS

Dynamic pressure bearing devices in accordance with preferred embodiments of the present invention will be described below with reference to the accompanying drawings.

(Total Constitution of Rotational Driving Device for Polygon Mirror)

Figure 1:
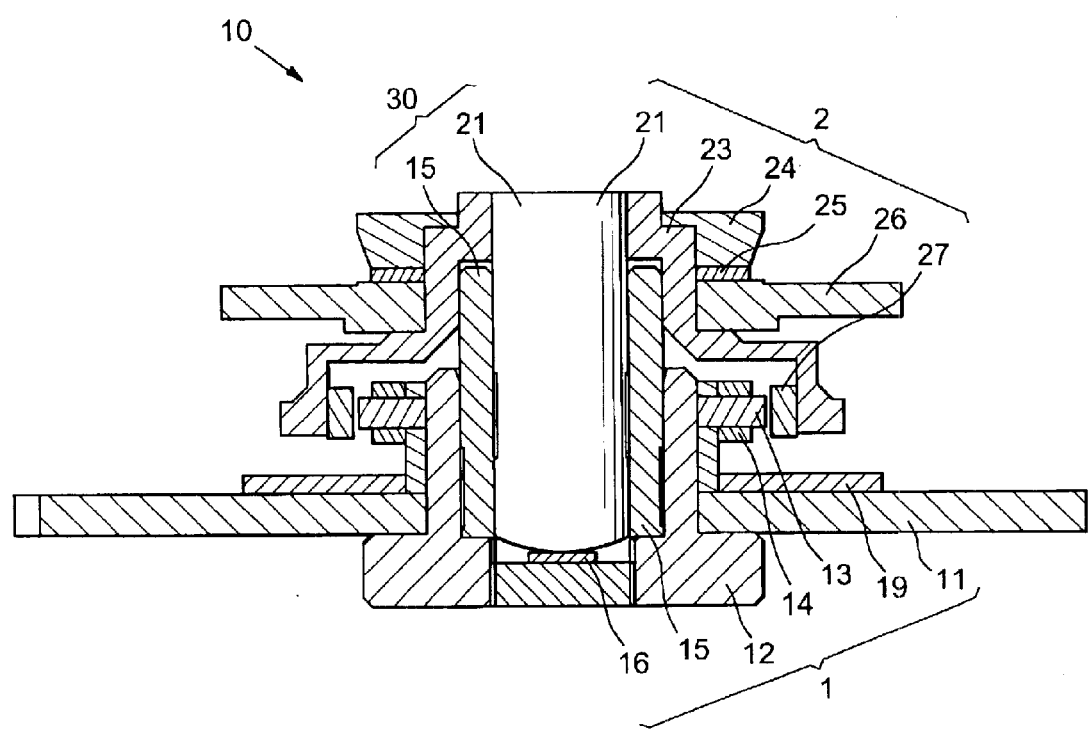
FIG. 1 is a cross-sectional view of a rotational driving device for a polygon mirror in accordance with an embodiment of the present invention.
Figure 2:
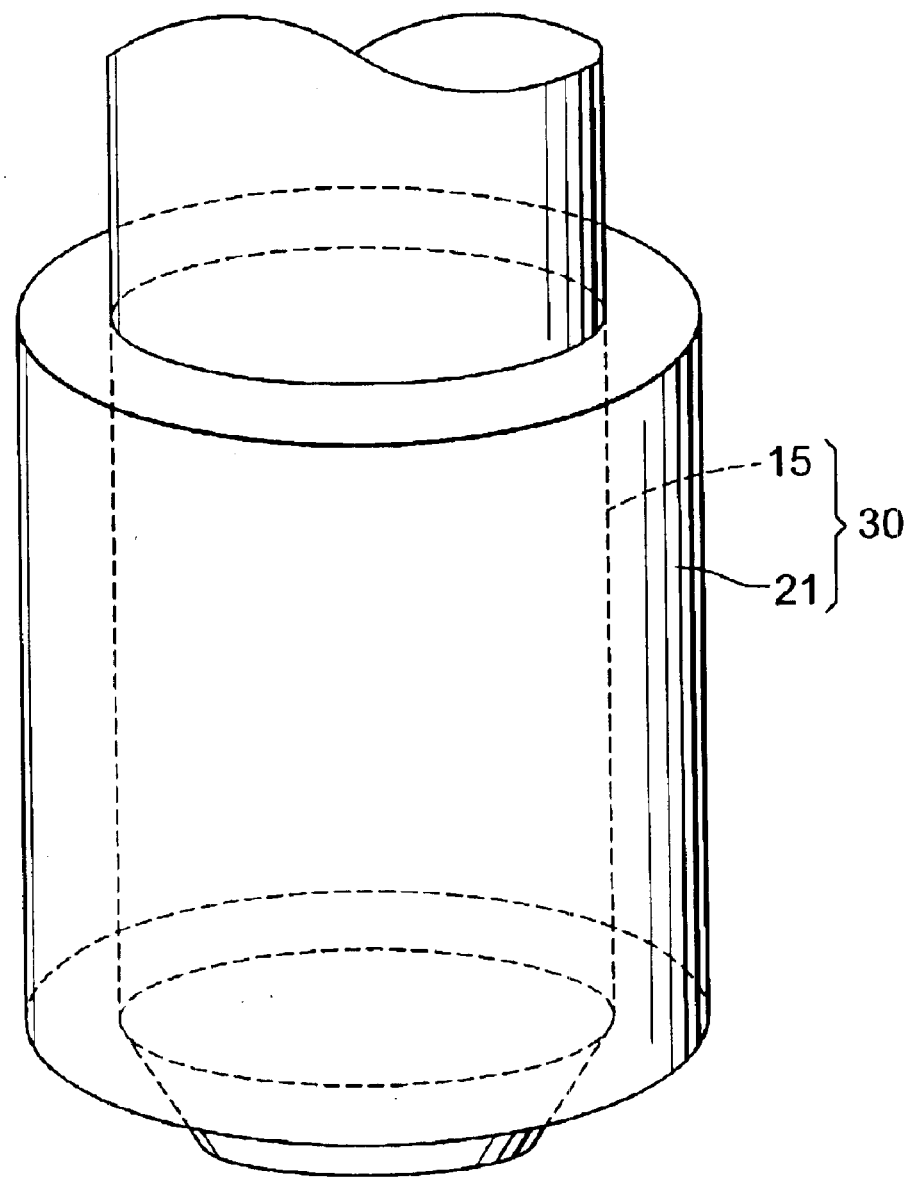
FIG. 2 is an explanatory view of a dynamic pressure bearing device used in the rotational driving device shown in FIG. 1.

FIG. 1 is a cross-sectional view of a rotational driving device for a polygon mirror in accordance with an embodiment of the present invention. FIG. 2 is an explanatory view of a dynamic pressure bearing device used in the rotational driving device shown in FIG. 1.

In FIG. 1, a rotational driving device 10 for a polygon mirror includes a stator assembly 1 as a fixed member and a rotor assembly 2 as a rotational member which is assembled to the stator assembly 1 from the upper side.

The stator assembly 1 has a frame 11 to which a circuit board 19 is mounted, and the frame 11 is also mounted with a bearing holder 12 of a nearly hollow cylinder with a relatively large diameter. A stator core 13 provided with a plurality of radially protruded salient pole parts is fitted on the outer peripheral face of the bearing holder 12, and each of the salient pole parts of the stator core 13 is wound around with a winding 14.

A cylindrical bearing sleeve 15, which is a bearing member of the dynamic pressure bearing device 30, is fitted on the inner peripheral face of the bearing holder 12. A rotation shaft 21, which is a shaft member of the rotor assembly 2, is rotatably supported in a hollow hole provided at the center portion of the bearing sleeve 16 as shown in FIG. 2. The inner peripheral face of the central hole of the bearing sleeve 16 and the outer peripheral face of the rotation shaft 21 are constituted so as to face radially each other via a minute gap of several μm to several dozen μm and form radial dynamic pressure bearing surfaces of the dynamic pressure bearing device 30.

A disc-like thrust bearing plate 16 is fitted and mounted to the opening part at the bottom of the bearing holder 12 to close the opening part as shown in FIG. 1. Therefore, the bearing device 30 is constituted like a cup shape in which the bottom side is closed by the thrust bearing plate 16 and the upper side is opened via a minute radial gap. A rotor member as a rotational load is fitted at the upper end part of the rotation shaft 21 on the opened side, The upper end part of the rotation shaft 21 is fitted and fixed to the center hole of a rotor 23, and a polygon mirror 26 is pressed and fixed on the mirror placing surface of the rotor 23 by a cap 24 through a spring 25. An annular drive magnet 27 is attached on the inner surface of a nearly cylindrical trunk portion of the rotor 23 to oppose to the outer end faces of the salient pole parts of the stator core 13.

(Constitution of Dynamic Pressure Bearing Device 30)

The constitution of the dynamic pressure bearing device 30 used in such the polygon mirror rotational driving device 10 is described in detail below with reference to FIGS. 3(A) and (B), and FIGS. 4(A) and (B).

Figure 3A:
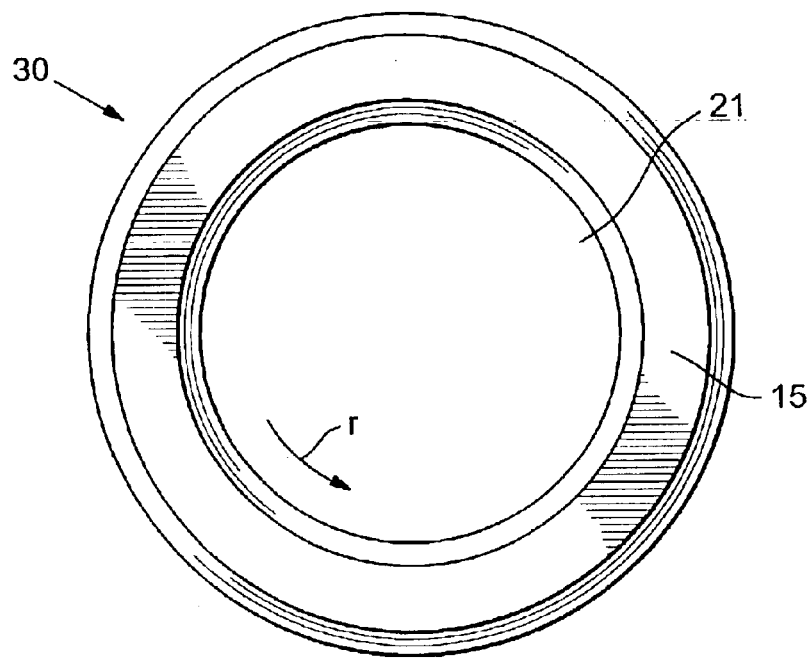
FIG. 3(A) is a plan view of the dynamic pressure bearing device shown in FIG. 2.
Figure 3B:
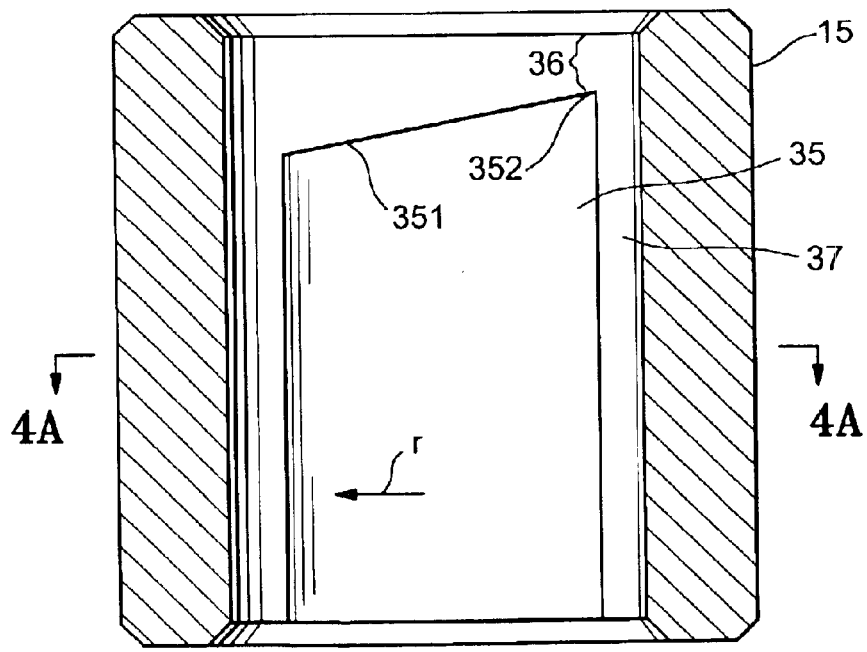
FIG. 3(B) is a longitudinal cross-sectional view of a bearing sleeve shown in FIG. 3(A).

FIG. 3(A) is a plan view of the dynamic pressure bearding device 30 shown in FIG. 2 and FIG. 3(B) is a longitudinal cross-sectional view of the bearing sleeve 15 shown in FIG. 3(A). FIG. 4(A) is a cross-sectional view of the bearing sleeve 15 taken on line 4A—4A in FIG. 3(B) and FIG. 4(B) is a developed view of the dynamic pressure generation part 31 formed on the bearing sleeve 15.

As shown in FIG. 3(A), in the dynamic pressure bearing device 30 of this embodiment, the shape of the rotation shaft 21 is in a perfect circle shape when it is cut at any position in the axis direction. On the other hand as shown in FIG. 3(B), and FIGS. 4(A) and (B), on the inner peripheral surface of the bearing sleeve 15, a dynamic pressure generation part 31 is formed, which is comprised of a recessed part 35 where the dimension of the minute gap 32 formed with the outer peripheral face of the rotation shaft 21 is the largest and a protruded part 37 extended in the axial direction where the dimension of the minute gap 32 is the smallest. The recessed part 35 and protruded part 37 are formed adjacent to each other in a circumferential direction so as to form a stepped shape, and the dimension of the respective parts is formed to be the same radial dimension along the circumferential direction (sec FIG. 4). In the embodiment shown in FIG. 3(B), FIGS. 4(A) and (B), three dynamic pressure generation parts 31 are formed at equal angular intervals respectively along the circumferential direction.

On the inner peripheral surface of the bearing sleeve 15 in the step-shaped dynamic pressure bearing device 30, the edge portion 351 of the recessed part 35, which is located on the shaft end side to which the rotor 23 (rotational load) is fitted to the rotation shaft 21, is formed oblique downwardly. That is, the corner part 352 of the recessed part 35, to which the lubricating fluid flows in when the rotation shaft 21 is rotated in the direction of arrow "r", is formed to be an acute angle. The edge portion 351 formed oblique of the recessed part 35 is positioned on the open side of the minute gap in the bearing device, which is constituted in such a manner that the bottom end side is closed and the upper end side is opened.

Moreover, on the inner peripheral surface of the bearing sleeve 15 in the dynamic pressure bearing device 30 of this embodiment, a perfect circle part 36 is formed at a region which is axially adjacent to the dynamic pressure generation part 31 and positioned on the shaft end side (the output side) where the rotor 23 (rotational load) shown in FIG. 1 is connected to the rotation shaft 21. The radial dimension of the perfect circle part 36 is the same as that of the protruded part 37 and thus both of the gap dimensions in the minute gap 32 are the same. The perfect circle part 36 is also formed on the open end side of the bearing device so as to oppose to the rotation shaft 21.

On the other hand, the recessed part 35 is formed extended to the bottom end part of the bearing sleeve 15 in such a manner that a perfect circle part is not formed. The edge portion 355 of the recessed part 35 located opposite to the output side is formed perpendicular to the axial direction.

When the rotation shaft 21 is rotated in the direction of arrow "r", as shown in the figure, in the dynamic pressure bearing device 30, air or oil as a lubricating fluid intervening between the rotation shaft 21 and the bearing sleeve 15 flows through the minute gap 32 formed by the recessed part 35 and the protruded part 37 in the dynamic pressure generation part 31 depending on the rotational direction of the rotation shaft 21. Consequently, the air or oil intervening between the rotation shaft 21 and the bearing sleeve 15 is pressurized at the region of the protruded part 37. Thus, the rotation shaft 21 is rotatably supported by the inner peripheral face of the bearing sleeve 21 without a metal-to-metal contact due to the generated dynamic pressure.

The region on the shaft end side and the load bearing side which is adjacent to the dynamic pressure generation part 31 is formed to be the perfect circle part 36 so that a large rigidity is obtained in the center direction. The edge portion 351 on the shaft end side of the recessed part 35 is formed oblique with the corner part 352 where the pressurized air or oil flows into the recessed part 35 being formed to be an acute angle. Therefore, when the rotation shaft 21 is rotated, the air or oil is sent to the center side in the axial direction as shown in arrow "C" by the wall face of the edge portion 351 of the recessed part 35 which is formed oblique downwardly. On the other hand, since the bottom end portion of the bearing device is closed, the air or oil is pressurized to the center side in the axial direction and thus a large dynamic pressure is generated so that the rigidity can be increased.

(Number of Dynamic Pressure Generation Parts 31 and Edge Angle)

In order to examine the dynamic pressure bearing device 30, the present inventors produce, as a bearing sleeve 15 shown in FIG. 2, a sintered compact made of powder including a metal, for example, a wintered compact made of bronze containing a solid lubrication material. The sintered compact is constituted to be the inside diameter at 10 mm and the longitudinal length (the dimension in the axial direction of the portion where the rotation shaft 21 and the bearing sleeve 15 oppose to each other) at 15 mm. A rotation shaft 21 made of SUS 304 material is supported by the bearing sleeve 15 and the following experiments are conducted under the test condition of rotating the rotation shaft 21 at 40,000 rpm. The minute gap between the bearing sleeve 15 and the rotation shaft 21 is 2.5 to 5.0 $\mu$m on one side. The axial width of the perfect circle part 36 is 2 mm.

In this embodiment of the present invention, the relations between the number of dynamic pressure generation parts, the circular angle $\theta$ 2 of the protruded part 37 (see FIG. 4(A)) and the edge angle $\alpha$ (see FIG. 4(B)), and the center direction rigidity corresponding to the real dynamic pressure, the center direction rigidity torque ratio which is obtained by dividing the center direction rigidity by the friction torque, and the bearing load which is the absolute value that is no relation with the direction of the dynamic pressure, are examined with a parameter of the eccentricity.

Figure 5A:
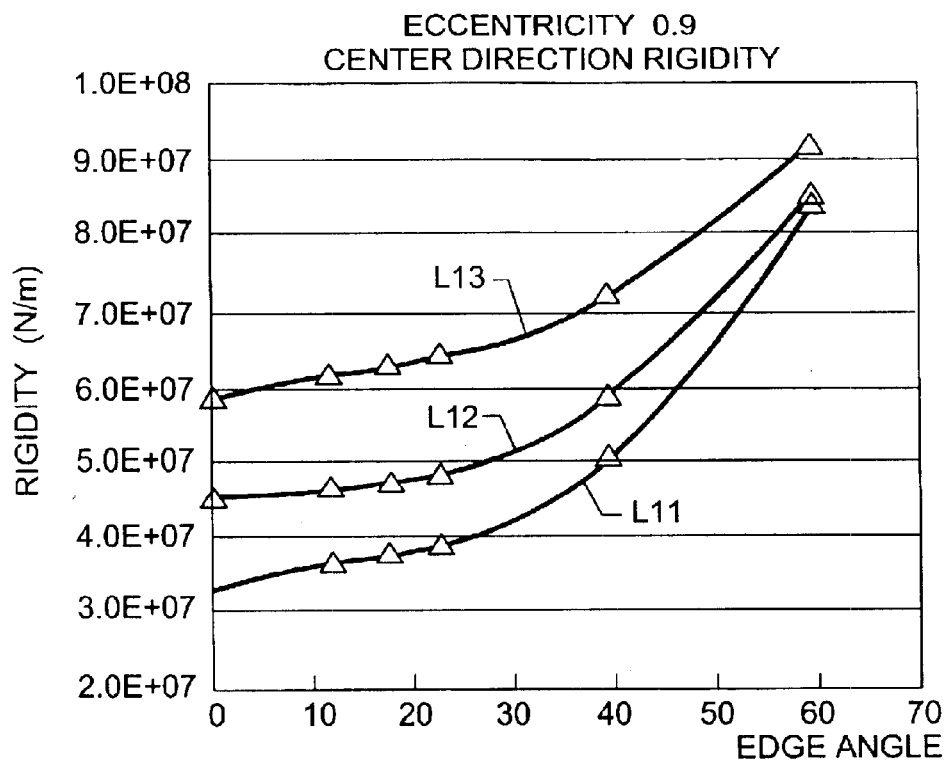
FIGS. 5(A), (B) and (C) are graphs which respectively show relations between an edge angle α and a center direction rigidity, center direction rigidity torque ratio and bearing load, with a parameter of the width of a protruded part, where the number of dynamic pressure generation parts it three and the eccentricity is 0.9 in the dynamic pressure bearing device shown in FIGS. 3 and 4.
Figure 5B:
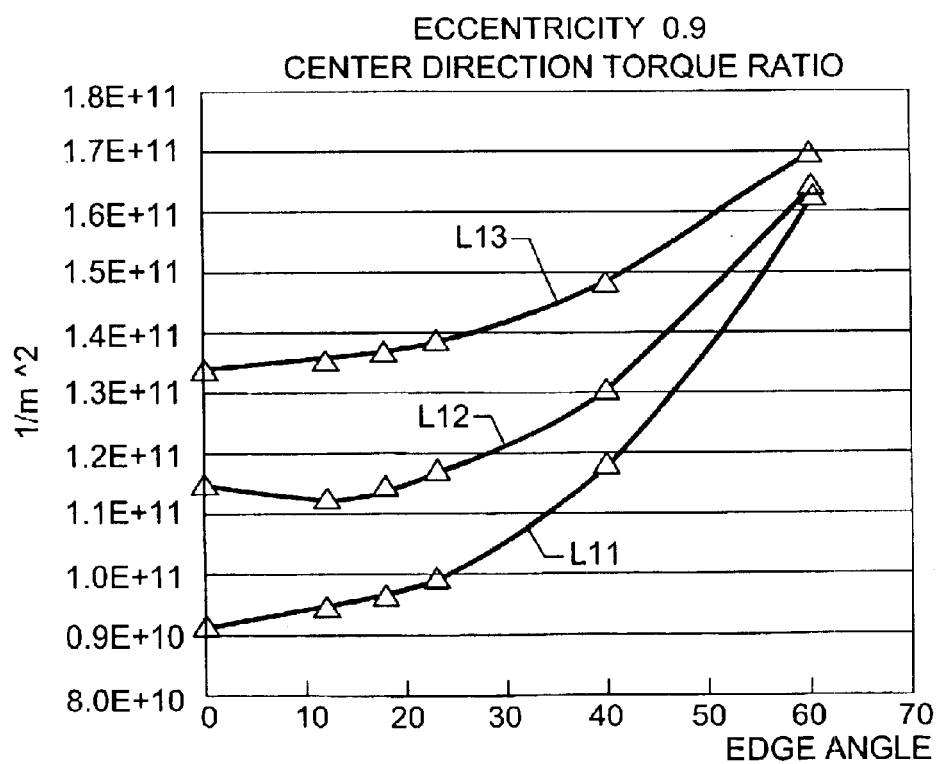
Figure 5C:
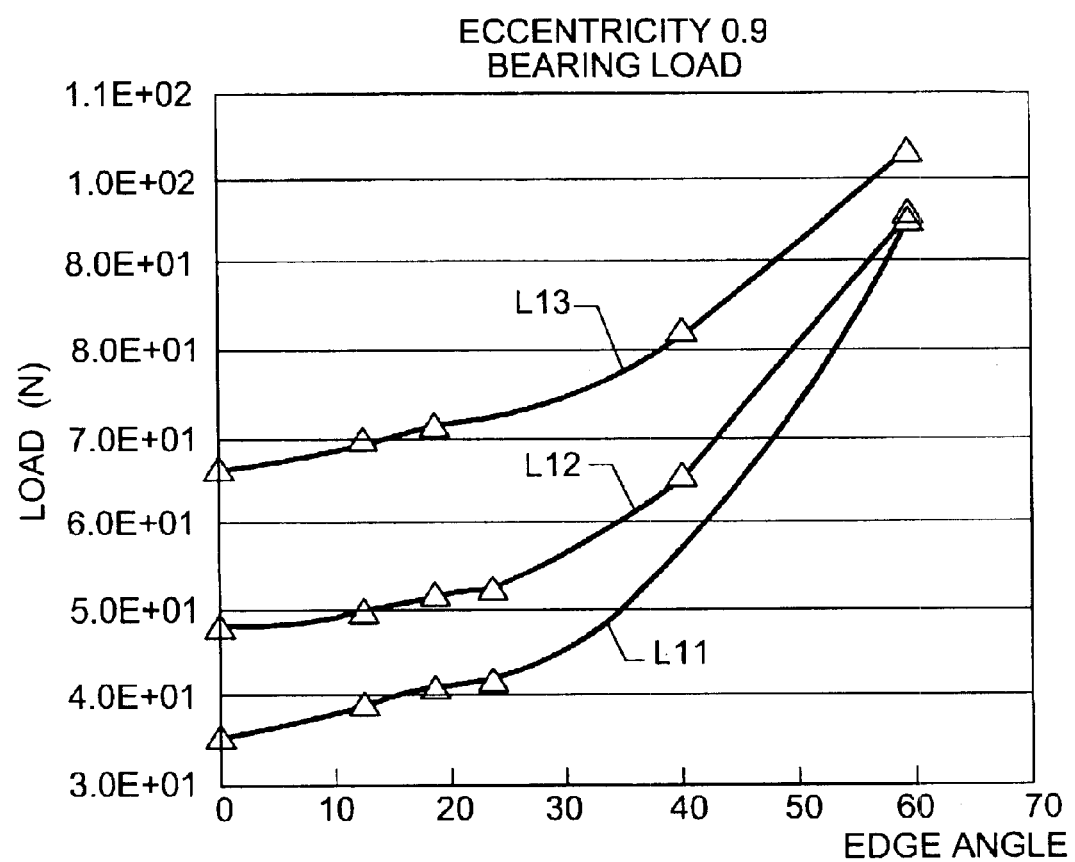
Figure 6A:
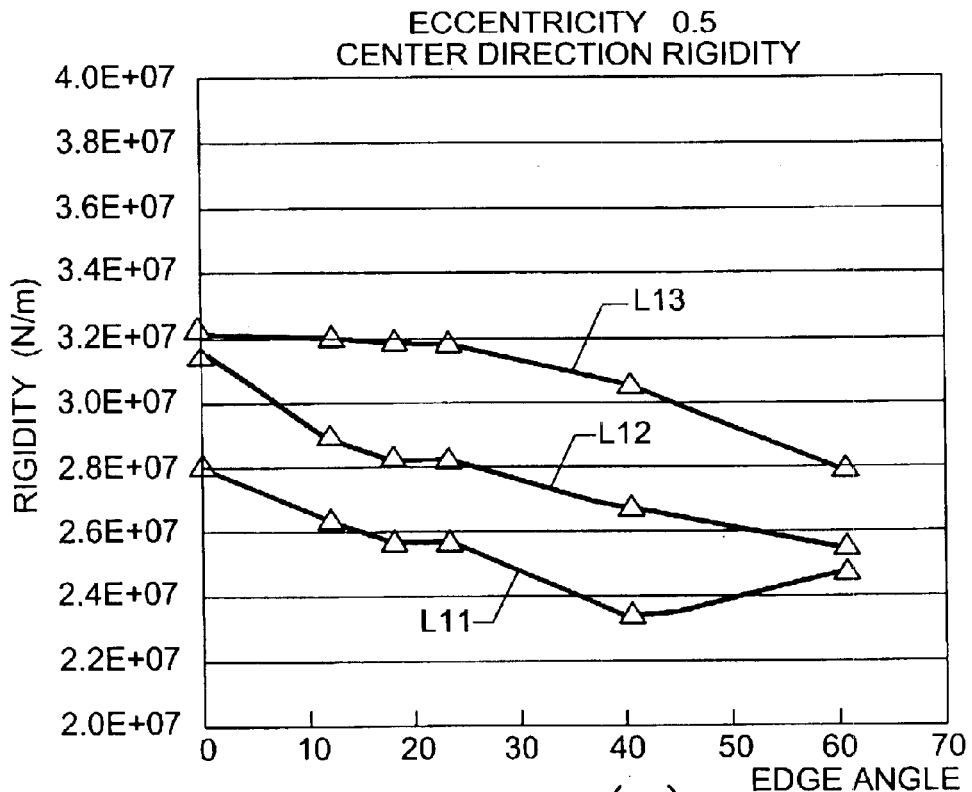
FIGS. 6(A), (B) and (C) are graphs which respectively show relations between an edge angle α and a center direction rigidity, center direction rigidity torque ratio and bearing load, with a parameter of the width of a protruded part, where the number of dynamic pressure generation parts is three and the eccentricity is 0.9 in the dynamic pressure bearing device shown in FIGS. 3 and 4.
Figure 6B:
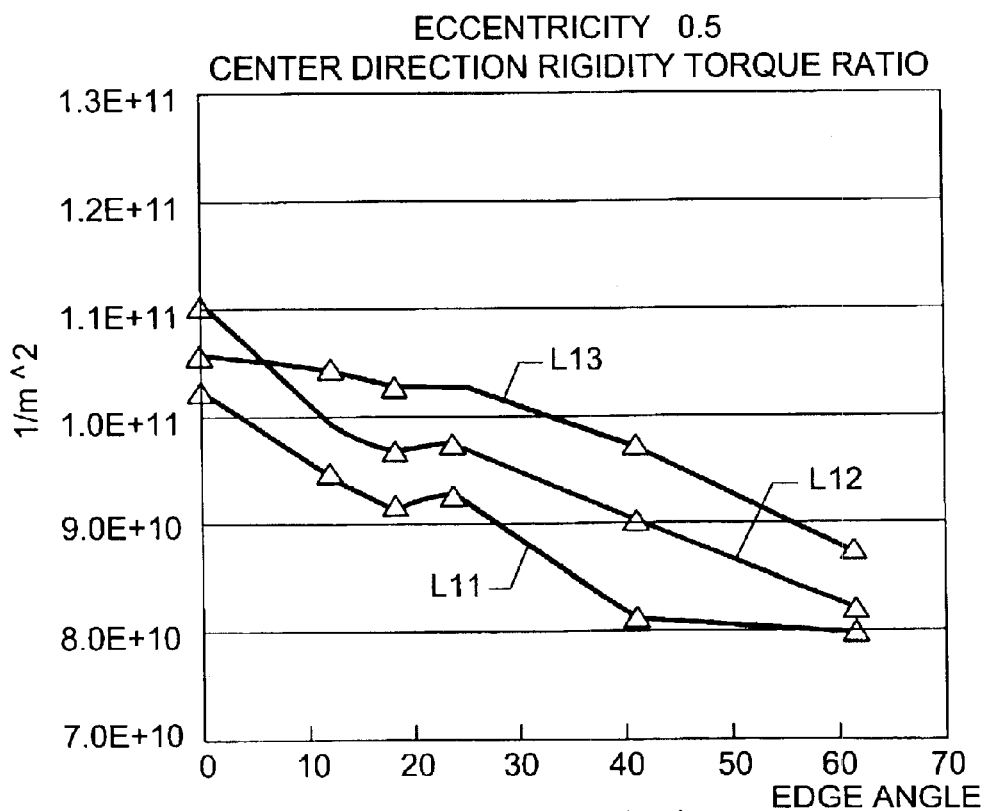
Figure 6C:
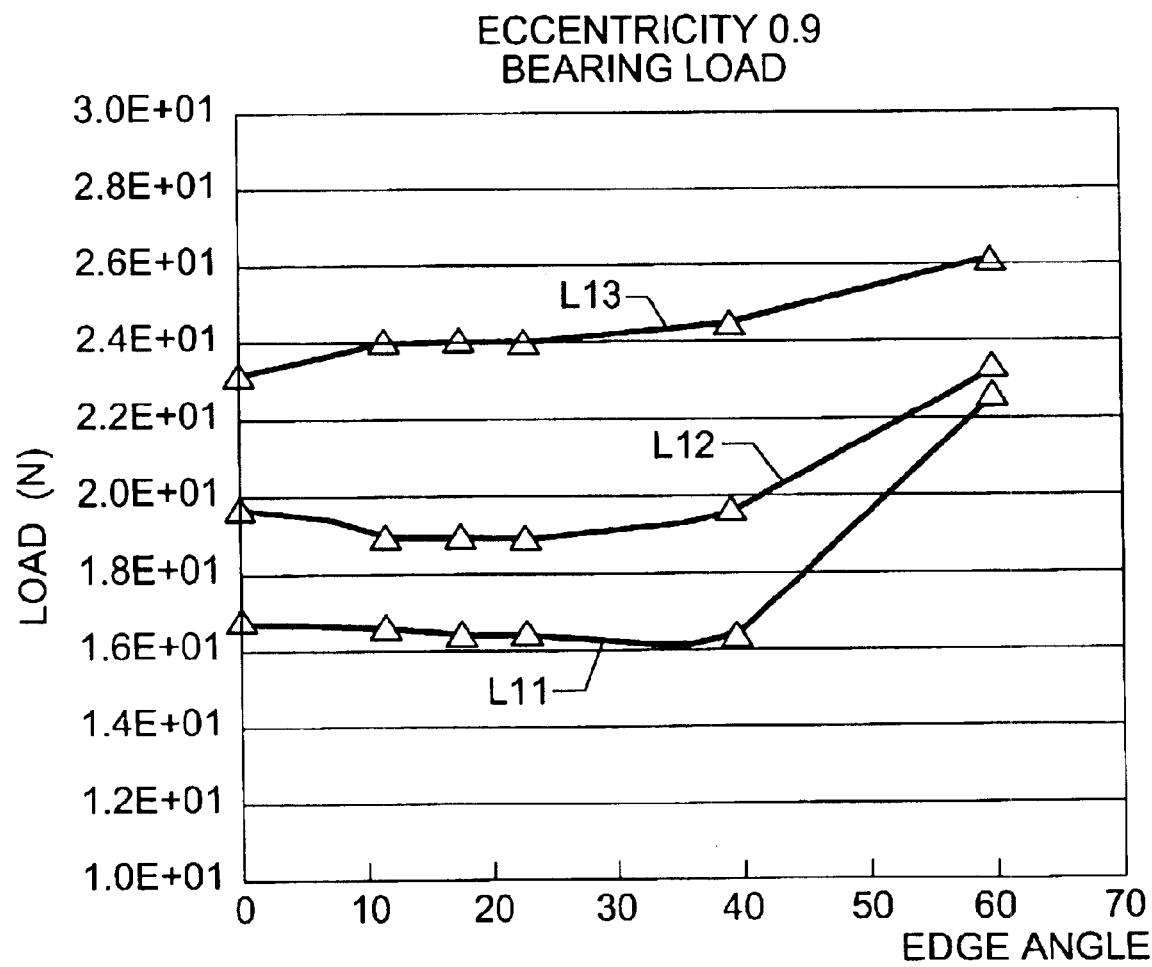
Figure 7A:
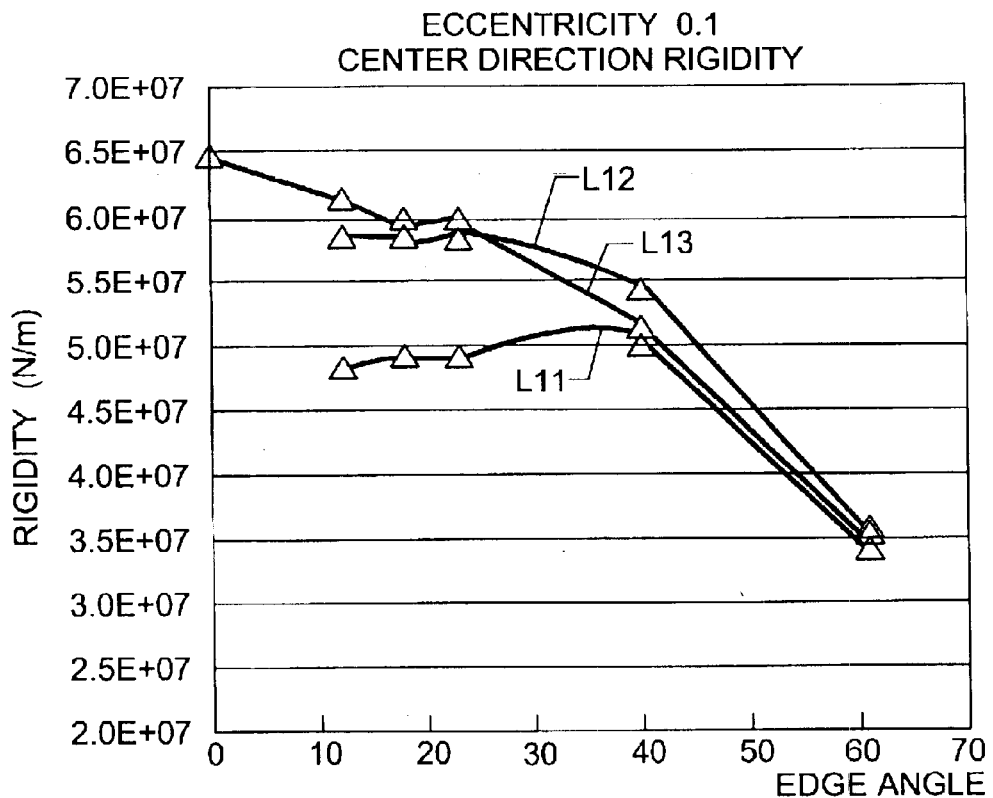
FIGS. 7(A), (B) and (C) are graphs which respectively show relations between an edge angle α and a center direction rigidity, center direction rigidity torque ratio and bearing load, with a parameter of the width of a protruded part, where the number of dynamic pressure generation parts is three and the eccentricity is 0.1 in the dynamic pressure bearing device shown in FIGS. 3 and 4.
Figure 7B:
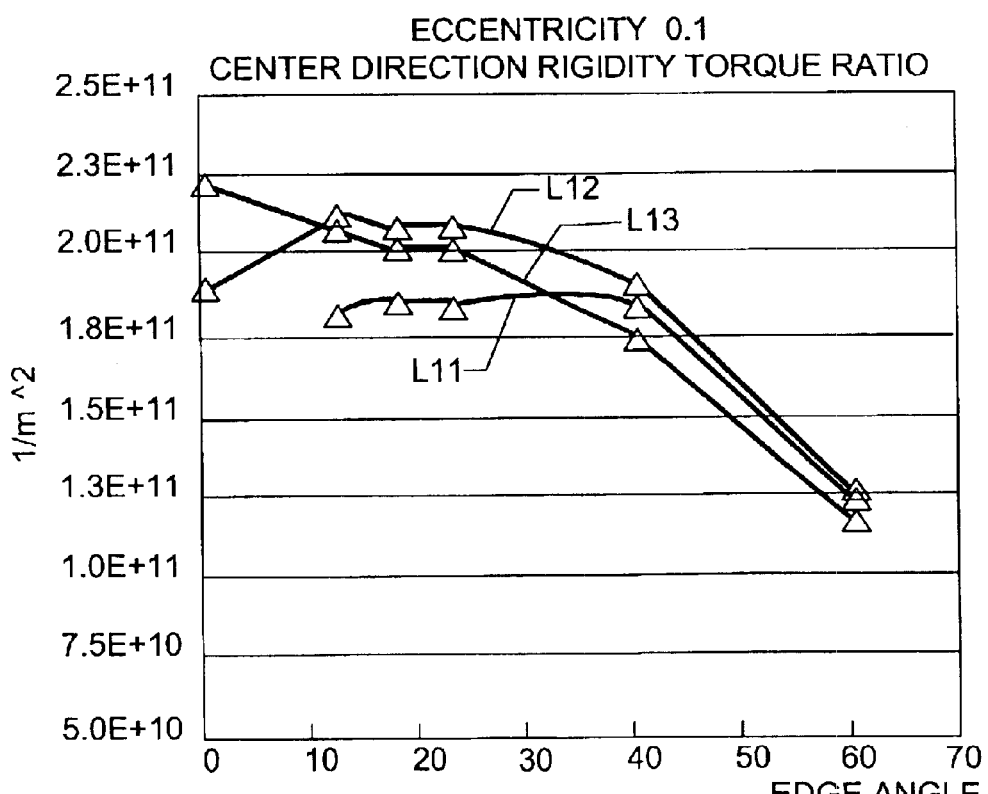
Figure 7C:
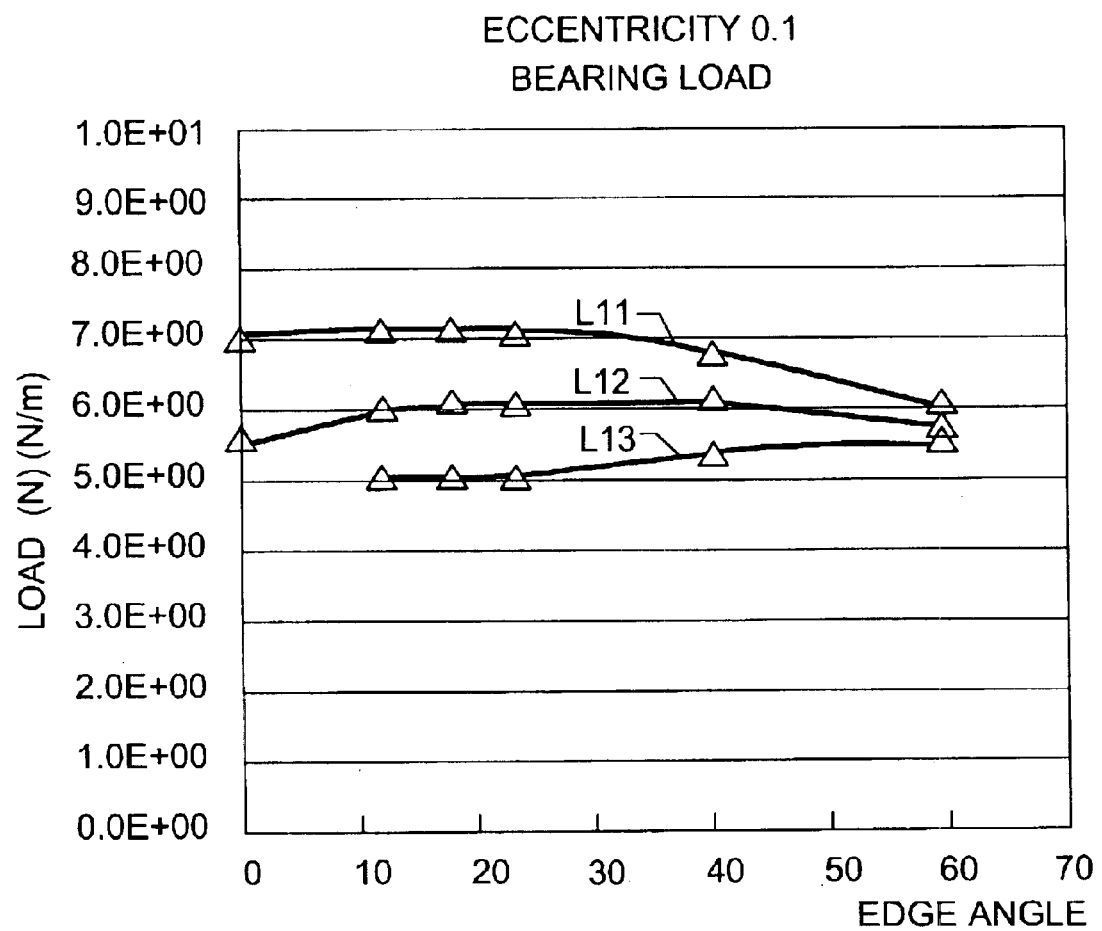

Among the results obtained by the examinations, the cases in which the number of the dynamic pressure generation parts 31 is three and the eccentricity is set in 0.9, 0.5, or 0.1 are respectively shown in FIGS. 5(A), (B), (C), FIGS. 6(A), (B), (C) and FIGS. 7(A), (B), (C). In these figures, while the circular angle $\theta$ 1 (see FIG. 4(A)) is 120° in the region where the dynamic pressure generation part 31 is formed, the data when the circular angles $\theta$ 2 of the protruded part 37 are set at 30°, 45° and 60° are shown with solid lines L 11, L 12, and L 13.

Figure 8A:
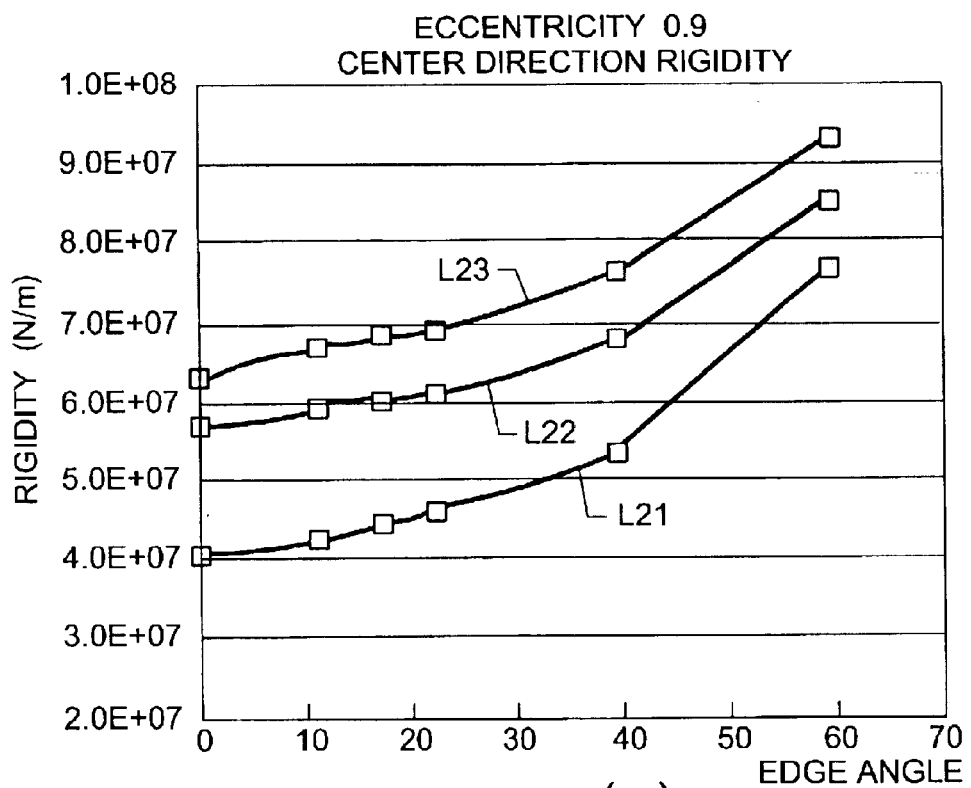
FIGS. 8(A), (B) and (C) are graphs which respectively show relations between an edge angle α and a center direction rigidity, center direction rigidity torque ratio and bearing load, with a parameter of the width of a protruded part, where the number of dynamic pressure generation parts is four and the eccentricity is 0.9 in the dynamic pressure bearing device shown in FIGS. 3 and 4.
Figure 8B:
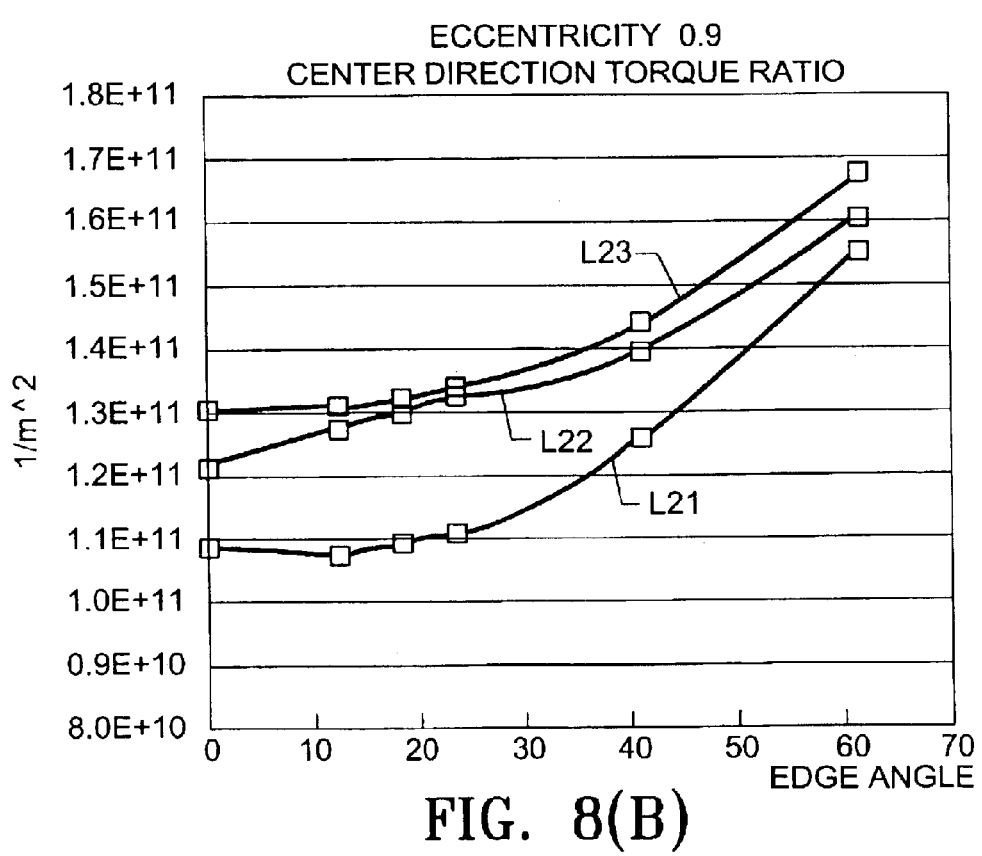
Figure 8C:
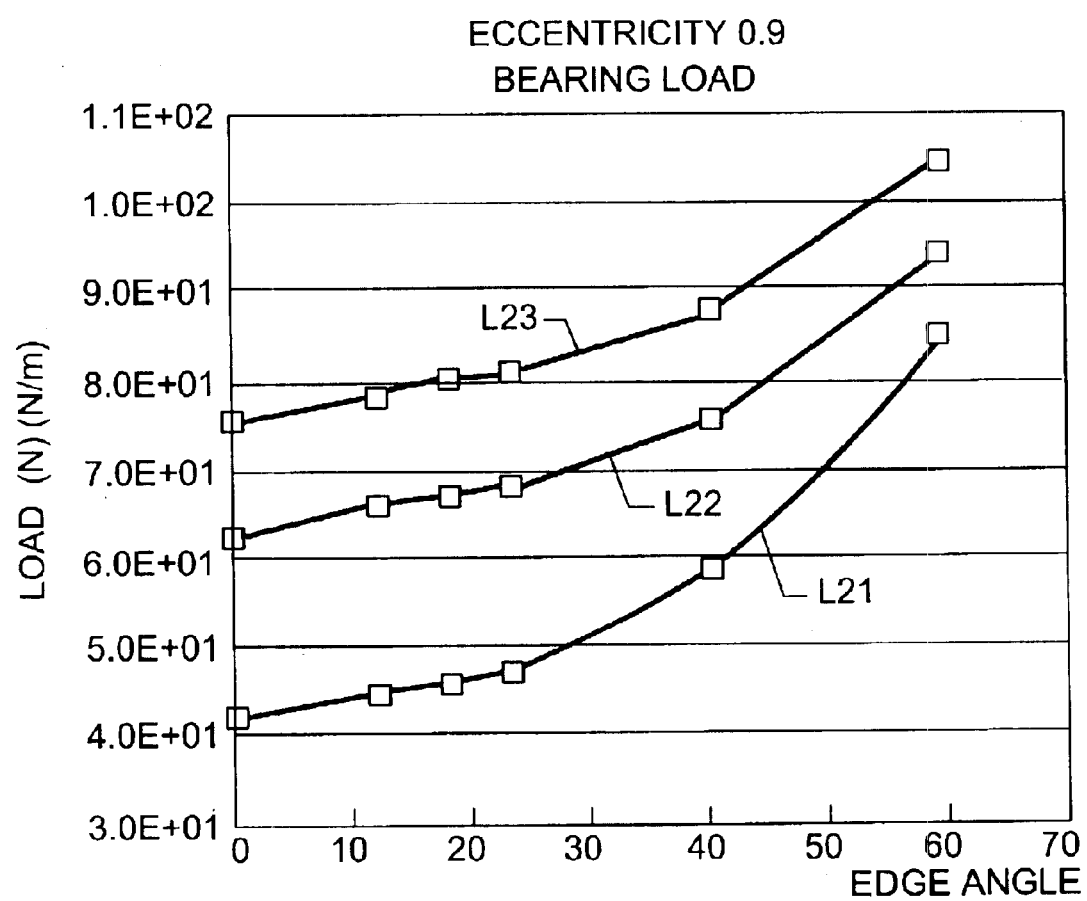
Figure 9A:
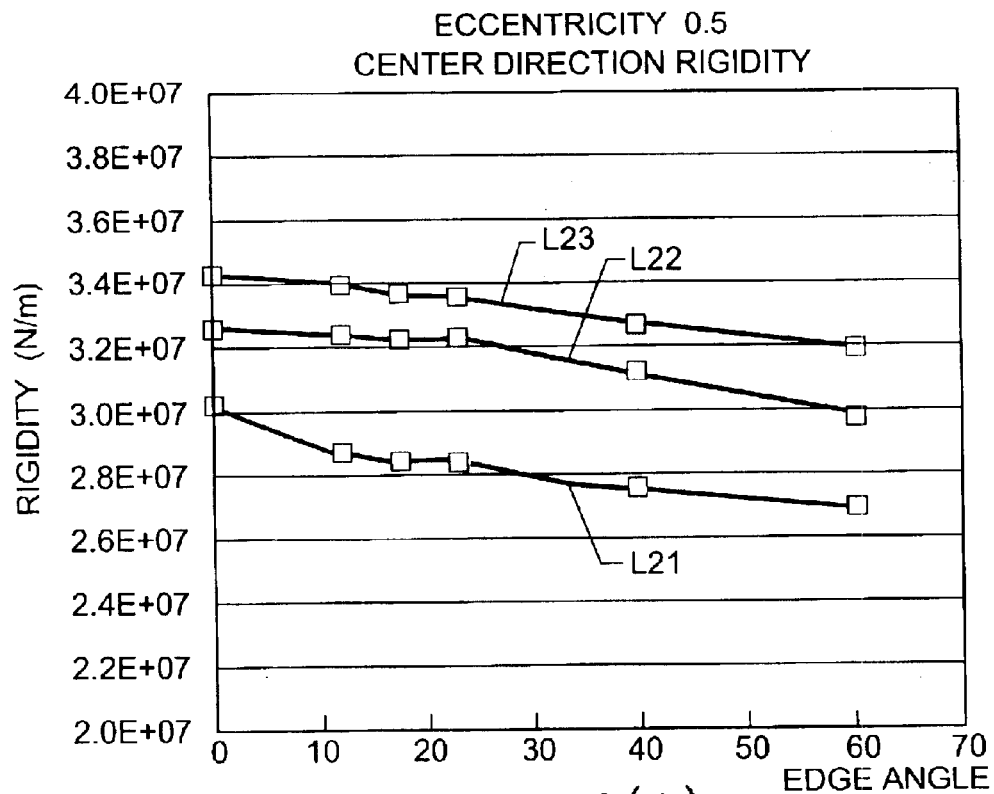
FIGS. 9(A), (B) and (C) are graphs which respectively show relations between an edge angle α and a center direction rigidity, center direction rigidity torque ratio and bearing load, with a parameter of the width of a protruded part, where the number of dynamic pressure generation part is four and the eccentricity is 0.5 in the dynamic pressure bearing device shown in FIGS. 3 and 4.
Figure 9B:
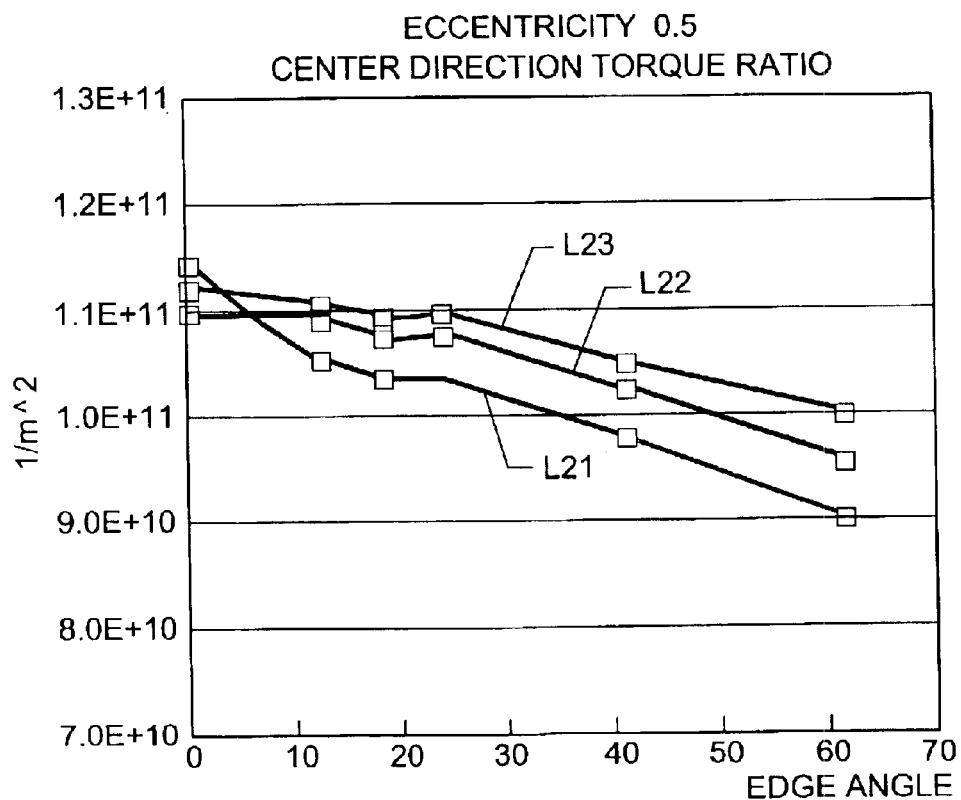
Figure 9C:
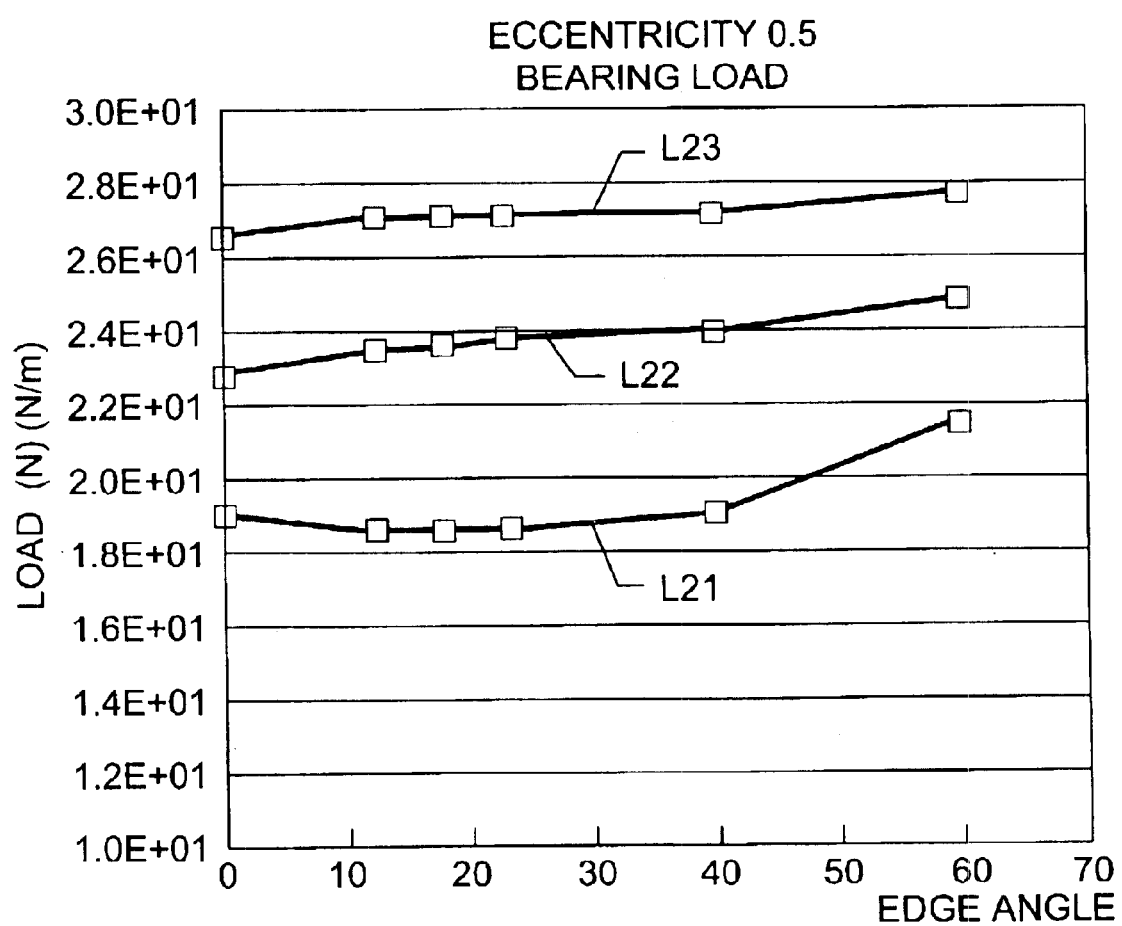
Figure 10A:
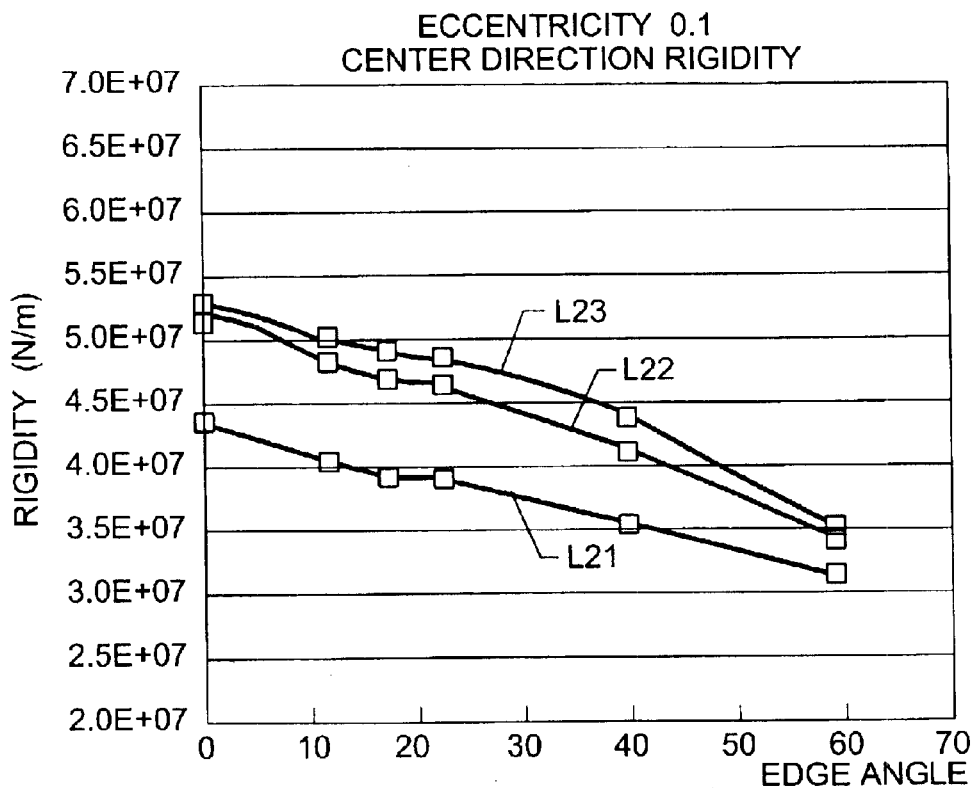
FIGS. 10(A), (B) and (C) are graphs which respectively show relations between an edge angle α and a center direction rigidity center direction rigidity torque ratio and bearing load, with a parameter of the width of a protruded part, where the number of dynamic pressure generation parts is four and the eccentricity is 0.1 in the dynamic pressure bearing device shown in FIGS. 3 and 4.
Figure 10B:
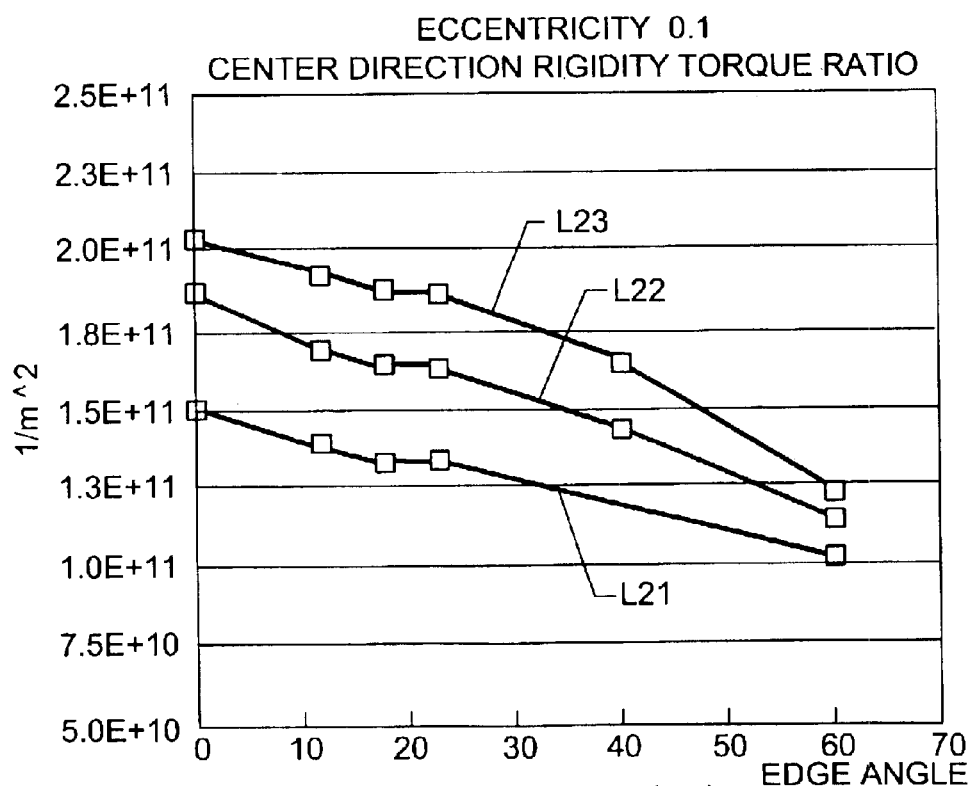
Figure 10C:
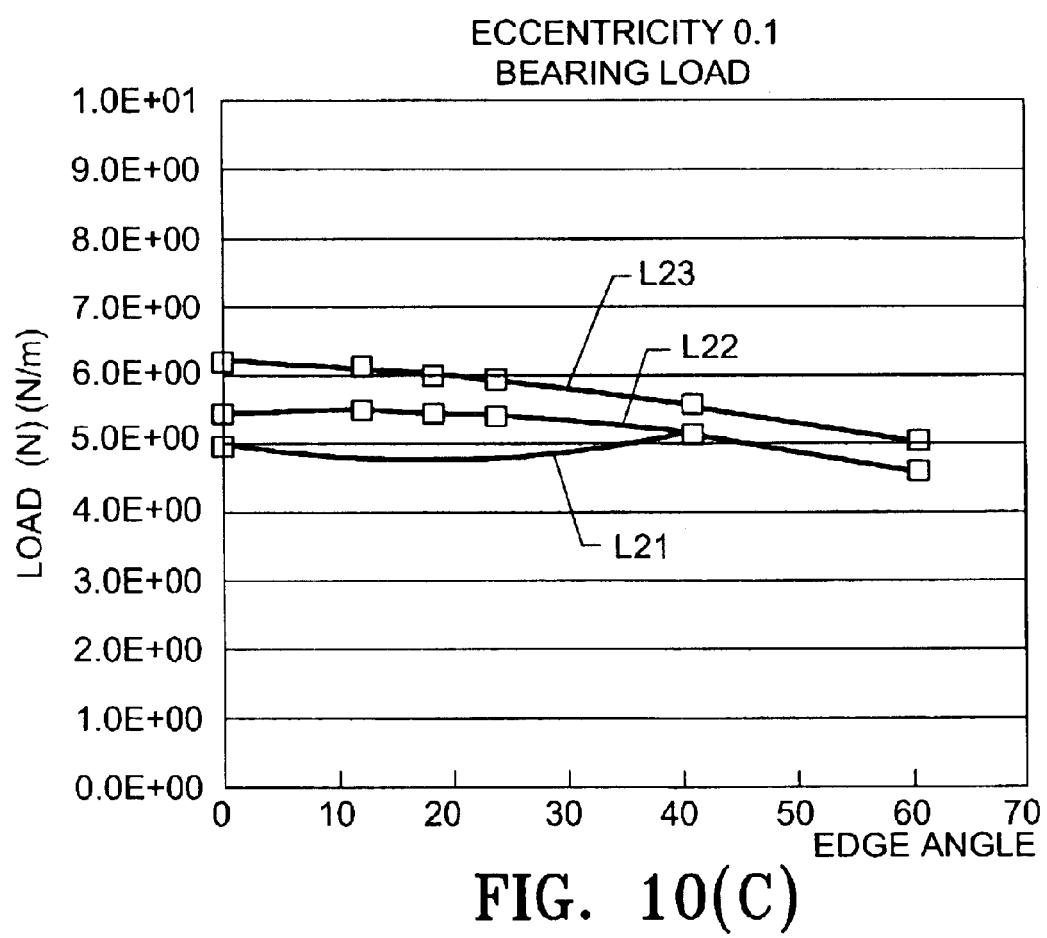

Among the results obtained by the examinations, the cases in which the number of the dynamic pressure generation parts 31 is four and the eccentricity is set in 0.9, 0.5, or 0.1 are respectively shown in FIGS. 8(A), (B), (C), FIGS. 9(A), (B), (C) and FIGS. 10(A), (B), (C). In these figures, while the circular angle $\theta$ 1 is 90°, the data when the circular angles $\theta$ 2 of the protruded part 37 are set at 21°, 36° and 45° are shown with solid lines L 21, L 22, and L 23.

Figure 11A:
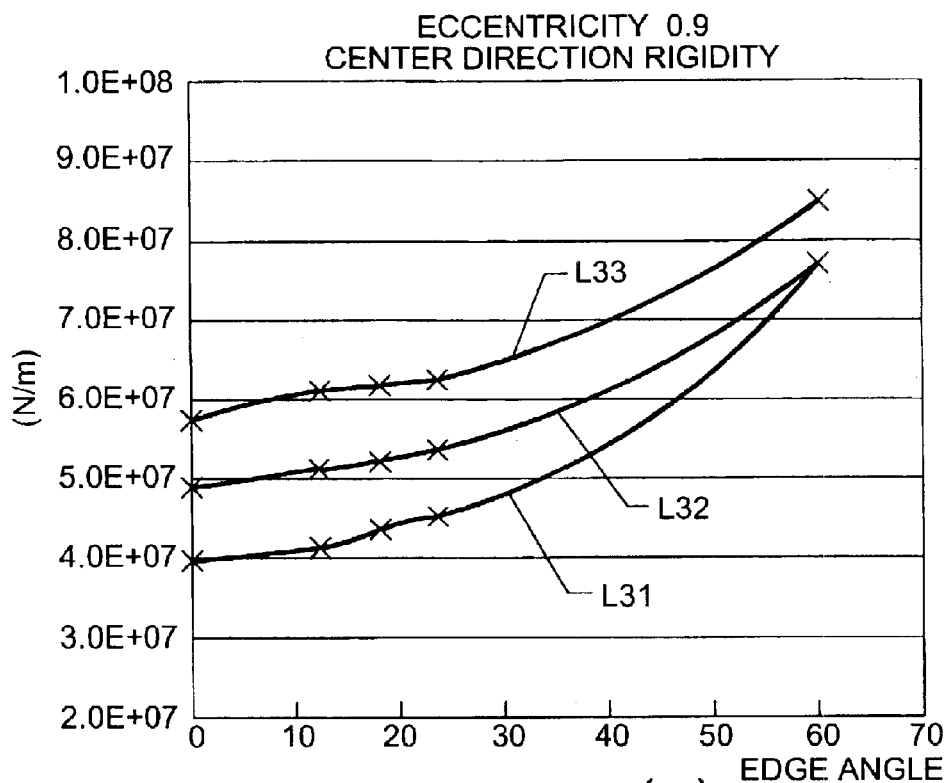
FIGS. 11(A), (B) and (C) are graphs which respectively show relations between an edge angle α and a center direction rigidity, center direction rigidity torque ratio and bearing load, with a parameter of the width of a protruded parts where the number of dynamic pressure generation parts is five and the eccentricity is 0.9 in the dynamic pressure bearing device shown in FIGS. 3 and 4.
Figure 11B:
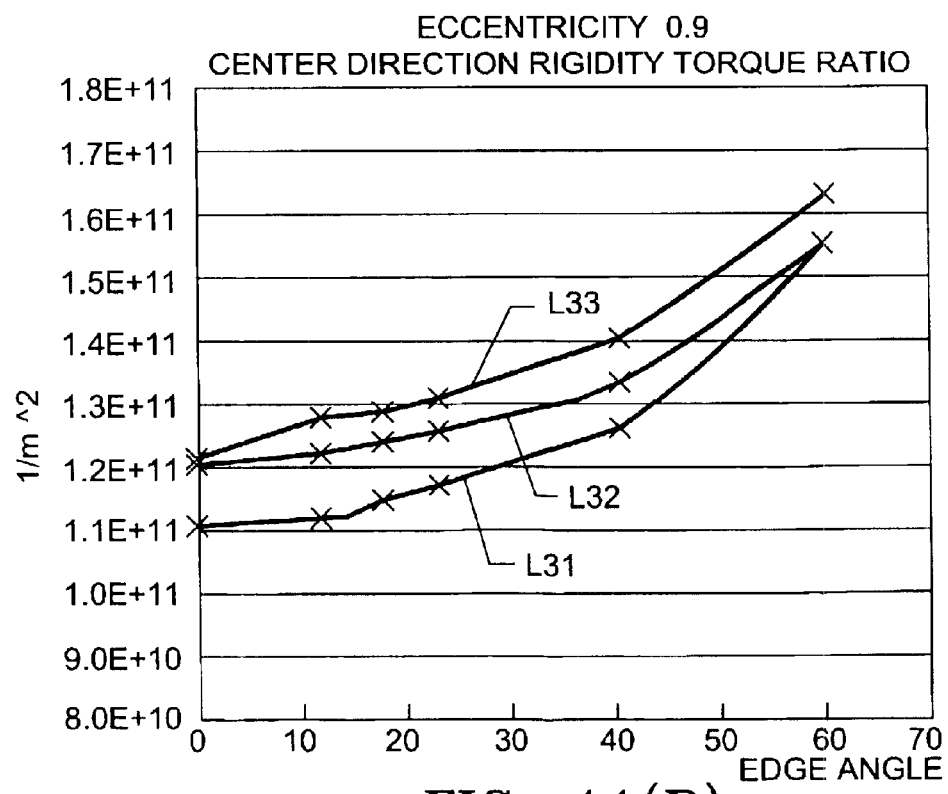
Figure 11C:
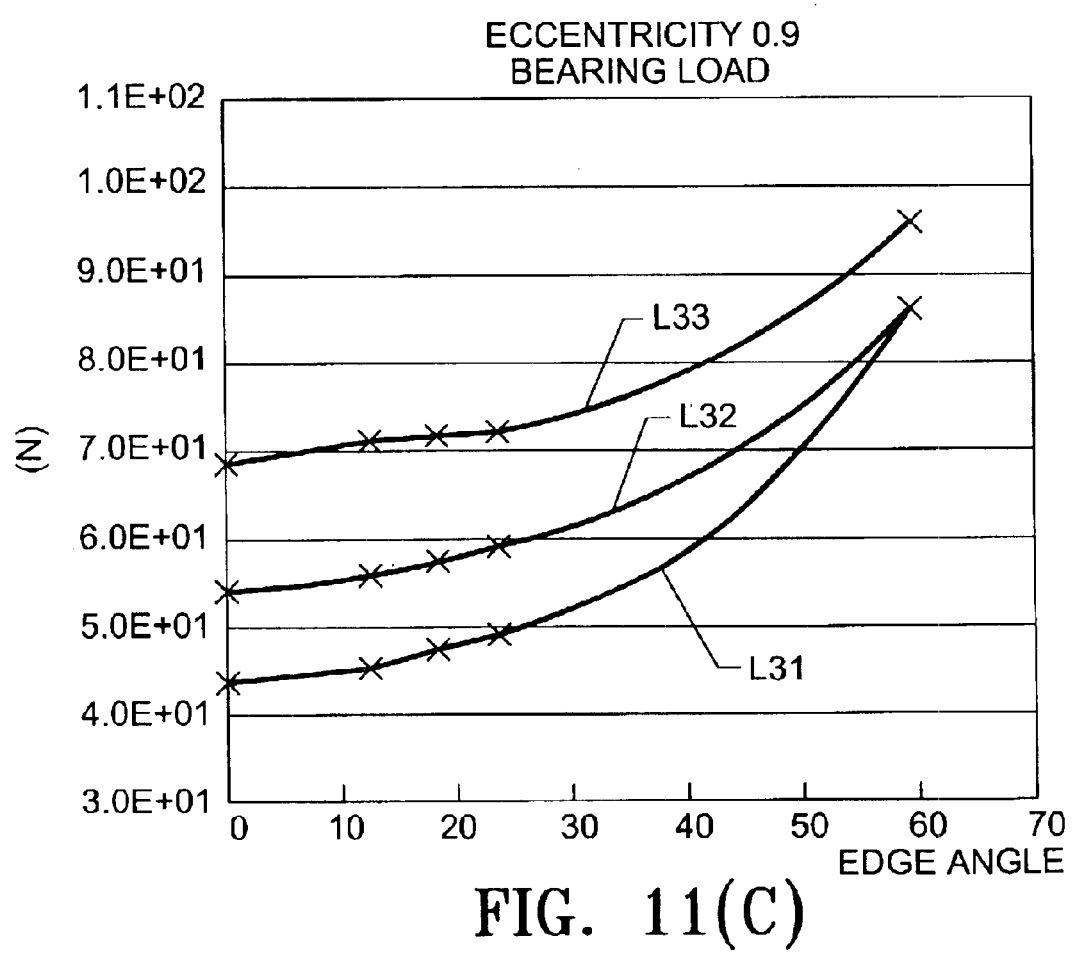
Figure 12A:
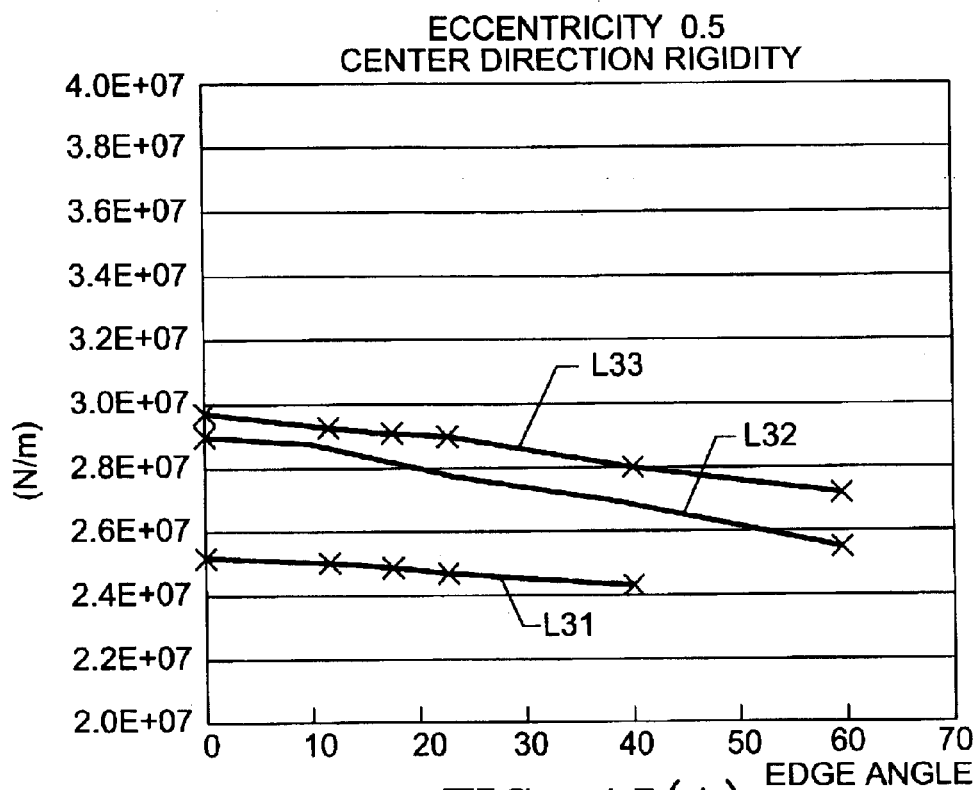
FIGS. 12(A), (B) and (C) are graphs which respectively show relations between an edge angle α and a center direction rigidity, center direction rigidity torque ratio and bearing load, with a parameter of the width of a protruded part, where the number of dynamic pressure generation parts is five and the eccentricity is 0.5 in the dynamic pressure bearing device shown in FIGS. 3 and 4.
Figure 12B:
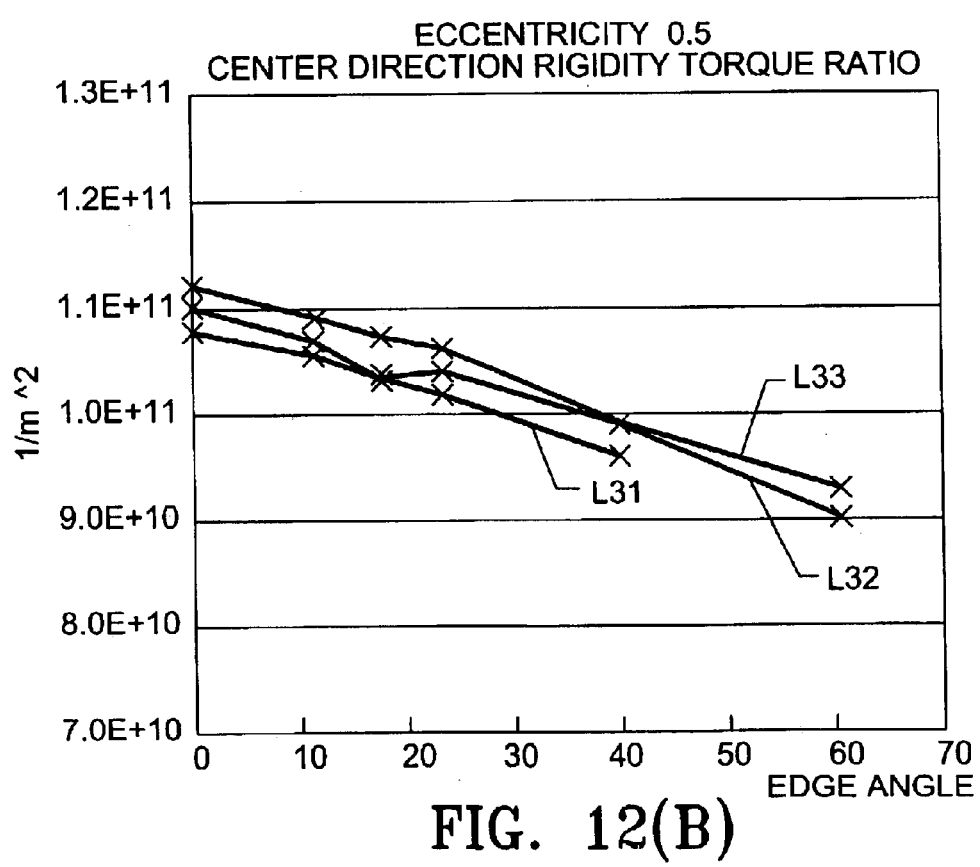
Figure 12C:
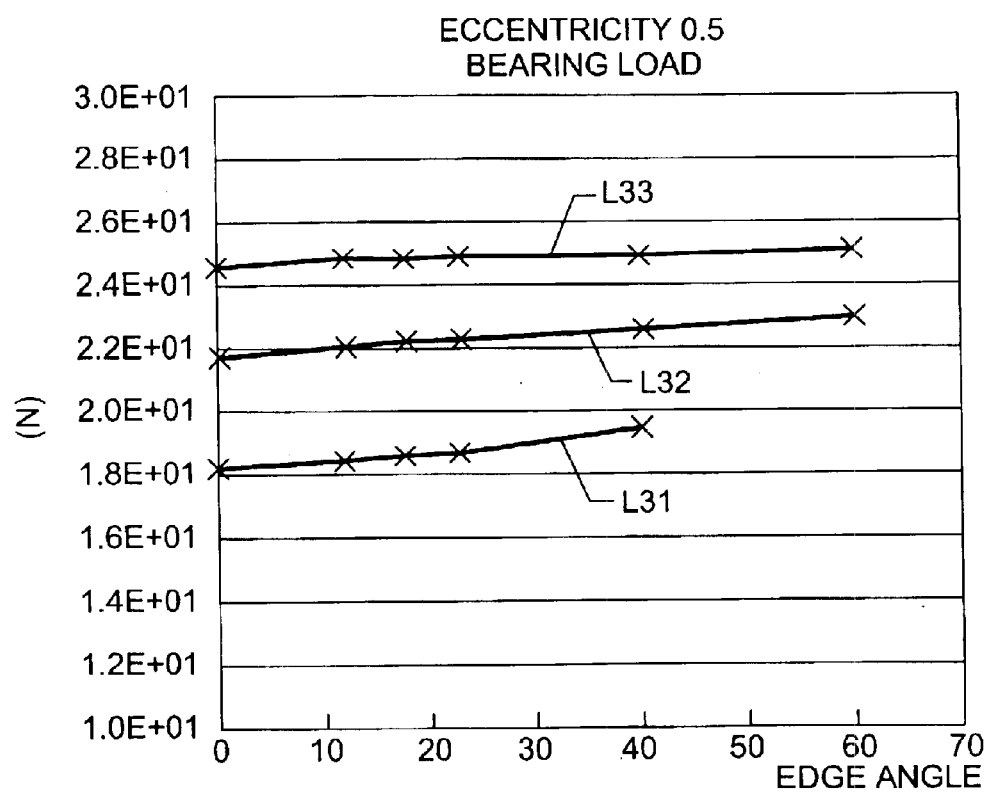
Figure 13A:
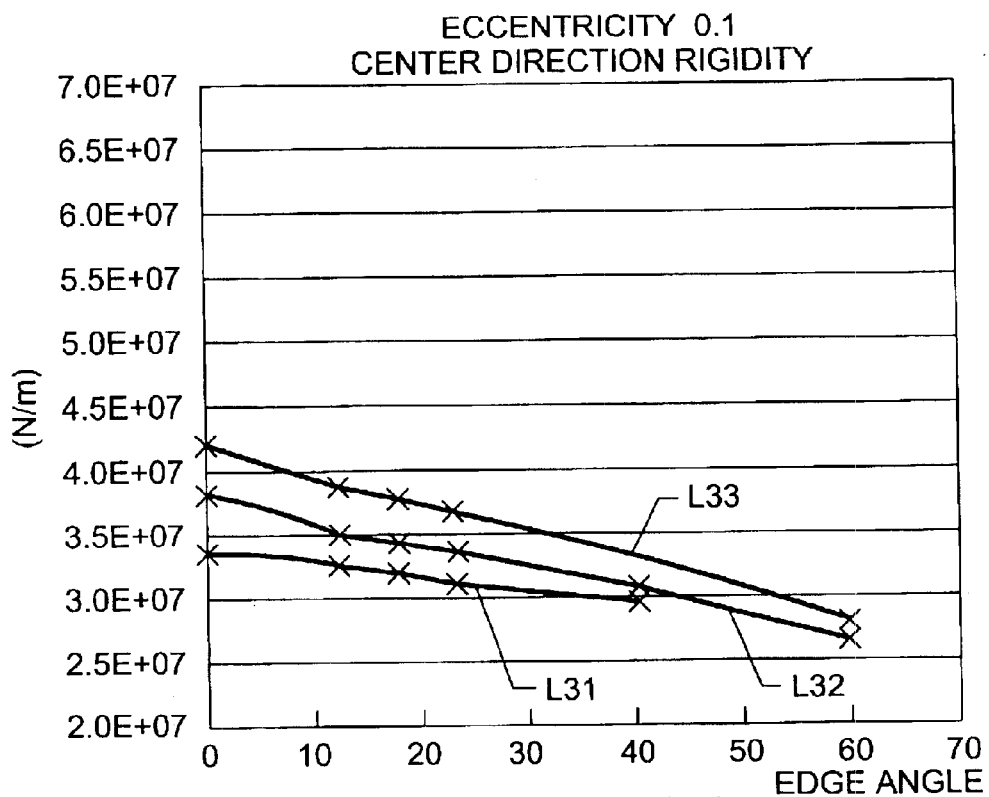
FIGS. 13(A), (B) and (C) are graphs which respectively show relations between an edge angle α and a center direction rigidity, center direction rigidity torque ratio and bearing load, with a parameter of the width of a protruded part, where the number of dynamic pressure generation parts is five and the eccentricity is 0.1 in the dynamic pressure bearing device shown in FIGS. 3 and 4.
Figure 13B:
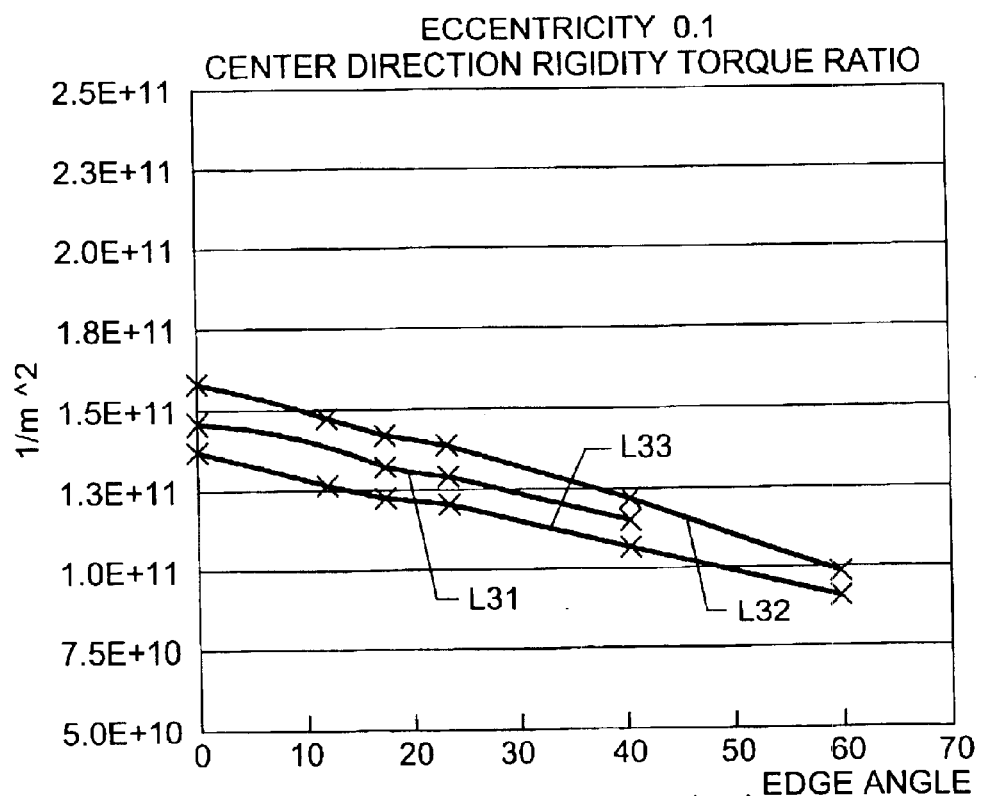
Figure 13C:
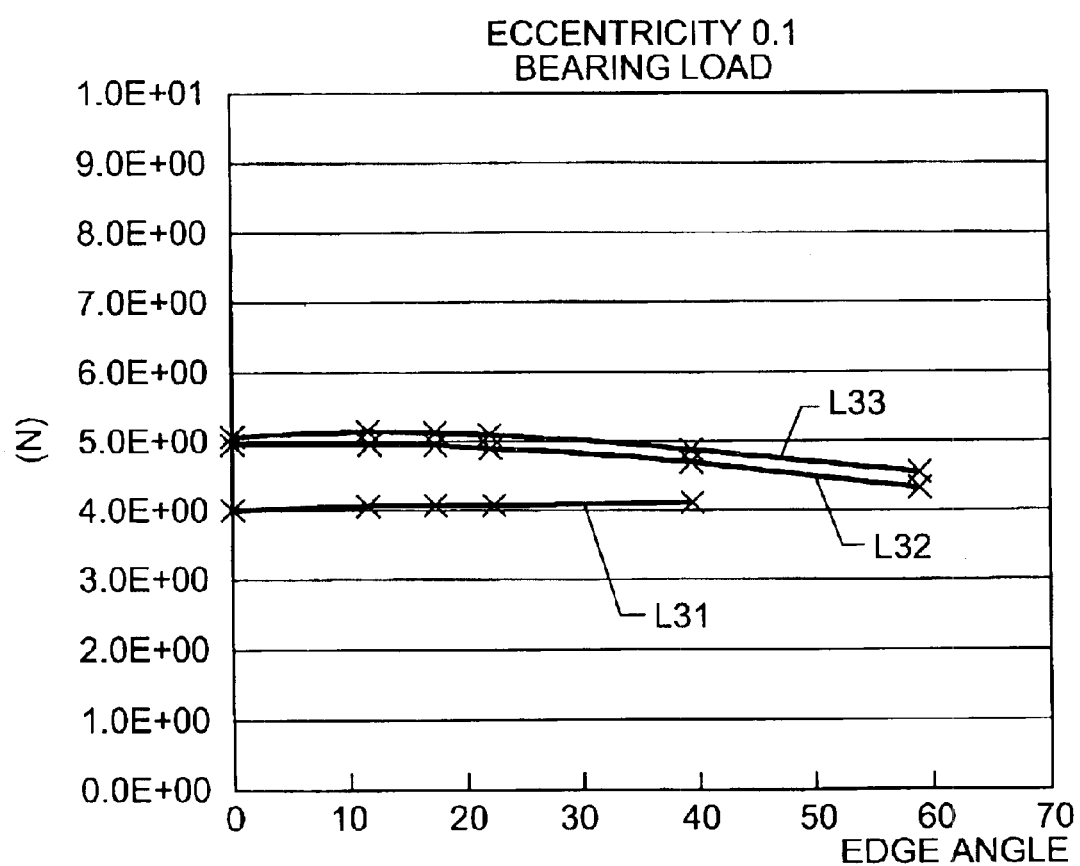

Further, the cases in which the number of the dynamic pressure generation parts 31 is five and the eccentricity is set in 0.9, 0.5, or 0.1 are respectively shown in FIGS. 11(A), (B), (C), FIGS. 12(A), (B), (C) and FIGS. 13 (A), (B), (C). In these figures, while the circular angle $\theta$ 1 is 72°, the data when the circular angles $\theta$ 2 of the protruded part 37 are set at 9°, 18° and 27° are shown with solid lines L 31, L 32, and L 33.

The eccentricity is the value wherein the distance between the center of the bearing sleeve 15 and the center of the rotation shaft 15 is divided by the radial gap between them. Accordingly, the eccentricity is 1.0 when the rotation shaft 21 comes into contact with the bearing sleeve 16, and the eccentricity is 0.0 when the rotation shaft 21 is positioned at the center of the bearing sleeve 15 by the dynamic pressure. The eccentricity at a normal rotational state is in the range of 0.2 to 0.4. The center direction rigidity represents the rigidity in the center direction that acts as a real dynamic pressure, and thus the larger the rigidity, the deflection due to disturbances is reduced. Also, the center direction rigidity torque ratio is the value where the center direction rigidity is divided by the friction torque, which represents the efficiency. The larger the value of the torque ratio is, the more efficient is the dynamic pressure bearing device. A side-leakage represents the leakage of air or oil in the axial direction, and therefore the smaller side-leakage is preferable. The conventional dynamic pressure bearing device having the recessed separation grooves described above has a problem that such a side-leakage is remarkably large.

Judging from these examination results, since the region which is adjacent to the dynamic pressure generation part 31 on the shaft end side is formed in the perfect circle part 36, the rigidity in the center direction becomes large, and thus the center direction rigidity and the center direction rigidity torque can be in a high level.

When the number of the dynamic pressure generation parts 31 is set in three to five regions, the center direction rigidity is reduced accordingly as the edge angle $\alpha$ is increased in the case of the eccentricity at 0.1 or 0.5. However, the center direction rigidity is increased when the eccentricity is 0.9. Such a tendency is also similar to the center direction rigidity torque. In addition, this tendency becomes outstanding when the number of the dynamic pressure generation parts 31 is three and the region of the protruded part 37 is smaller.

The bearing load has a tendency that it is not much affected by the edge angle $\alpha$ when the eccentricity in 0.1 or 0.5 but the bearing load increases accordingly as the edge angle $\alpha$ is increased in the case of the eccentricity at 0.9. This tendency is similar to the center direction rigidity torque. This tendency is outstanding when the number of the dynamic pressure generation parts 31 is three and the region of the protruded part 37 is narrower.

As a result, the bearing load can be increased accordingly as the edge portion 351 of the recessed part 35 is formed more oblique and the edge angle $\alpha$ is increased. Accordingly, since the floating frequency beginning to float by the dynamic pressure can be decreased, the metal-to-metal contact between the rotation shaft 21 and the bearing sleeve 15 is reduced at starting or stopping time of a motor. Therefore, the reliability of the dynamic pressure bearing device 30 can be improved.

(Number of Dynamic Pressure Generation Parts, Width of Protruded Part and Edge Angle)

Next, the present inventors have examined the relations of the circular angle θ 2 of the protruded part 37 and the edge angle α with respect to the center direction rigidity, the center direction rigidity torque ratio, the bearing load and the side-leakage when the eccentricity is changed, where the number of the dynamic pressure generation parts 31 is three, four or five and the axial width of the perfect circle part 36 is 2 mm.

Figure 14A:
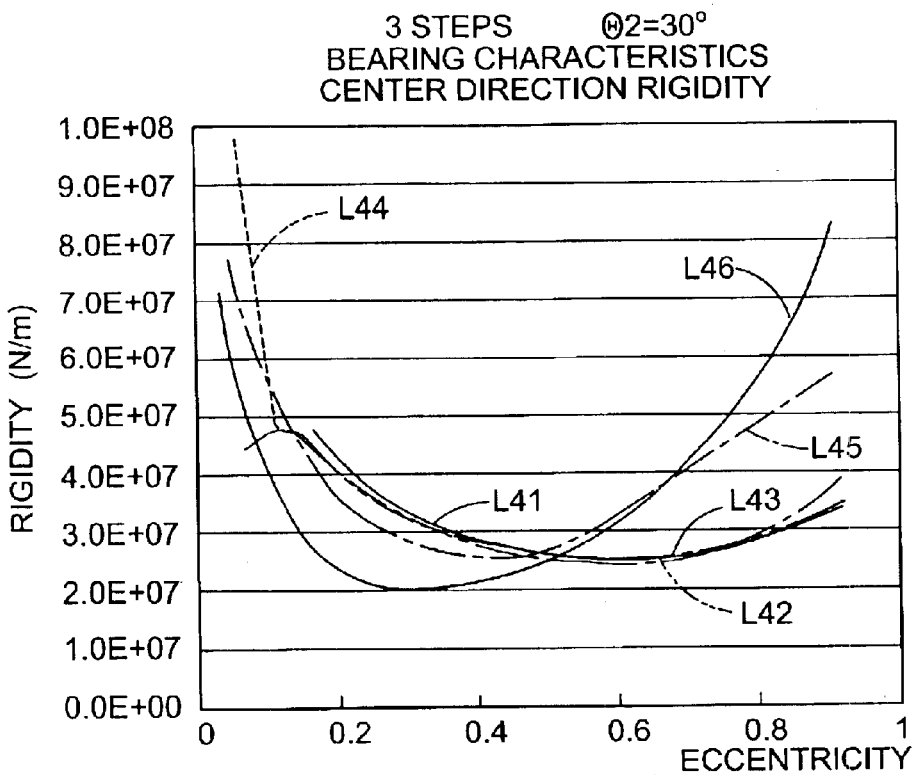
FIGS. 14(A), (B), (C) and (D) are graphs which respectively show relations between an eccentricity and a center direction rigidity, center direction rigidity torque ratio, bearing load, and side-leakage width a parameter of an edge angle α, where the number of dynamic pressure generation parts is three and the circular angle of a protruded part is 30° in the dynamic pressure bearing device shown in FIGS. 3 and 4.
Figure 14B:
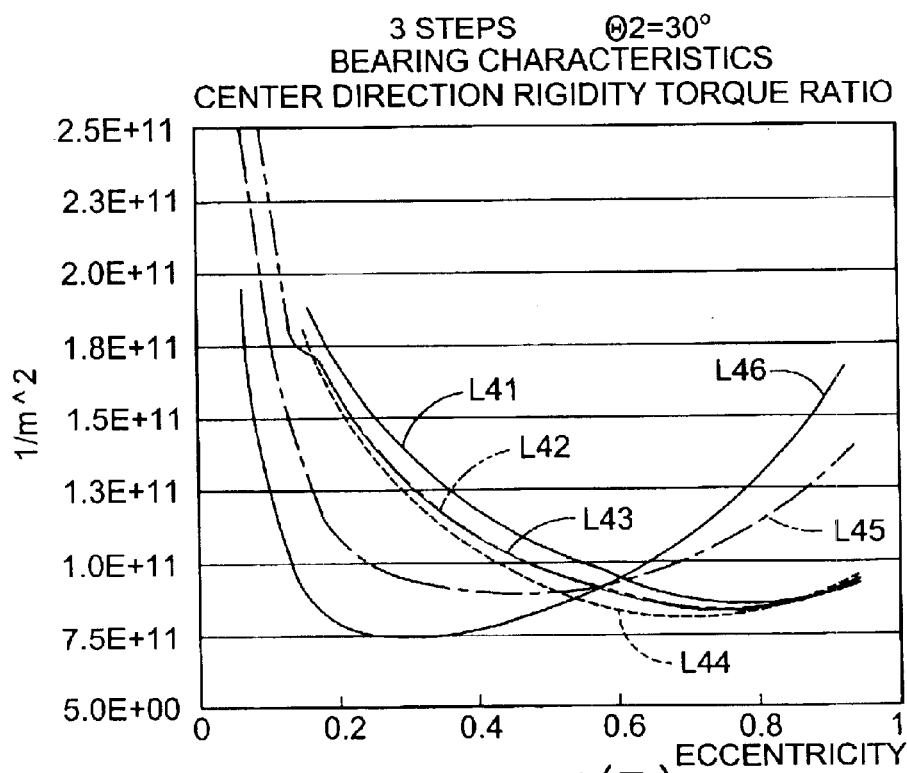
Figure 14C:
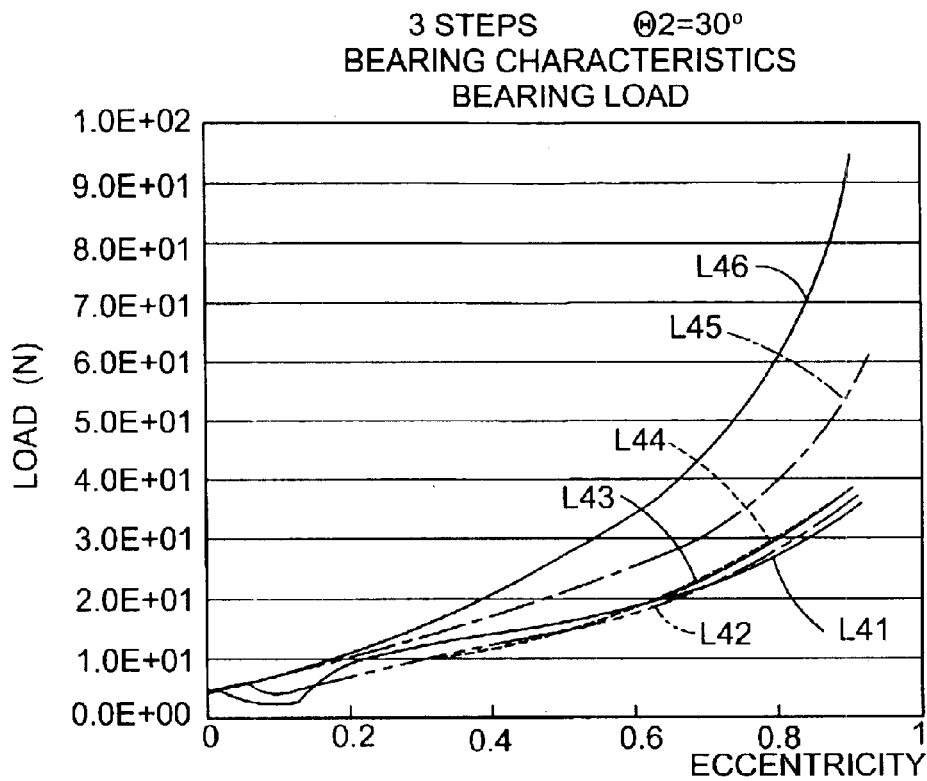
Figure 14D:
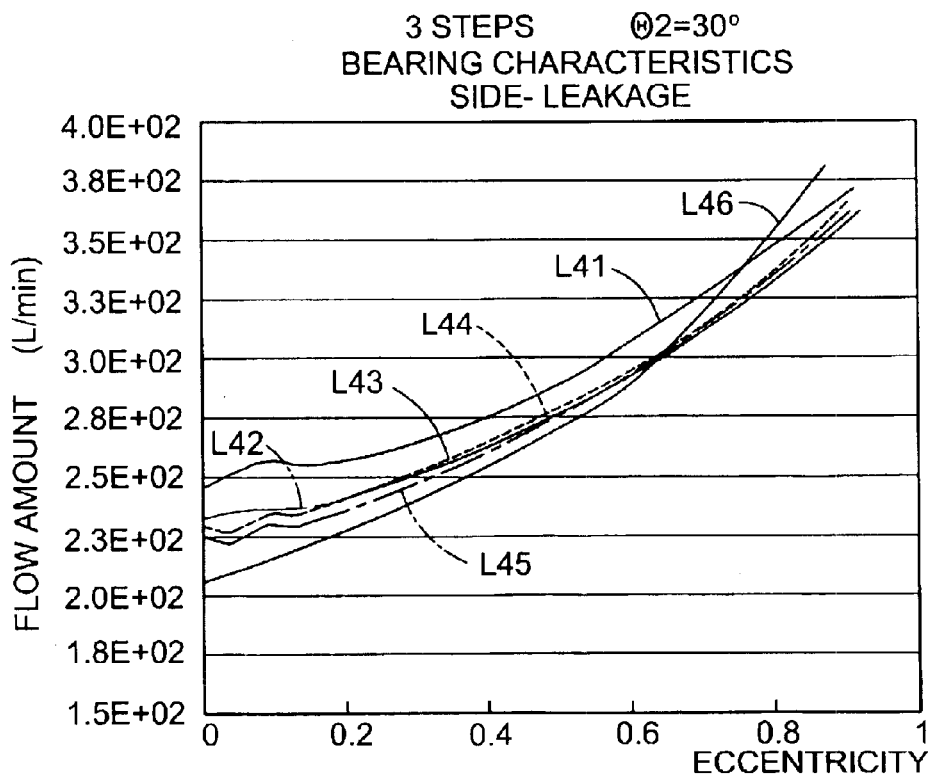
Figure 15A:
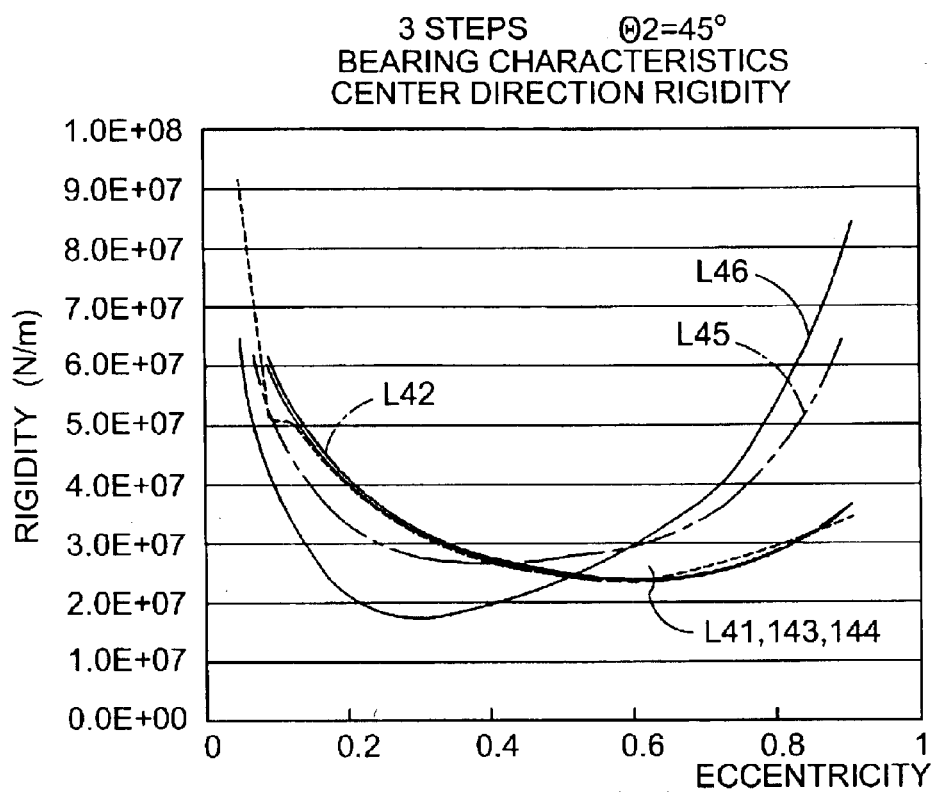
FIGS. 15(A), (B), (C) and (D) are graphs which respectively show relations between an eccentricity and a center direction rigidity, center direction rigidity torque ratio, bearing load, and side-leakage with a parameter of an edge angle α, where the number of dynamic pressure generation parts is three and the circular angle of a protruded part is 45° in the dynamic pressure bearing device shown in FIGS. 3 and 4.
Figure 15B:
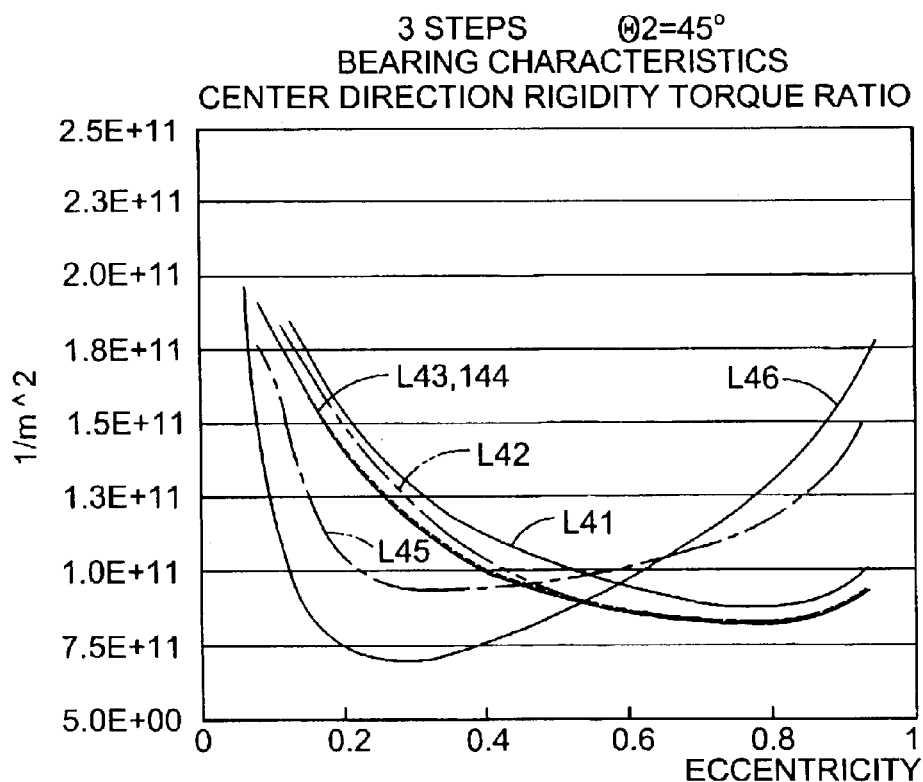
Figure 15C:
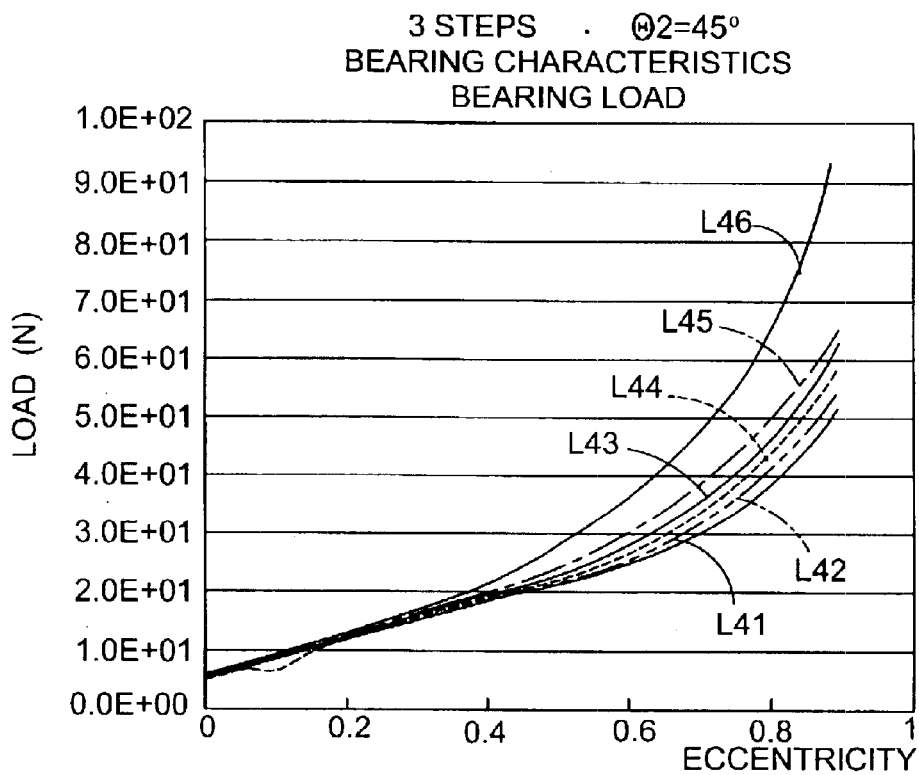
Figure 15D:
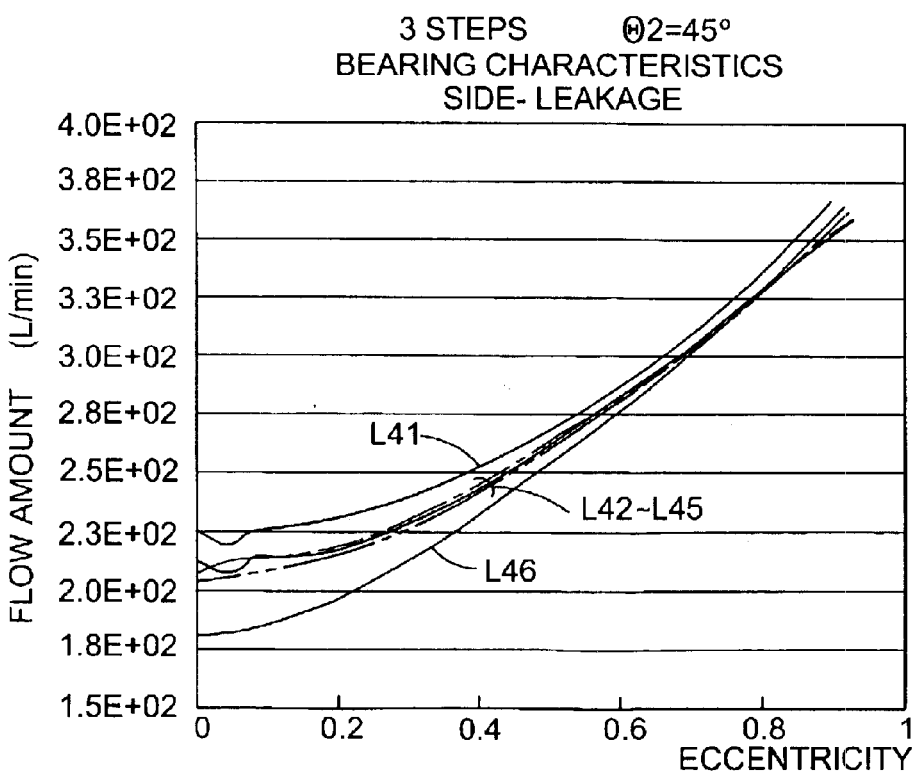
Figure 16A:
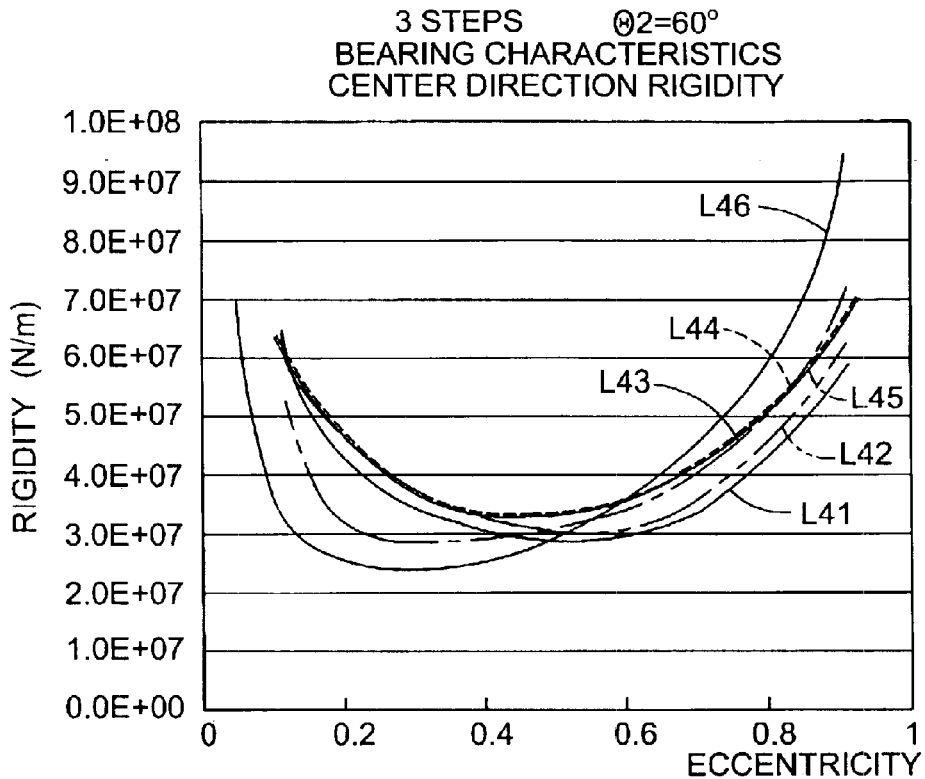
FIGS. 16(A), (B), (C) and (D) are graphs which respectively show relations between an eccentricity and a center direction rigidity, center direction rigidity torque ratio, bearing load, and side-leakage with a parameter of an edge angle α, where the number of dynamic pressure generation parts is three and the circular angle of a protruded part is 60° in the dynamic pressure bearing device shown in FIGS. 3 and 4.
Figure 16B:
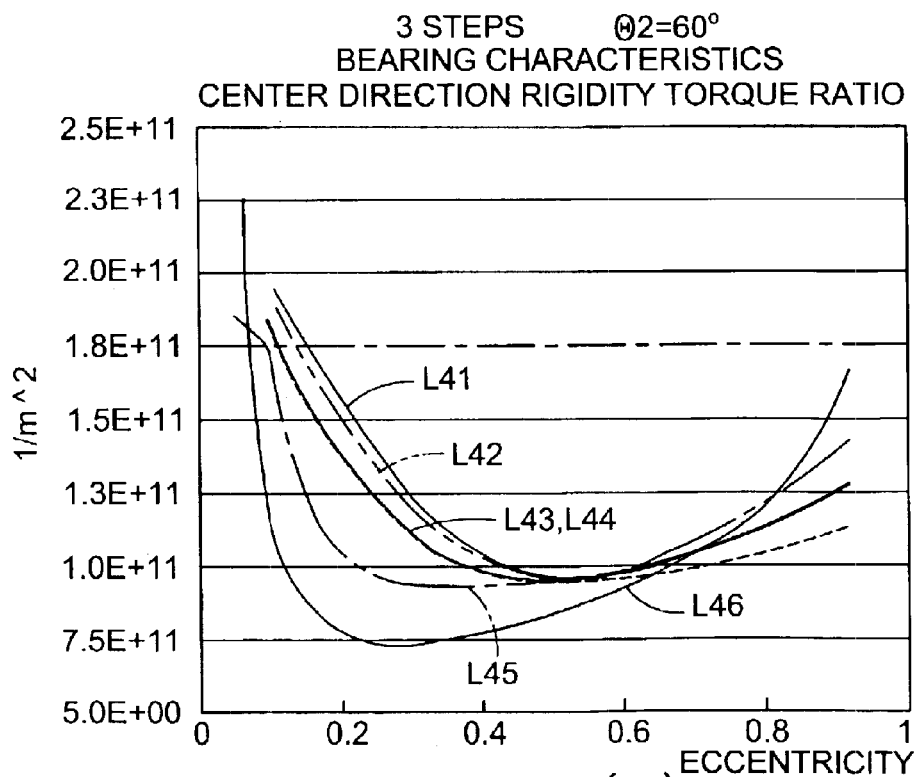
Figure 16C:
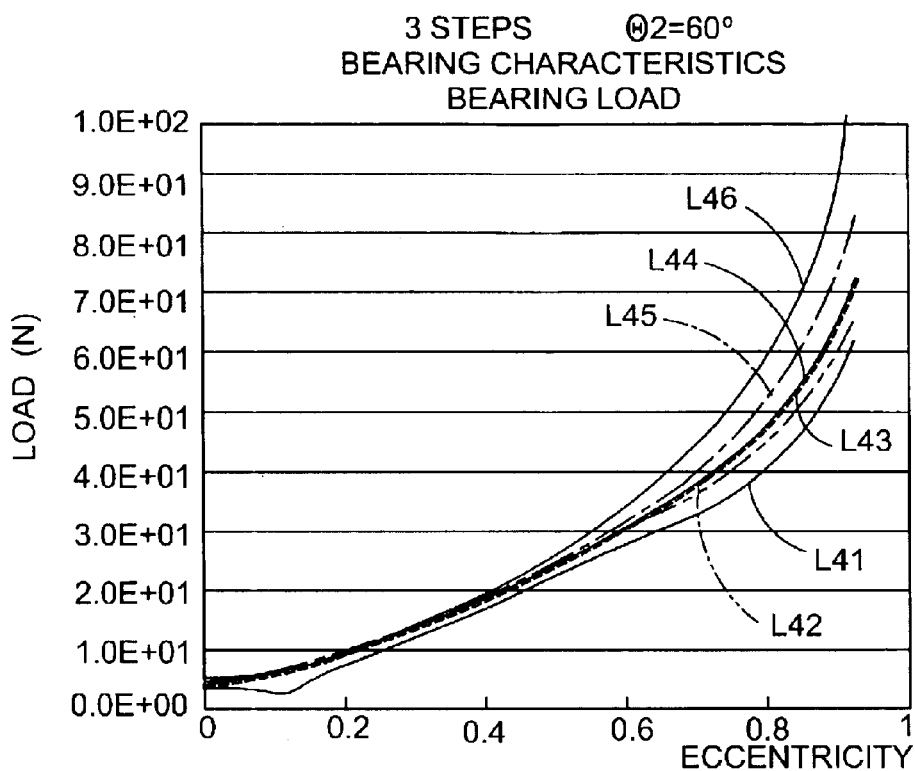
Figure 16D:
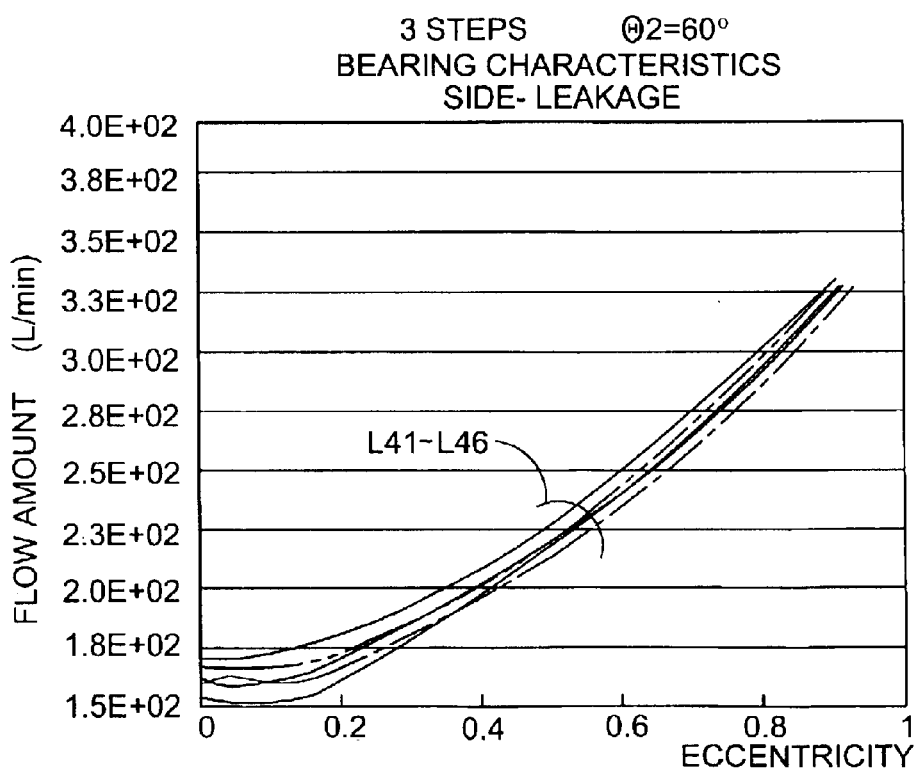

Among the results obtained by the examinations, the cases in which the number of the dynamic pressure generation parts 31 is three and the circular angles θ 2 of the protruded part 37 are set at 30°, 45° and 60° are respectively shown in FIGS. 14(A), (B), (C), (D), FIGS. 15(A), (B), (C), (D), and FIGS. 16(A), (B), (C), (D). In these figure, the data when the edge angles α are set at 0°, 12°, 17.7°, 23°, 40°, 60° are respectively shown in a solid line L41, a two-dot chain line L42, a solid line L43, a dotted line L44, an alternate long and short dash line L45 and a solid line L46.

Figure 17A:
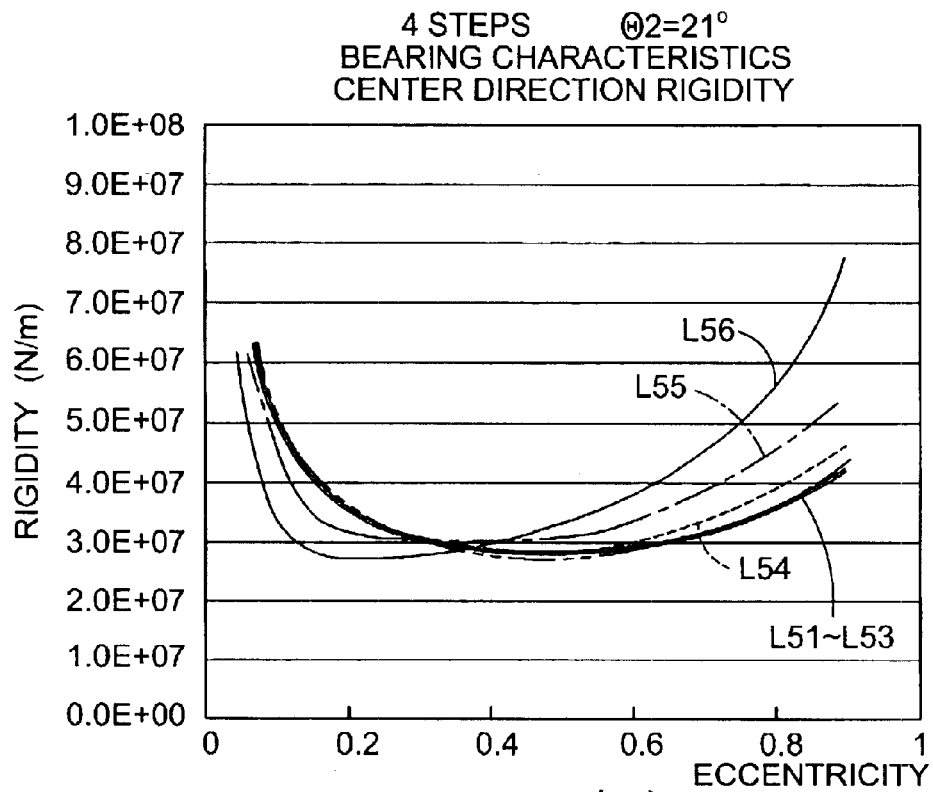
FIGS. 17(A), (B), (C) and (D) are graphs which respectively show relations between an eccentricity and a center direction rigidity, center direction rigidity torque ratio, bearing load, and side-leakage with a parameter of an edge angle α, where the number of dynamic pressure generation parts is four and the circular angle of a protruded part is 21° in the dynamic pressure bearing device shown in FIGS. 3 and 4.
Figure 17B:
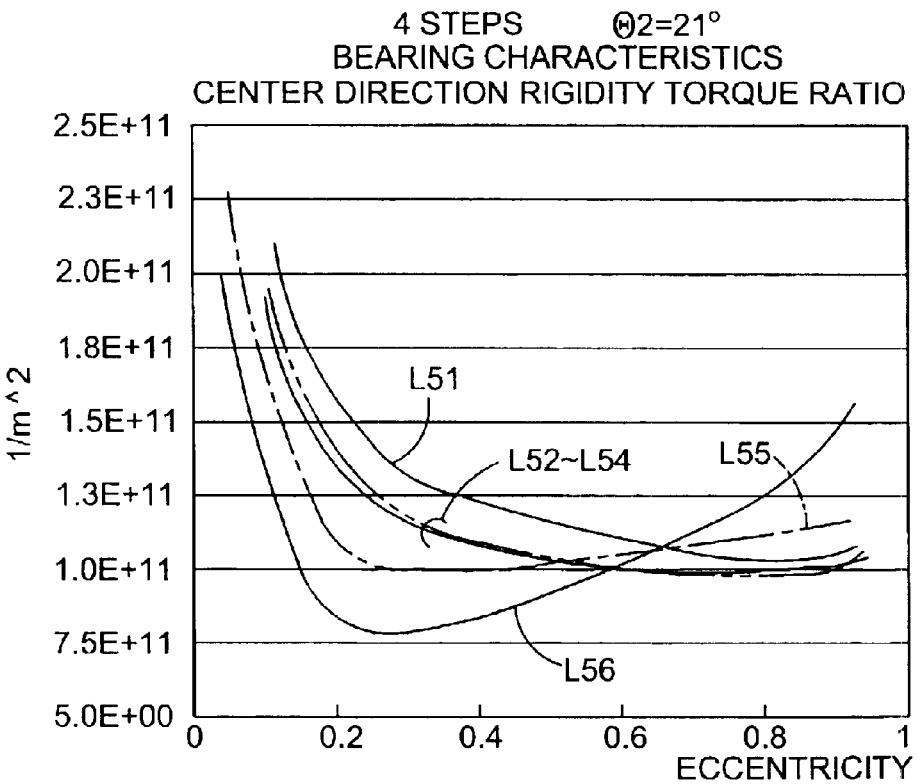
Figure 17C:
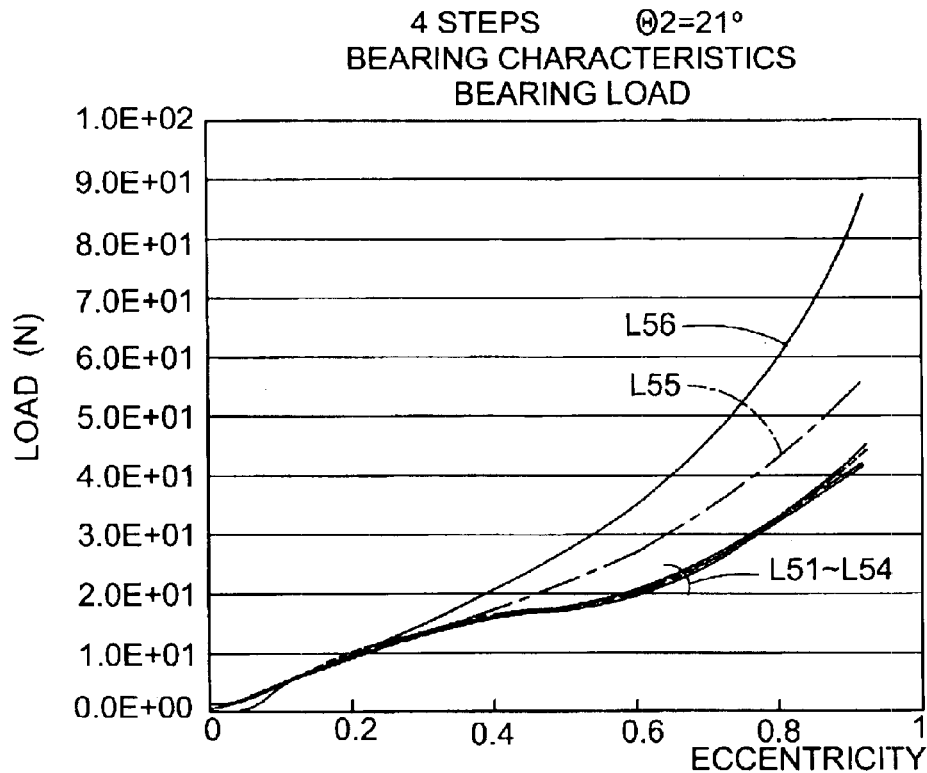
Figure 17D:
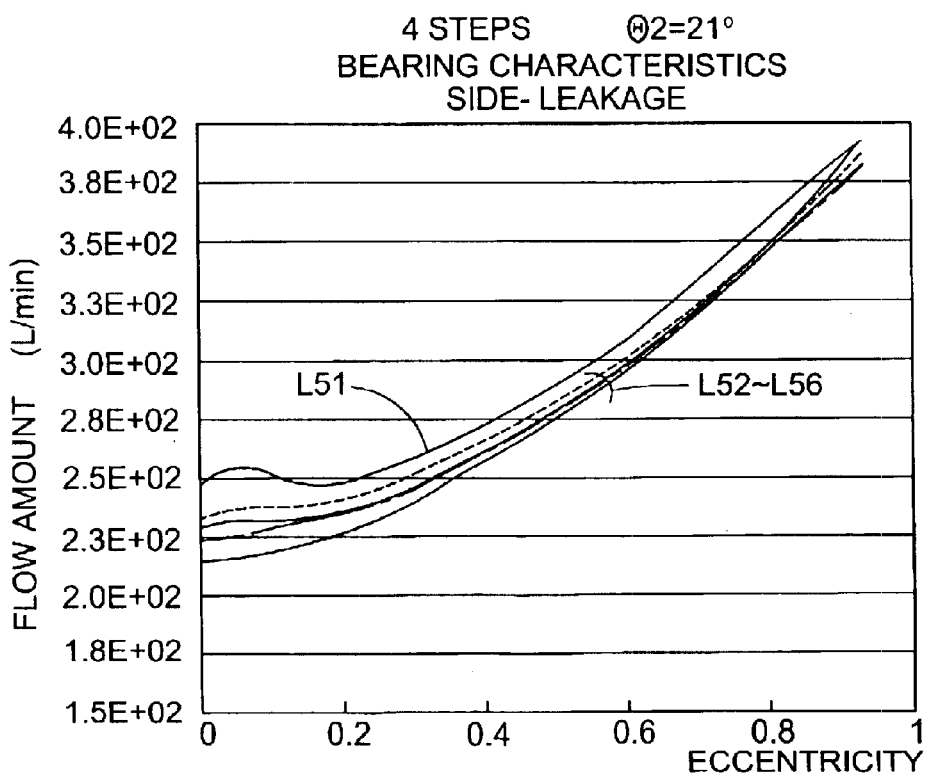
Figure 18A:
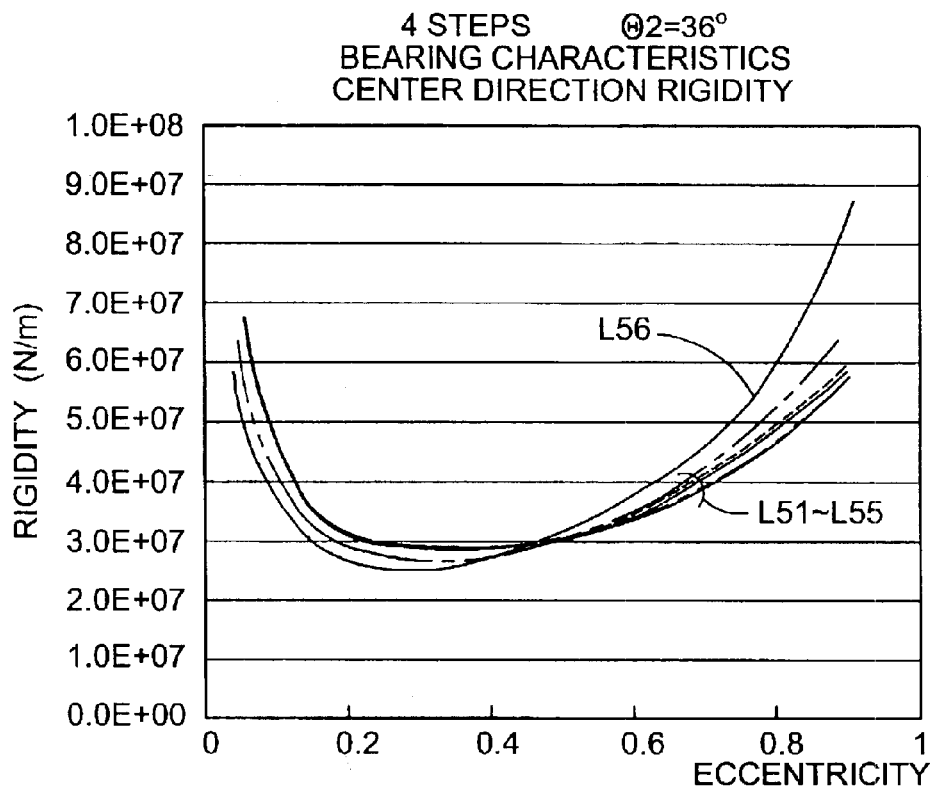
FIGS. 18(A), (B), (C) and (D) are graphs wash respectively show relations between an eccentricity and a center direction rigidity, center direction rigidity torque ratio, bearing load, and side-leakage with a parameter of an edge angle α, where the number of dynamic pressure generation parts is four and the circular angle of a protruded part is 36° in the dynamic pressure bearing device shown in FIGS. 3 and 4.
Figure 18B:
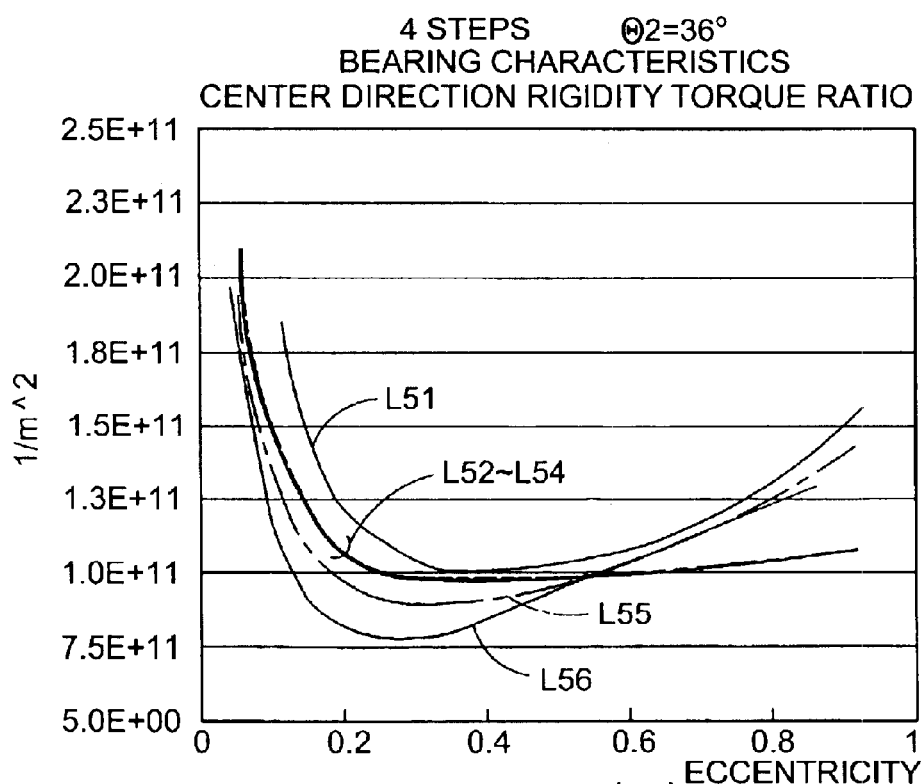
Figure 18C:
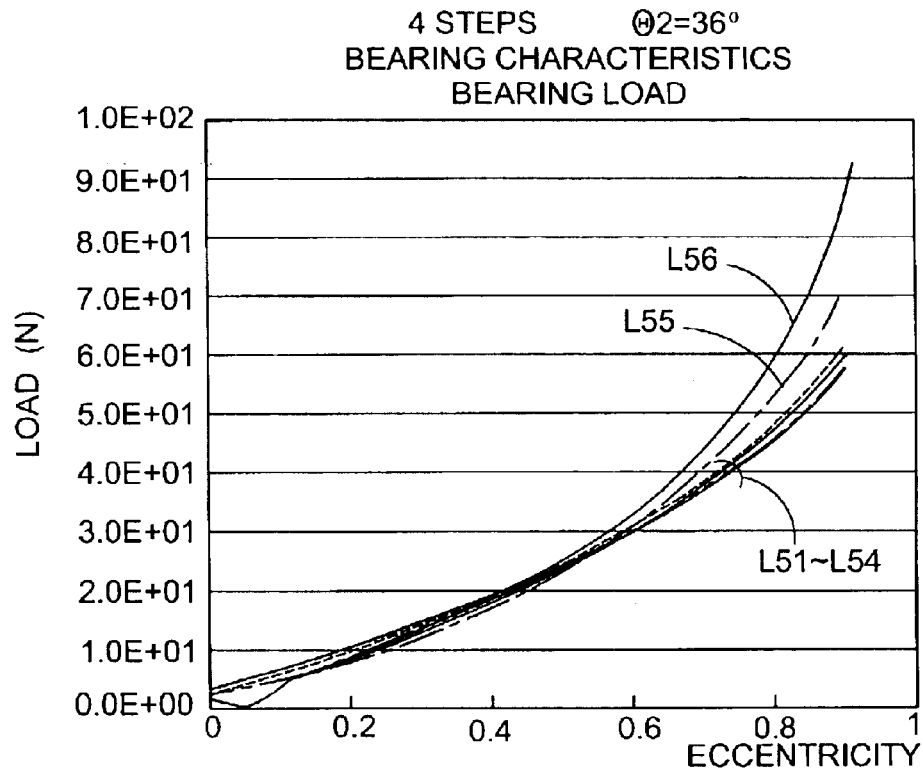
Figure 18D:
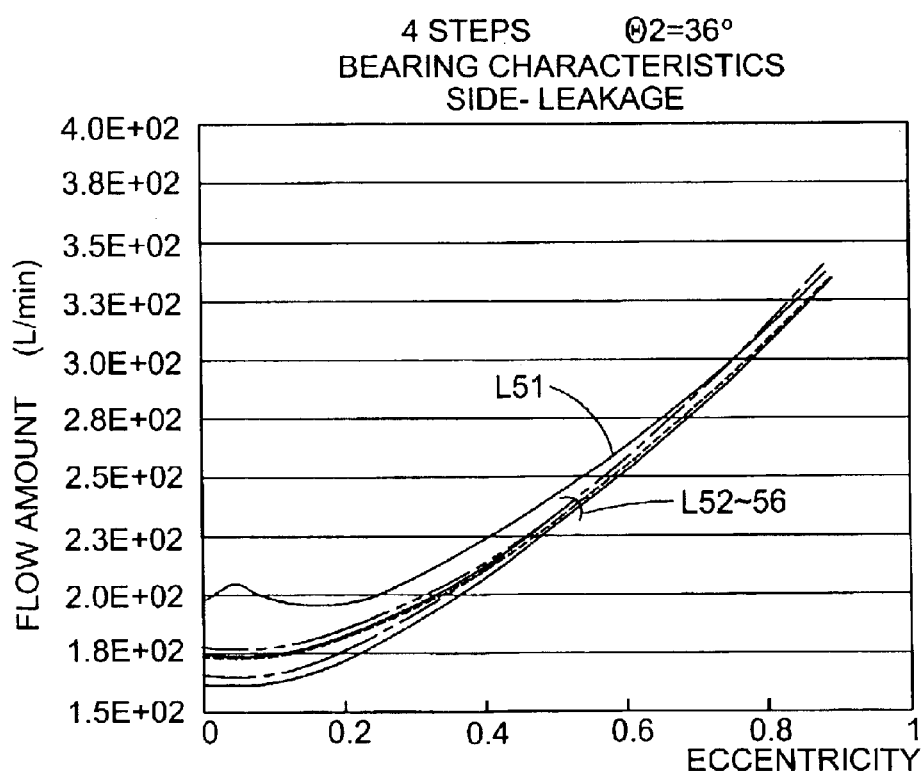
Figure 19A:
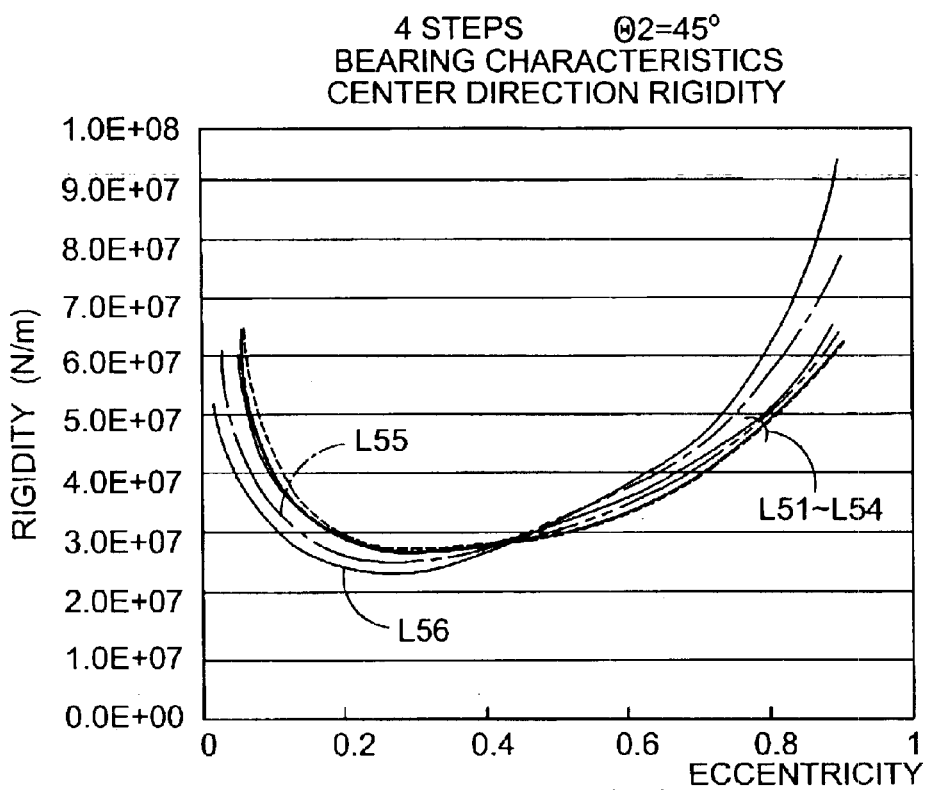
FIGS. 19(A), (B), (C) and (D) are graphs which respectively show relations between an eccentricity and a center direction rigidity, center direction rigidity torque ratio, bearing load, and side-leakage with a parameter of an edge angle α, where the number of dynamic pressure generation parts is four and the circular angle of a protruded part is 45° in the dynamic pressure bearing device shown in FIGS. 3 and 4.
Figure 19B:
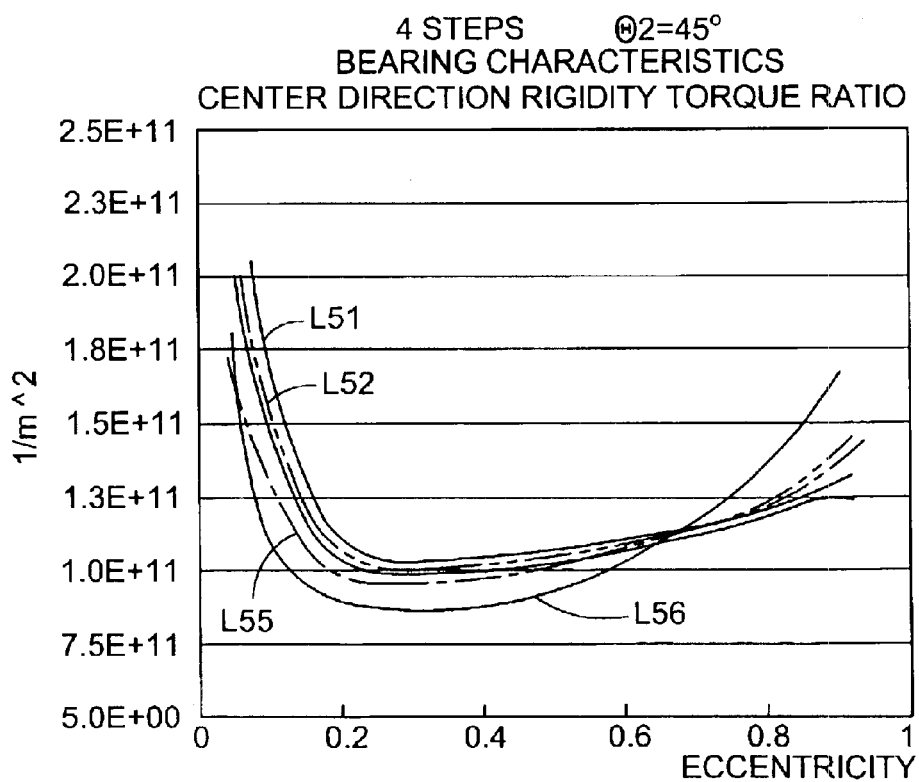
Figure 19C:
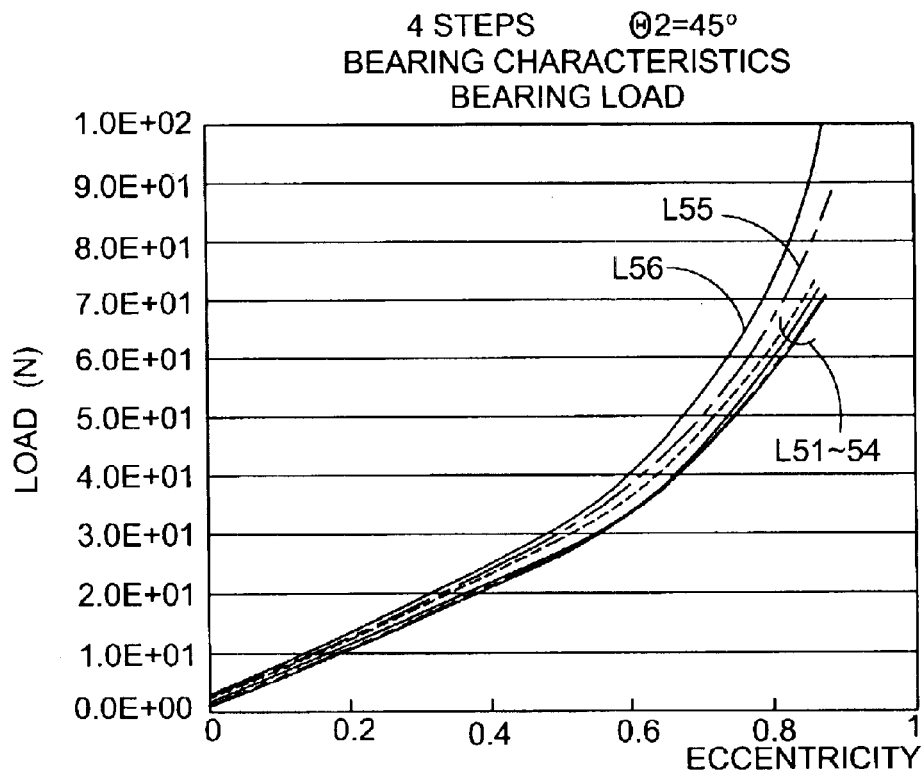
Figure 19D:
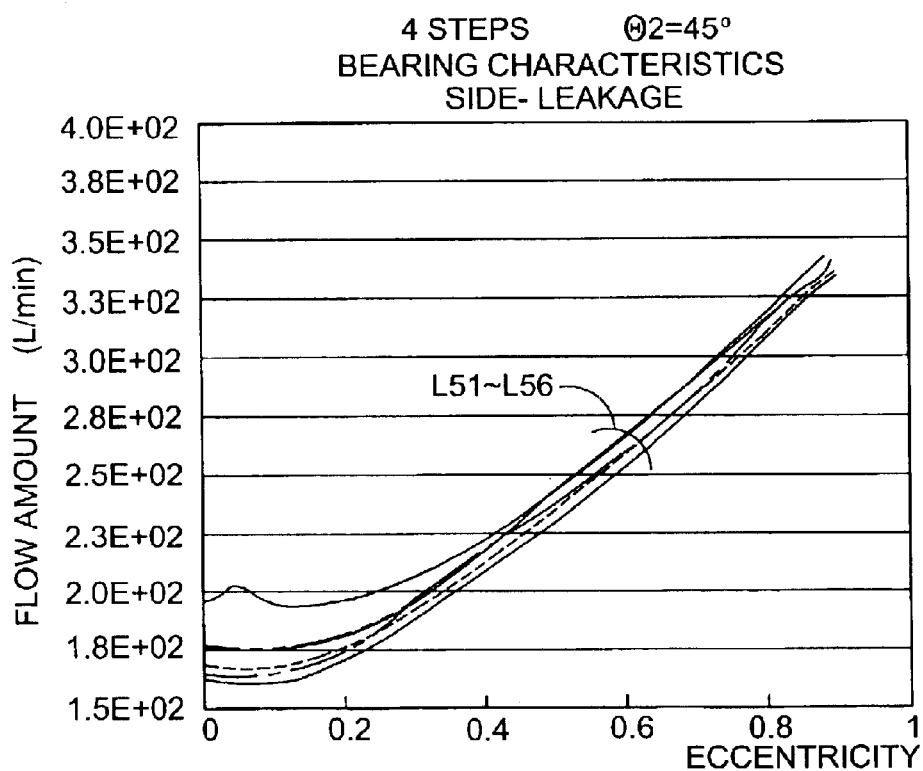

The results of the examinations where the number of the dynamic pressure generation parts 31 is four and the circular angles θ 2 of the protruded part 37 are set at 21°, 36° and 45° are respectively shown in FIGS. 17(A). (B), (C) (D), FIGS. 18(A), (B), (C), (D), and FIGS. 19(A), (B), (C), (D). In these figures, the data when the edge angles α are set at 0°, 12°, 17.7°, 23°, 40°, 60° are respectively shown in a solid line L 51, a two-dot chain line L 52, a solid line L 53, a dotted line L 54, an alternate long and short dash line L 55 and a solid line L 56.

Figure 20A:
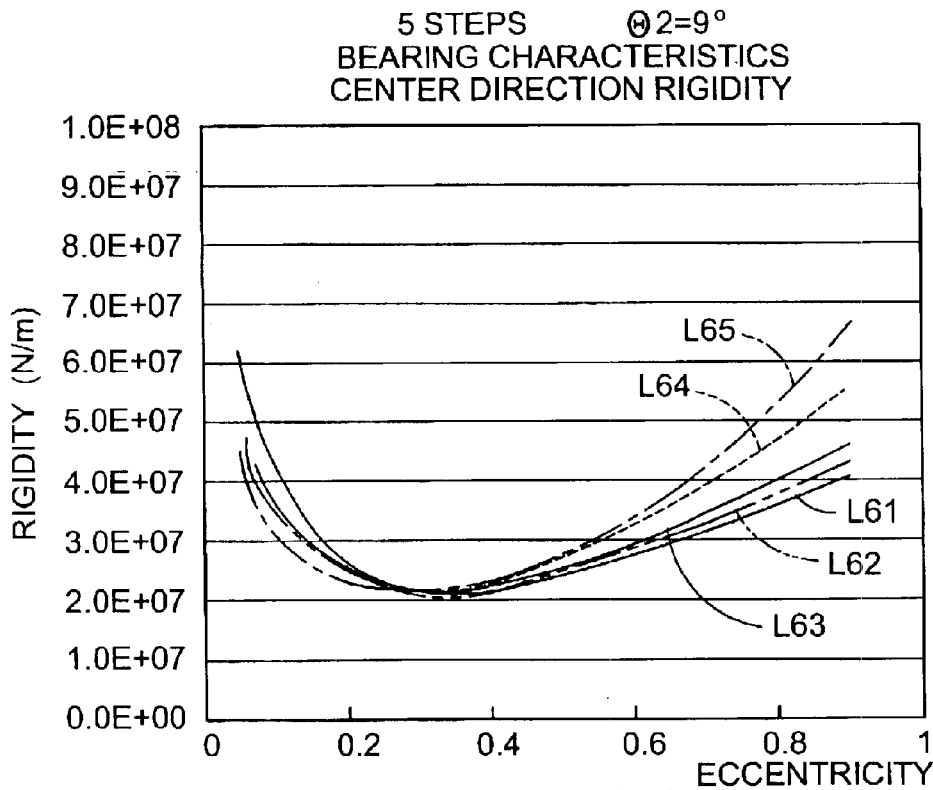
FIGS. 20(A), (B), (C) and (D) are graphs which respectively show relations between an eccentricity and a center direction rigidity, center direction rigidity torque ratio, bearing load, and side-leakage with a parameter of an edge angle α, where the number of dynamic pressure generation parts is five and the circular angle of a protruded part is 9° in the dynamic pressure bearing device shown in FIGS. 3 and 4.
Figure 20B:
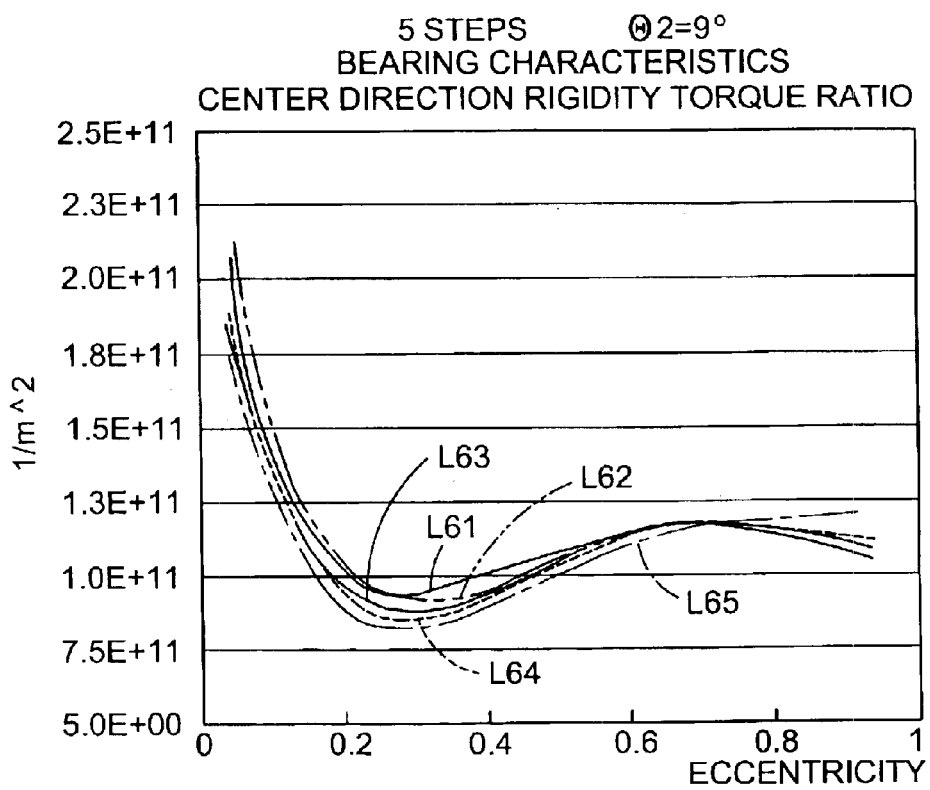
Figure 20C:
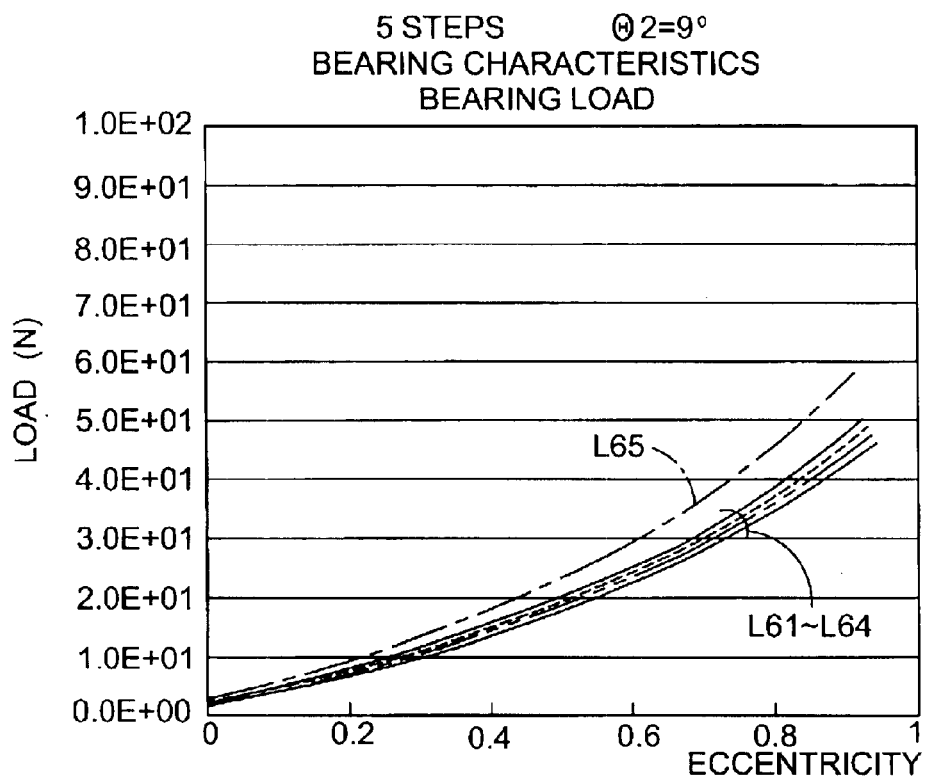
Figure 20D:
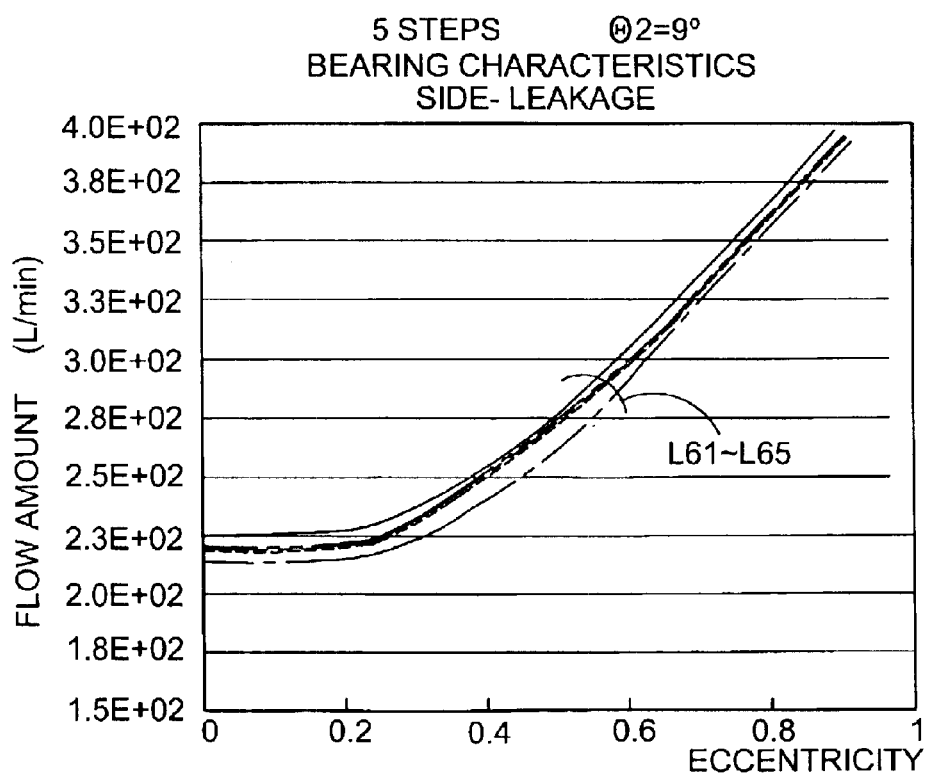
Figure 21A:
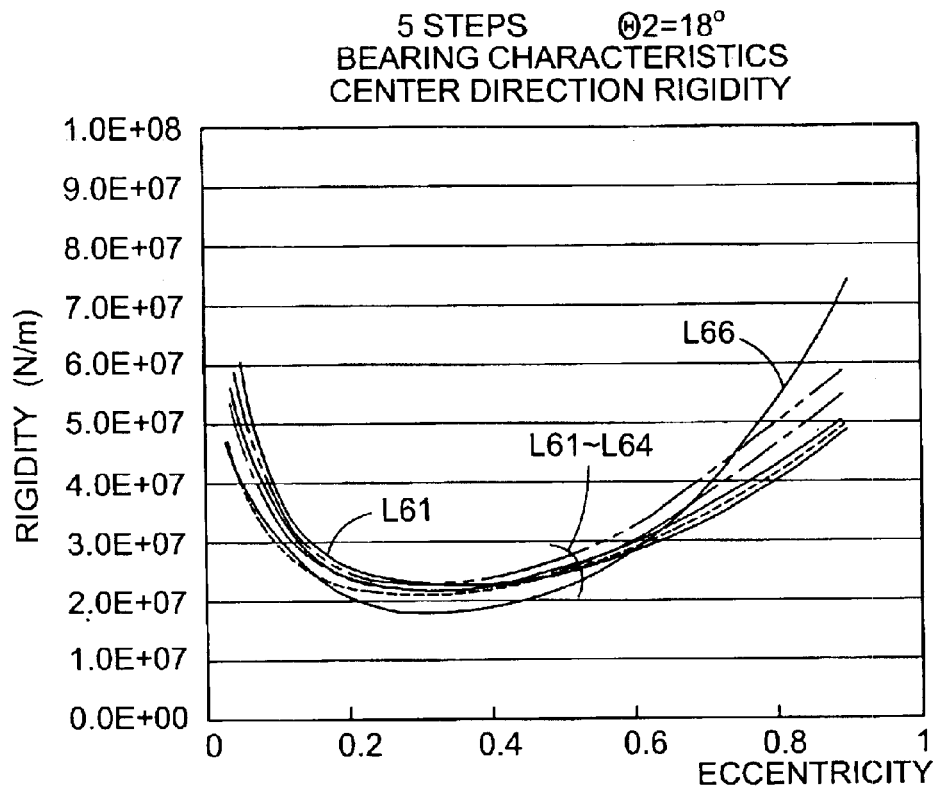
FIGS. 21(A), (B), (C) and (D) am graphs which respectively show relations between an eccentricity and a center direction rigidity, center direction rigidity torque ratio, bearing load, and side-leakage with a parameter of an edge angle α, where the number of dynamic pressure generation parts is five and the circular angle of a protruded part is 18° in the dynamic pressure bearing device shown in FIGS. 3 and 4.
Figure 21B:
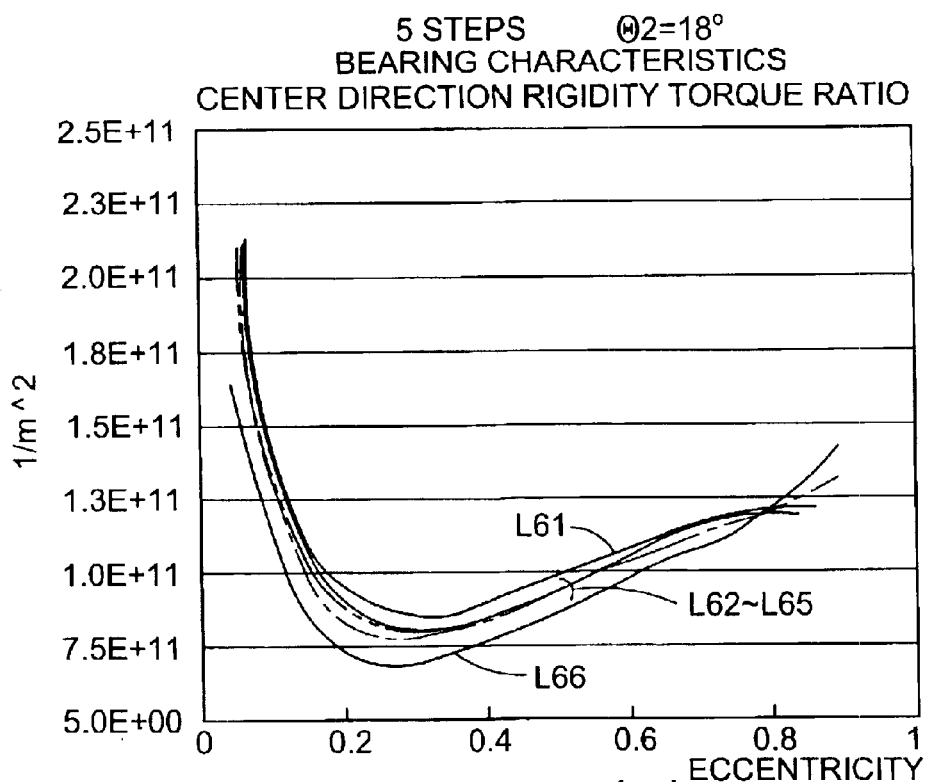
Figure 21C:
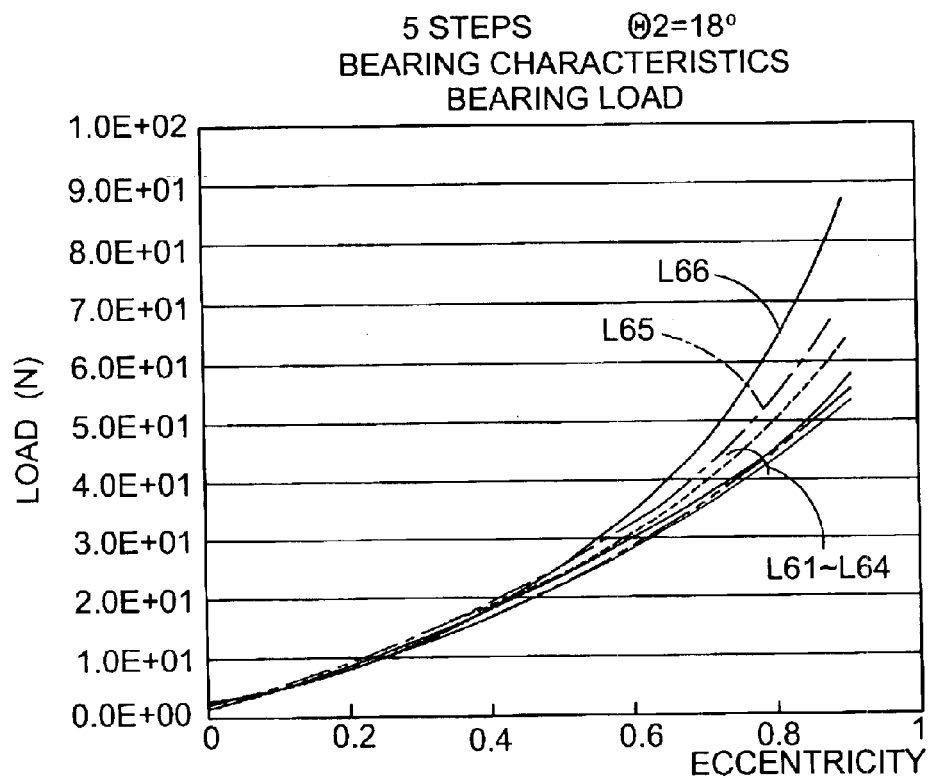
Figure 21D:
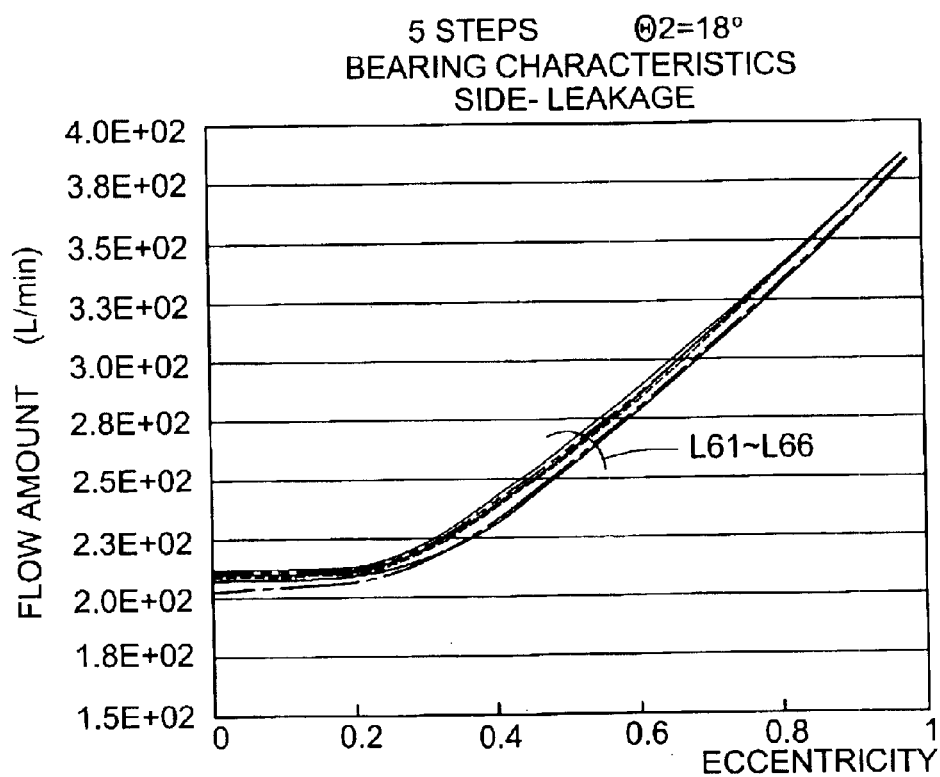
Figure 22A:
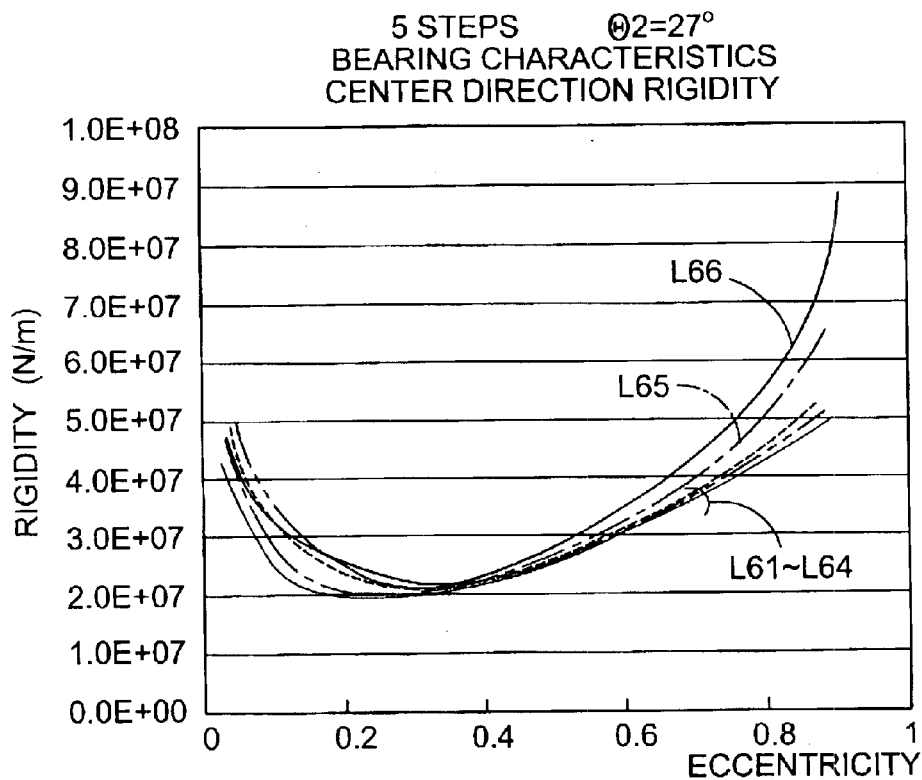
FIGS. 22(A), (B), (C) and (D) are graphs which respectively show relations between an eccentricity and a center direction rigidity, center direction rigidity torque ratio, bearing load, and side-leakage with a parameter of an edge angle α, where the number of dynamic pressure generation parts OR five and the circular angle of a protruded part is 27° in the dynamic pressure bearing device shown in FIGS. 3 and 4.
Figure 22B:
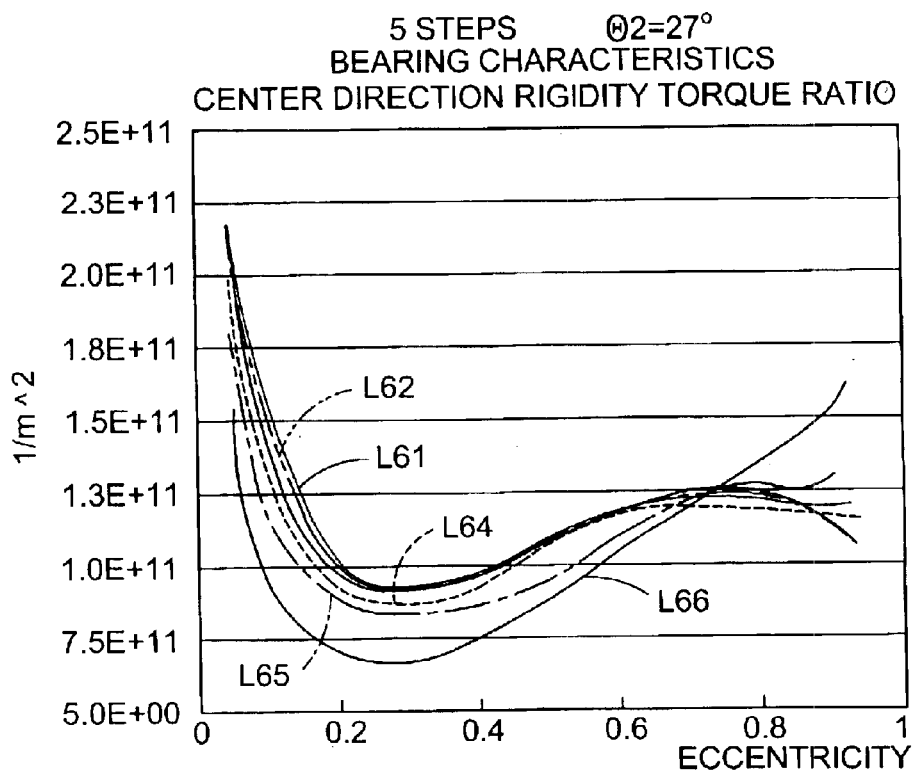
Figure 22C:
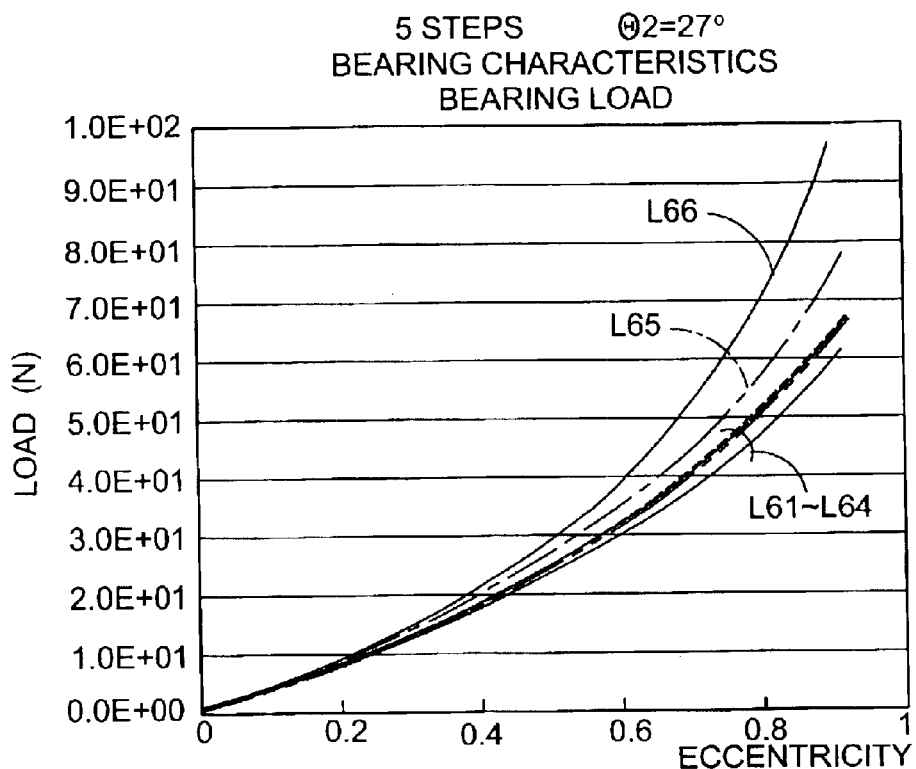
Figure 22D:
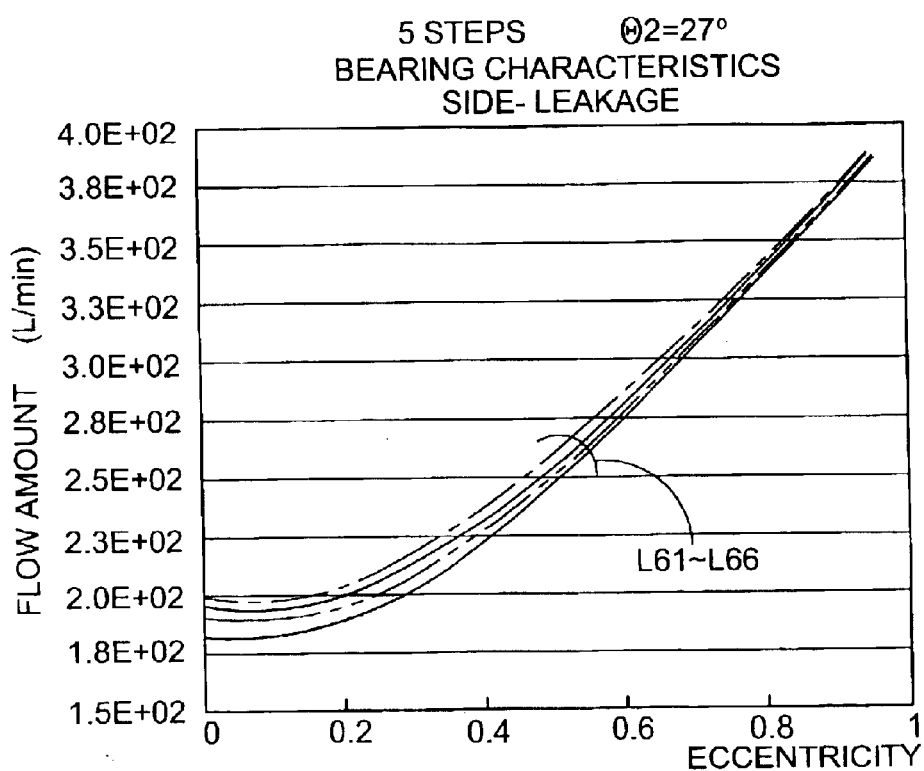
Figure 23A:
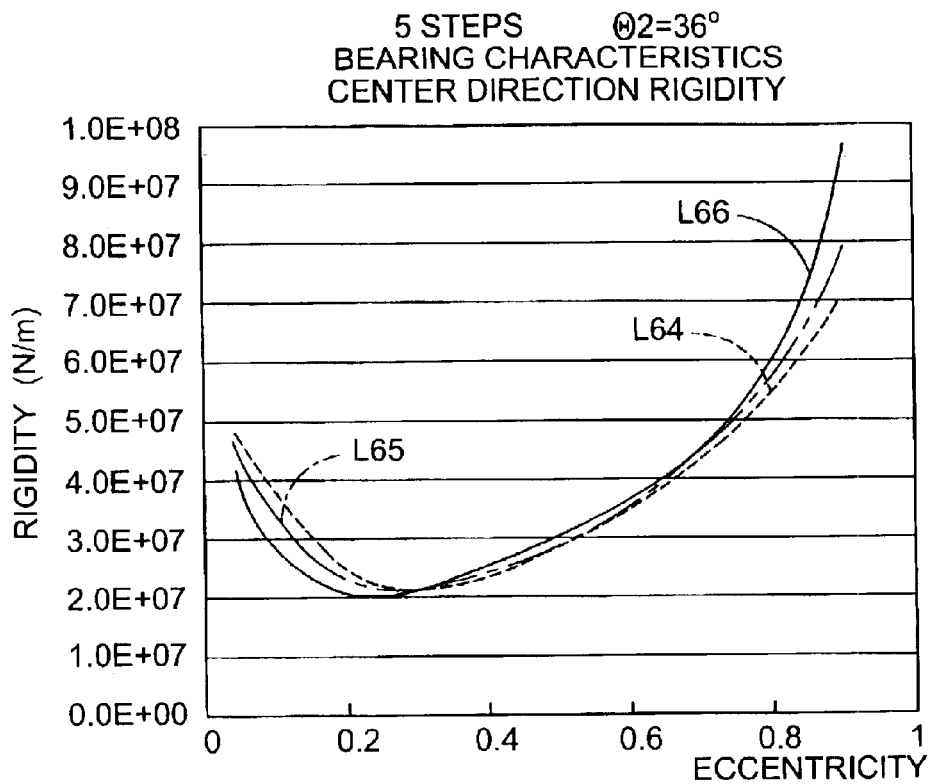
FIGS. 23(A), (B), (C) and (D) are graphs which respectively show relations between an eccentricity and a center direction rigidity, center direction rigidity torque ratio, bearing load, and side-leakage with a parameter of an edge angle α, where the number of dynamic pressure generation parts is five and the circular angle of a protruded part is 36° in the dynamic pressure bearing device shown in FIGS. 3 and 4.
Figure 23B:
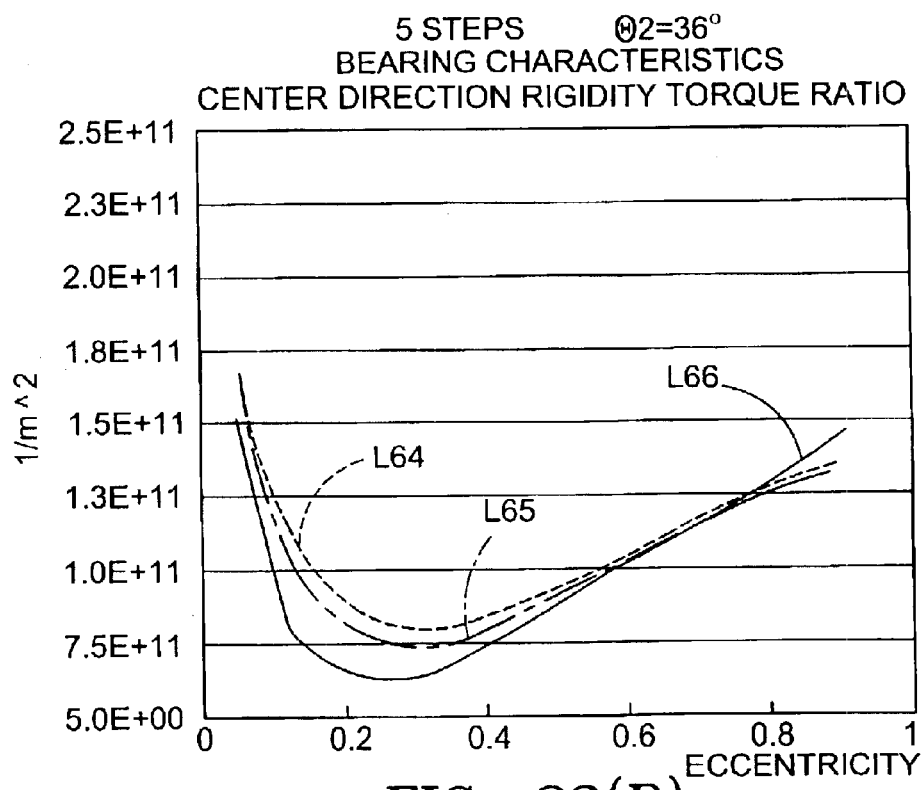
Figure 23C:
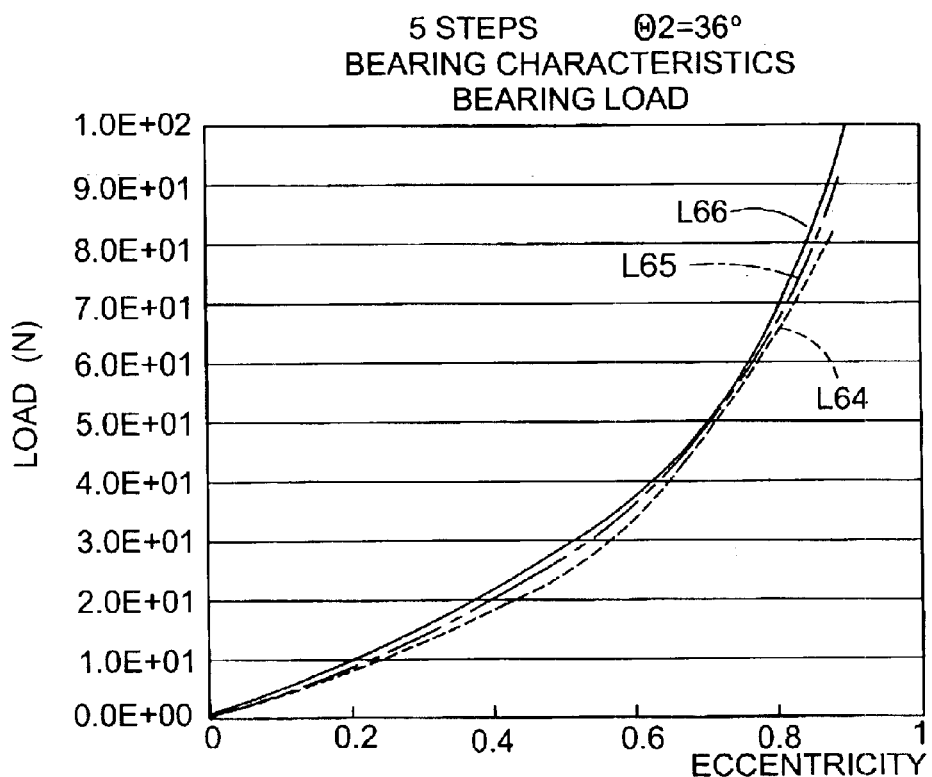
Figure 23D:
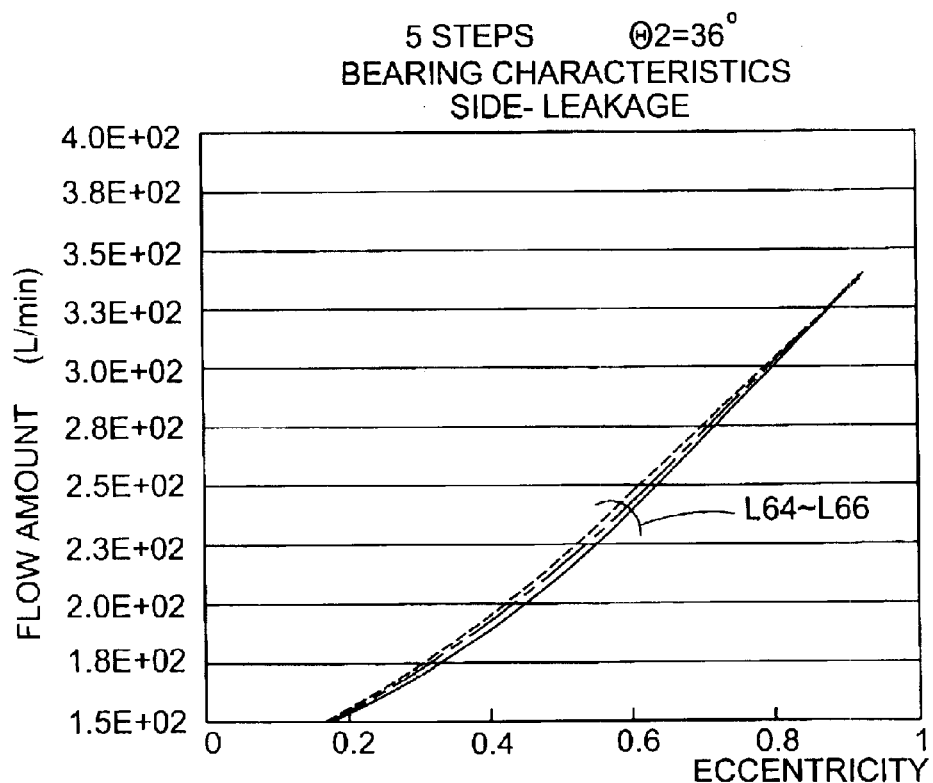
Figure 26A:
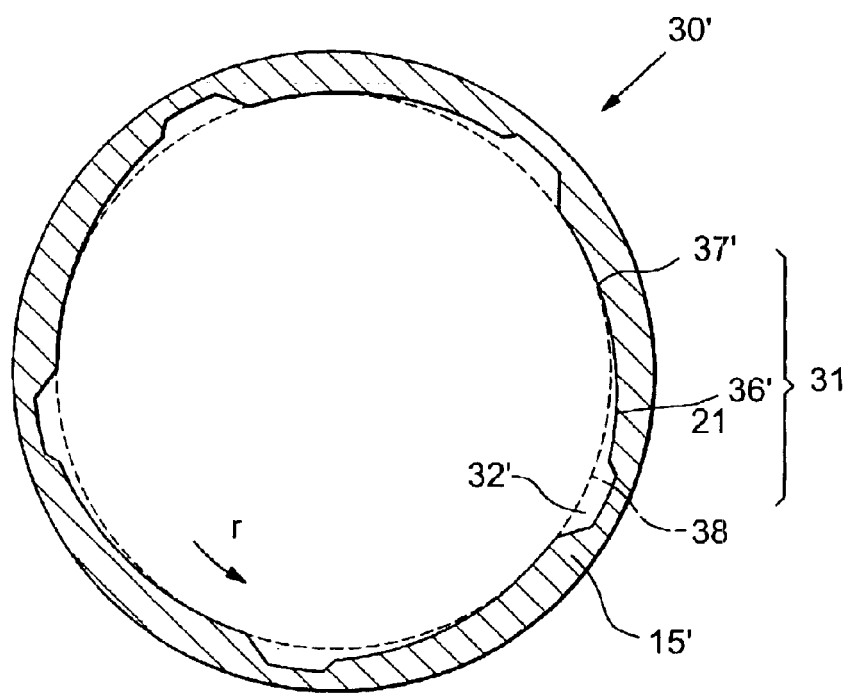
FIG. 26(A) is a transverse cross-sectional view of a conventional taper-formed dynamic pressure bearing device.
Figure 26B:
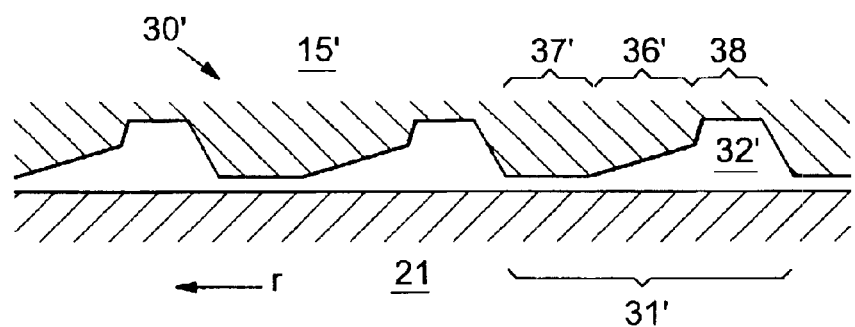
FIG. 26(B) is an explanatory development view of a dynamic pressure generation part which is formed in the dynamic pressure bearing device shown in FIG. 26(A).

The results of the examinations where the number of the dynamic pressure generation parts 31 is five and the circular angles θ 2 of the protruded part 37 are set at 9°, 18°, 27° and 36° are respectively shown in FIGS. 20(A), (B), (C), (D), FIGS. 21(A), (B), (C), (D), FIGS. 22(A), (B), (C), (D), and FIGS. 22(A), (B), (C), (D). In these figures, the data when the edge angles α are set at 0°, 12°, 17.7°, 23°, 40°, 60° are respectively shown in a solid line L 61, a two-dot chain line L 62, a solid line L 63, a dotted line L 64, an alternate long and a short dash line L 65 and a solid line L 66.

Judging from these examination results, the bearing load can be increased accordingly as the edge portion 351 of the recessed part 35 is formed more oblique so as to make the edge angle α larger on the inner peripheral surface of the bearing sleeve 15. Accordingly since the floating frequency by the dynamic pressure can be decreased, the metal-to-metal contact between the rotation shaft 21 and the bearing sleeve 15 is reduced at starting or stopping time of a motor. Therefore, the reliability of the dynamic pressure bearing device 30 can be improved (Effects of Above-mentioned Embodiments)

As described above, in this configuration, the dynamic pressure generation part 31 is provided with a protruded part 37 making the dimension of the minute gap 32 to be the smallest and a recessed part 35 making the dimension of the minute gap 32 the largest so as to form a step shape. That is, a conventional recessed separation groove is not formed in this configuration. Accordingly, the bearing sleeve 15 molded by sintering does not require cutting work, and therefore productivity of the dynamic pressure bearing device 30 can be improved.

The dynamic pressure bearing device 30 in this configuration is a step-formed bearing device which is formed in a step shape with the protruded part 37 and the recessed part 35 adjacent to each other in the circumferential direction. Therefore, the bearing sleeve 15 provided with the dynamic pressure generation parts 31 can be produced at a low cost and thus cost reduction of the dynamic pressure bearing device 30 can be obtained. In other words, since the protruded part 37 and the recessed part 35 is formed in a step structure, the bearing sleeve 15 can be produced of the sintered compact which is formed from powder including metal in a die. Also, the molding of the bearing sleeve can be performed by a die which can be divided vertically. In addition, the step-shaped recesses and projections of a die for molding can be produced by applying etching to the surface to be formed of the die.

According to this configuration, the dynamic pressure generation parts 31 are formed in three to five regions at equal angular intervals in the circumferential direction, and the ratio of the circular angle of the region of the protruded part 37 with respect to the dynamic pressure generation part 31 is set between 0.2 and 0.5. Accordingly, since the rigidity in the center direction becomes large in the dynamic pressure bearing device 30 of this configuration, deflection is hard to occur even when disturbances are applied at a low speed rotation. Also, since the speed of rotation required for beginning float by the dynamic pressure is low, a metal-to-metal contact is hard to occur between the rotation shaft 21 and the bearing sleeve 15 even at a low speed rotation of about 5000 rpm, and hence the life of the dynamic pressure bearing device 30 can be longer. Therefore, the dimensional tolerance of the rotation shaft 21 and the bearing sleeve 15 does not need to be strict to improve its rigidity, and the diameter of the rotation shaft 21 is not required to be larger to increase its peripheral velocity. Also, it is not necessary to use an expensive material of high abrasion resistance for the rotation shaft 21 and the bearing sleeve 15. Therefore, according to this configuration, a dynamic pressure bearing device 30 with satisfactory characteristics can be provided.

In addition, the perfect circle part 36 is provided on the shaft end side of the dynamic pressure generation part 31 on the inner peripheral surface of the bearing sleeve 15. That is, since the perfect circle part 36 is provided on the side to which a rotor as a rotational load is coupled, the rigidity in the center direction on the side of supporting the rotor can be increased. Accordingly, deflection is hard to generate even when disturbances are applied at a low speed rotation. The ratio of the axial length or the region where the perfect circle part 36 is formed with respect to that of the part where the rotation shaft 21 and the bearing sleeve 15 oppose to each other is preferably set in the range of 0.03 to 0.3. When the ratio is less than 0.03, the effect mentioned above may be small and, on the other hand, when the ratio is more than 0.3, the region of the dynamic pressure generation part 31 is decreased and thus the rigidity is lowered.

According to this configuration, the bearing load can be increased as the edge portion 351 of the recessed part 35 is formed oblique on the inner peripheral surface of the bearing sleeve 15. Accordingly, since the floating frequency due to the dynamic pressure can be decreased, the metal-to-metal contact between the rotation shaft 21 and the bearing sleeve 15 is reduced at a starting or stopping state of a motor. Therefore, the reliability of the dynamic pressure bearing device 30 can be improved.

In this configuration, the ratio of circular angle θ 2 of the region where the protruded part is formed with respect to the circular angle θ 1 of the region where the dynamic pressure generation part 31 is formed is set between 0.2 and 0.5. Accordingly, since the large rigidity in the center direction is obtained, deflection is hard to occur even when disturbances are applied at a low speed rotation.

(Other Embodiments)

Although the present invention has been shown and described with reference to specific preferred embodiments, various changes and modifications will be apparent to those skilled in the art from the teachings herein.

For example, in the above-mentioned embodiment, as described with reference to FIG. 4(B) or the like, the edge portion 351 of the recessed part 35 is formed oblique downwardly. That is, the corner part 352, to which the lubricating fluid flows in when the rotation shaft 21 is rotated in the direction of arrow "r", is formed as an acute angle. Moreover, the perfect circle part 36, in which the radial dimension of the perfect circle part 36 is the same as that of the protruded part 37, is formed at a region which is axially adjacent to the dynamic pressure generation part 31 on the inner peripheral surface of the bearing sleeve 15. However, as shown in FIGS. 24 and 25, only one of these constitutions may be adopted.

In other words, in the dynamic pressure bearing device 30 shown in FIG. 24, the edge portion 351 of the recessed part 35 is armed oblique downwardly, and furthermore the corner part 352 to which the lubricating fluid flows in when the rotation shaft 21 is rotated in the direction of arrow "r", is formed as an acute angle. However, the corner part 352 is formed at the substantially end part of the bearing sleeve 15 and the perfect circle part 36 shown in FIG. 4(B) is not formed at all or hardly formed.

In a dynamic pressure bearing device 30 shown in FIG. 25, a perfect circle part 36 is formed at a region which is axially adjacent to the dynamic pressure generation part 31 on the inner peripheral surface of the bearing sleeve 15. The radial dimension of the perfect circle part 36 is the same as that of the protruded part 37 and thus both of the gap dimensions in the minute gap 32 are the same. In this embodiment, the edge portion 351 of the recessed part 35 is parallel to the axial end part of the bearing sleeve 15, that is, perpendicular to the axis direction.

The perfect circle part 36 and the oblique edge portion 351 of the recessed part 36 may be adopted in the both end parts of the bearing sleeve 15.

The dynamic pressure generation part 31 may be formed on the outer peripheral face of the rotation shaft 21 instead of forming on the inner peripheral surface of the bearing sleeve 15.

As described above, the dynamic pressure bearing device according to the present invention is provided with the protruded part and the recessed part, but is not provided with a conventional recessed separation groove. Accordingly, productivity of the dynamic pressure bearing device can be improved and the leakage of the lubricating fluid in the axis direction can be restrained.

The perfect circle part which is adjacent to the dynamic pressure generation parts gives the increase of the rigidity in the center direction and the deflection is hard to occur even when disturbances are applied at a low speed rotation.

In the dynamic pressure bearing device according to another embodiment of the present invention, the edge portion of the recessed part is formed oblique. Accordingly, the lubricating fluid is pressurized on the center side in the axial direction and thus a large dynamic pressure is generated and the rigidity can be increased.

According to the present invention, since the speed of rotation at which floating begins due to the dynamic pressure can be made lower, a metal-to-metal contact is hard to occur between the shaft member and the bearing member even at a low speed rotation, and hence the life of the dynamic pressure bearing device can be made longer.

While the description above refers to particular embodiments of the invention, it will be understood that many modifications may be made without departing from the spirit thereof. The accompanying claims are intended to cover such modifications as would fall within the true scope and spirit of the present invention.

The disclosed embodiments are therefore to be considered in all respects as illustrative and not restrictive. The scope of the invention being indicated by the appended claims, rather than the foregoing description, and all changes which come within the meaning and range of equivalency of the claims are therefore intended to be embraced therein.

What is claimed is:

1. A dynamic pressure bearing device, comprising:

a shaft member;

a bearing member relatively rotatably supporting the shaft member;

a plurality of dynamic pressure generation parts provided on a peripheral face either of the shaft member or the bearing member; and a perfect circle part formed at least on a shaft end side at a region which is axially adjacent to the dynamic pressure generation part on the peripheral face where a protruded part and a recessed part are formed, wherein the dynamic pressure generation parts are respectively formed in a circumferential direction at equal angular intervals and extended in an axial direction so as to form a protruded part which makes a dimension of a minute gap between the shaft member and the bearing member to be the smallest and a recessed part which makes the dimension of the minute gap the largest, and the dimension of the minute gap in the perfect circle part is set to be the same as that in the protruded part.

2. The dynamic pressure bearing device according to claim 1, wherein the perfect circle part is formed on an output end side to which a rotational load is coupled.

3. The dynamic pressure bearing device according to claim 2, wherein the minute gap where lubricating fluid is interposed between an outer peripheral face of the shaft member and an inner periphery face of the bearing member is constituted so that one side of the minute gap is closed and the other side, which is the output end side, is opened.

4. The dynamic pressure bearing device according to claim 3, wherein the protruded part and the recessed part are respectively formed as the same diameter dimension along the circumferential direction.

5. The dynamic pressure bearing device according to claim 1, wherein a ratio of the axial length of the perfect circle part and that of a part where the outer peripheral face of the shaft member and an inner peripheral face of the bearing member oppose to each other is set in a range of 0.03 to 0.3.

6. The dynamic pressure bearing device according to claim 1, wherein an edge portion of the recessed part, which is located on the shaft end side is formed oblique so that a corner part to which lubricating fluid flows in when the shaft member is relatively rotated with the bearing member is formed as an acute angle.

7. The dynamic pressure bearing device according to claim 6, wherein the corner part formed oblique by the acute angle is formed on an output end side to which a rotational load is coupled.

8. The dynamic pressure bearing device according to claim 7, wherein the minute gap where the lubricating fluid is interposed between an outer peripheral face of the shaft member and an inner periphery face of the bearing member is constituted so that one side of the minute gap is closed and the other side, which is the output end side, is opened.

9. The dynamic pressure bearing device according to claim 7, wherein the protruded part and the recessed part are formed adjacent to each other in a stepped shape in the circumferential direction.

10. The dynamic pressure bearing device according to claim 9, wherein the protruded part and the recessed part are respectively formed to be the same diameter dimension along the circumferential direction.

11. The dynamic pressure bearing device according to claim 1, wherein the dynamic pressure generation parts are formed of three to five regions along the circumferential direction.

12. The dynamic pressure bearing device according to claim 1, wherein a ratio of a circular angle of a region where the protruded part is formed with respect to a circular angle of a region where the dynamic pressure generation parts are formed is set between 0.2 and 0.5.

13. The dynamic pressure bearing device according to claim 1, wherein one of either the shaft member and the bearing member, provided with the dynamic pressure generation parts, is produced of a sintered compact which is formed from powder including metal.

14. The dynamic pressure bearing device according to claim 1, wherein a lubricating fluid is air.

15. A dynamic pressure bearing device, comprising:

a shaft members a bearing member relatively rotatably supporting the shaft member; and a plurality of dynamic pressure generation parts provided on a peripheral face either of the shaft member or the bearing member, wherein the dynamic pressure generation parts are respectively formed in a circumferential direction at equal angular intervals and extended in an axial direction so as to form a protruded part which makes the dimension of a minute gap between the shaft member and the bearing member the smallest and a recessed part which makes the dimension of the minute gap the largest, and the edge portion of the recessed part which is located on a shaft end side is formed oblique so that a corner part to which lubricating fluid flows in when the shaft member is relatively rotated with the bearing member is formed as an acute angle.

16. The dynamic pressure bearing device according to claim 15, wherein the protruded part and the recessed part are formed adjacent to each other in a stepped shape in the circumferential direction.

17. The dynamic pressure bearing device according to claim 16, wherein the dynamic pressure generation parts are formed of three to five regions along the circumferential direction.

18. The dynamic pressure bearing device according to claim 17, wherein a ratio of a circular angle of a region where the protruded part is formed with respect to the circular angle of a region where the dynamic pressure generation part is formed is set between 0.2 and 0.5.

19. The dynamic pressure bearing device according to claim 18, wherein one of either the shaft member and the bearing member provided with the dynamic pressure generation parts is produced of a sintered compact which is formed from powder including metal.

20. The dynamic pressure bearing device according to claim 19, wherein the lubricating fluid is air.

* * * * *